(12) United States Patent
Petite

(10) Patent No.: US 8,489,063 B2
(45) Date of Patent: Jul. 16, 2013

(54) SYSTEMS AND METHODS FOR PROVIDING EMERGENCY MESSAGES TO A MOBILE DEVICE

(75) Inventor: Thomas David Petite, Atlanta, GA (US)

(73) Assignee: Sipco, LLC, Atlanta, GA (US)

( * ) Notice: Subject to any disclaimer, the term of this patent is extended or adjusted under 35 U.S.C. 154(b) by 0 days.

(21) Appl. No.: 13/102,849

(22) Filed: May 6, 2011

(65) Prior Publication Data

US 2011/0212700 A1     Sep. 1, 2011

Related U.S. Application Data

(63) Continuation-in-part of application No. 12/356,358, filed on Jan. 20, 2009, which is a continuation of application No. 10/000,477, filed on Oct. 24, 2001, now Pat. No. 7,480,501.

(51) Int. Cl.
   *H04M 11/14*     (2006.01)

(52) U.S. Cl.
   USPC .............. 455/404.1; 455/404.2; 455/550.1; 340/546

(58) Field of Classification Search
   USPC .............. 455/404.1, 404.2, 550.1; 340/546
   See application file for complete search history.

(56) References Cited

U.S. PATENT DOCUMENTS

| | | | |
|---|---|---|---|
| 3,665,475 A | 5/1972 | Gram | |
| 3,705,385 A | 12/1972 | Batz | |
| 3,723,876 A | 3/1973 | Seaborn, Jr. | |
| 3,742,142 A | 6/1973 | Martin | |
| 3,848,231 A | 11/1974 | Wootton | |
| 3,892,948 A | 7/1975 | Constable | |
| 3,906,460 A | 9/1975 | Halpern | |
| 3,914,692 A | 10/1975 | Seaborn, Jr. | |
| 3,922,492 A | 11/1975 | Lumsden | |
| 3,925,763 A | 12/1975 | Wadhwani et al. | |
| 4,025,315 A | 5/1977 | Mazelli | |
| 4,056,684 A | 11/1977 | Lindstrom | |
| 4,058,672 A | 11/1977 | Crager et al. | |
| 4,083,003 A | 4/1978 | Haemmig | |
| 4,120,452 A | 10/1978 | Kimura et al. | |
| 4,124,839 A | 11/1978 | Cohen | |

(Continued)

FOREIGN PATENT DOCUMENTS

| | | |
|---|---|---|
| EP | 0483547 A1 | 5/1992 |
| EP | 0578041 B1 | 1/1994 |

(Continued)

OTHER PUBLICATIONS

Haartsen et al., "Bluetooth: Vision, Goals, and Architecture;" Mobile Computing and Communications Review; vol. 1, No. 2; pp. 1-8.

(Continued)

*Primary Examiner* — Danh Le

(74) *Attorney, Agent, or Firm* — Dustin B. Weeks, Esq.; Troutman Sanders LLP

(57) ABSTRACT

The present invention is directed to systems and methods for providing emergency messages to a mobile device. In an exemplary embodiment, a system for communicating emergency messages is provided comprising a mobile device comprising an emergency message application and a personal emergency message transceiver, an emergency message control center, wherein the emergency message application is enabled to receive a plurality of emergency messages generated by the emergency message control center.

11 Claims, 10 Drawing Sheets

U.S. PATENT DOCUMENTS

| | | |
|---|---|---|
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,322,842 A | 3/1982 | Martinez |
| 4,345,116 A | 8/1982 | Ash et al. |
| 4,354,181 A | 10/1982 | Spletzer |
| 4,395,780 A | 7/1983 | Gohm et al. |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza et al. |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,665,519 A | 5/1987 | Kirchner et al. |
| 4,669,113 A | 5/1987 | Ash et al. |
| 4,670,739 A | 6/1987 | Kelly, Jr. |
| 4,692,761 A | 9/1987 | Robinton |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,799,059 A | 1/1989 | Grindahl et al. |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,123 A | 11/1989 | Dixit et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley et al. |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,991,008 A | 2/1991 | Nama |
| 4,993,059 A | 2/1991 | Smith et al. |
| 4,998,095 A | 3/1991 | Shields |
| 4,999,607 A | 3/1991 | Evans |
| 5,007,052 A | 4/1991 | Flammer |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,079,768 A | 1/1992 | Flammer |
| 5,086,391 A | 2/1992 | Chambers |
| 5,088,032 A | 2/1992 | Bosack |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,117,422 A | 5/1992 | Hauptschein et al. |
| 5,124,624 A | 6/1992 | de Vries et al. |
| 5,128,855 A | 7/1992 | Hilber et al. |
| 5,130,519 A | 7/1992 | Bush et al. |
| 5,130,987 A | 7/1992 | Flammer |
| 5,131,038 A | 7/1992 | Puhl et al. |
| 5,134,650 A | 7/1992 | Blackmon |
| 5,136,285 A | 8/1992 | Okuyama |
| 5,138,615 A | 8/1992 | Lamport et al. |
| 5,155,481 A | 10/1992 | Brennan, Jr. et al. |
| 5,159,317 A | 10/1992 | Bray |
| 5,159,592 A | 10/1992 | Perkins |
| 5,162,776 A | 11/1992 | Bushnell et al. |
| 5,170,393 A | 12/1992 | Peterson et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,224,648 A | 7/1993 | Simon et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,251,205 A | 10/1993 | Callon et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,204 A | 1/1994 | Shpancer et al. |
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidewell et al. |
| 5,319,711 A | 6/1994 | Servi |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |

| | | | | | |
|---|---|---|---|---|---|
| 5,344,068 A | 9/1994 | Haessig | 5,565,857 A | 10/1996 | Lee |
| 5,345,231 A | 9/1994 | Koo et al. | 5,568,535 A | 10/1996 | Sheffer et al. |
| 5,345,595 A | 9/1994 | Johnson et al. | 5,570,084 A | 10/1996 | Ritter et al. |
| 5,347,263 A | 9/1994 | Carroll et al. | 5,572,438 A | 11/1996 | Ehlers et al. |
| 5,352,278 A | 10/1994 | Korver et al. | 5,572,528 A | 11/1996 | Shuen |
| 5,354,974 A | 10/1994 | Eisenberg | 5,573,181 A | 11/1996 | Ahmed |
| 5,355,278 A | 10/1994 | Hosoi et al. | 5,574,111 A | 11/1996 | Brichta et al. |
| 5,355,513 A | 10/1994 | Clarke et al. | 5,583,850 A | 12/1996 | Snodgrass et al. |
| 5,365,217 A | 11/1994 | Toner | 5,583,914 A | 12/1996 | Chang et al. |
| 5,371,736 A | 12/1994 | Evan | 5,587,705 A | 12/1996 | Morris |
| 5,382,778 A | 1/1995 | Takahira et al. | 5,588,005 A | 12/1996 | Ali et al. |
| 5,383,134 A | 1/1995 | Wrzesinski | 5,589,878 A | 12/1996 | Cortjens et al. |
| 5,383,187 A | 1/1995 | Vardakas et al. | 5,590,038 A | 12/1996 | Pitroda |
| 5,390,206 A | 2/1995 | Rein et al. | 5,590,179 A | 12/1996 | Shincovich et al. |
| 5,406,619 A | 4/1995 | Akhteruzzaman et al. | 5,592,491 A | 1/1997 | Dinkins |
| 5,412,192 A | 5/1995 | Hoss | 5,594,431 A | 1/1997 | Sheppard et al. |
| 5,412,654 A | 5/1995 | Perkins | 5,596,719 A | 1/1997 | Ramakrishnan et al. |
| 5,412,760 A | 5/1995 | Peitz | 5,596,722 A | 1/1997 | Rahnema |
| 5,416,475 A | 5/1995 | Tolbert et al. | 5,602,843 A | 2/1997 | Gray |
| 5,416,725 A | 5/1995 | Pacheco et al. | 5,604,414 A | 2/1997 | Milligan et al. |
| 5,418,812 A | 5/1995 | Reyes et al. | 5,604,869 A | 2/1997 | Mincher et al. |
| 5,420,910 A | 5/1995 | Rudokas et al. | 5,606,361 A | 2/1997 | Davidsohn et al. |
| 5,424,708 A | 6/1995 | Ballesty et al. | 5,608,721 A | 3/1997 | Natarajan et al. |
| 5,430,729 A | 7/1995 | Rahnema | 5,608,786 A | 3/1997 | Gordon |
| 5,432,507 A | 7/1995 | Mussino et al. | 5,613,620 A | 3/1997 | Center et al. |
| 5,438,329 A | 8/1995 | Gastouniotis et al. | 5,615,227 A | 3/1997 | Schumacher, Jr. et al. |
| 5,439,414 A | 8/1995 | Jacob | 5,615,277 A | 3/1997 | Hoffman |
| 5,440,545 A | 8/1995 | Buchholz et al. | 5,617,084 A | 4/1997 | Sears |
| 5,442,553 A | 8/1995 | Parrillo | 5,619,192 A | 4/1997 | Ayala |
| 5,442,633 A | 8/1995 | Perkins et al. | 5,623,495 A | 4/1997 | Eng et al. |
| 5,445,287 A | 8/1995 | Center et al. | 5,625,410 A | 4/1997 | Washino et al. |
| 5,445,347 A | 8/1995 | Ng | 5,628,050 A | 5/1997 | McGraw et al. |
| 5,451,929 A | 9/1995 | Adelman et al. | 5,629,687 A | 5/1997 | Sutton et al. |
| 5,451,938 A | 9/1995 | Brennan, Jr. | 5,629,875 A | 5/1997 | Adair, Jr. |
| 5,452,344 A | 9/1995 | Larson | 5,630,209 A | 5/1997 | Wizgall et al. |
| 5,454,024 A | 9/1995 | Lebowitz | 5,631,554 A | 5/1997 | Briese et al. |
| 5,455,569 A | 10/1995 | Sherman et al. | 5,636,216 A | 6/1997 | Fox et al. |
| 5,465,401 A | 11/1995 | Thompson | 5,640,002 A | 6/1997 | Ruppert et al. |
| 5,467,074 A | 11/1995 | Pedtke | 5,644,294 A | 7/1997 | Ness |
| 5,467,082 A | 11/1995 | Sanderson | 5,655,219 A | 8/1997 | Jusa et al. |
| 5,467,345 A | 11/1995 | Cutler, Jr. et al. | 5,657,389 A | 8/1997 | Houvener |
| 5,468,948 A | 11/1995 | Koenck et al. | 5,659,300 A | 8/1997 | Dresselhuys et al. |
| 5,471,201 A | 11/1995 | Cerami et al. | 5,659,303 A | 8/1997 | Adair, Jr. |
| 5,473,322 A | 12/1995 | Carney | 5,668,876 A | 9/1997 | Falk et al. |
| 5,475,689 A | 12/1995 | Kay et al. | 5,673,252 A | 9/1997 | Johnson et al. |
| 5,479,400 A | 12/1995 | Dilworth et al. | 5,673,259 A | 9/1997 | Quick, Jr. |
| 5,481,259 A | 1/1996 | Bane | 5,673,304 A | 9/1997 | Connor et al. |
| 5,481,532 A | 1/1996 | Hassan et al. | 5,673,305 A | 9/1997 | Ross |
| 5,484,997 A | 1/1996 | Haynes | 5,682,139 A | 10/1997 | Pradeep et al. |
| 5,488,608 A | 1/1996 | Flammer, III | 5,682,476 A | 10/1997 | Tapperson et al. |
| 5,493,273 A | 2/1996 | Smurlo et al. | 5,689,229 A | 11/1997 | Chaco et al. |
| 5,493,287 A | 2/1996 | Bane | 5,691,980 A | 11/1997 | Welles, II et al. |
| 5,502,726 A | 3/1996 | Fischer | 5,696,695 A | 12/1997 | Ehlers et al. |
| 5,504,746 A | 4/1996 | Meier | 5,699,328 A | 12/1997 | Ishizaki et al. |
| 5,506,837 A | 4/1996 | Sollner et al. | 5,701,002 A | 12/1997 | Oishi et al. |
| 5,508,412 A | 4/1996 | Kast et al. | 5,702,059 A | 12/1997 | Chu et al. |
| 5,509,073 A | 4/1996 | Monnin | 5,704,046 A | 12/1997 | Hogan |
| 5,513,244 A | 4/1996 | Joao et al. | 5,704,517 A | 1/1998 | Lancaster, Jr. |
| 5,515,419 A | 5/1996 | Sheffer | 5,706,191 A | 1/1998 | Bassett et al. |
| 5,517,188 A | 5/1996 | Carroll et al. | 5,706,976 A | 1/1998 | Purkey |
| 5,522,089 A | 5/1996 | Kikinis et al. | 5,708,223 A | 1/1998 | Wyss |
| 5,528,215 A | 6/1996 | Siu et al. | 5,708,655 A | 1/1998 | Toth et al. |
| 5,528,507 A | 6/1996 | McNamara et al. | 5,712,619 A | 1/1998 | Simkin |
| 5,539,825 A | 7/1996 | Akiyama et al. | 5,712,980 A | 1/1998 | Beeler et al. |
| 5,541,938 A | 7/1996 | Di Zenzo et al. | 5,714,931 A | 2/1998 | Petite et al. |
| 5,542,100 A | 7/1996 | Hatakeyama | 5,717,718 A | 2/1998 | Rowsell et al. |
| 5,544,036 A | 8/1996 | Brown, Jr. et al. | 5,719,564 A | 2/1998 | Sears |
| 5,544,322 A | 8/1996 | Cheng et al. | 5,722,076 A | 2/1998 | Sakabe et al. |
| 5,544,784 A | 8/1996 | Malaspina | 5,726,534 A | 3/1998 | Seo |
| 5,548,632 A | 8/1996 | Walsh et al. | 5,726,544 A | 3/1998 | Lee |
| 5,550,358 A | 8/1996 | Tait et al. | 5,726,634 A | 3/1998 | Hess et al. |
| 5,550,359 A | 8/1996 | Bennett | 5,726,644 A | 3/1998 | Jednacz et al. |
| 5,550,535 A | 8/1996 | Park | 5,726,984 A | 3/1998 | Kubler et al. |
| 5,553,094 A | 9/1996 | Johnson et al. | 5,732,074 A | 3/1998 | Spaur et al. |
| 5,555,258 A | 9/1996 | Snelling et al. | 5,732,078 A | 3/1998 | Arango |
| 5,555,286 A | 9/1996 | Tendler | 5,736,965 A | 4/1998 | Mosebrook et al. |
| 5,557,320 A | 9/1996 | Krebs | 5,737,318 A | 4/1998 | Melnik |
| 5,557,748 A | 9/1996 | Norris | 5,740,232 A | 4/1998 | Pailles et al. |
| 5,562,537 A | 10/1996 | Zver et al. | 5,740,366 A | 4/1998 | Mahany et al. |

| Patent | Date | Inventor |
|---|---|---|
| 5,742,509 A | 4/1998 | Goldberg et al. |
| 5,742,666 A * | 4/1998 | Alpert ................. 455/404.2 |
| 5,745,849 A | 4/1998 | Britton |
| 5,748,104 A | 5/1998 | Argyroudis et al. |
| 5,748,619 A | 5/1998 | Meier |
| 5,754,111 A | 5/1998 | Garcia |
| 5,754,227 A | 5/1998 | Fukuoka |
| 5,757,783 A | 5/1998 | Eng et al. |
| 5,757,788 A | 5/1998 | Tatsumi et al. |
| 5,760,742 A | 6/1998 | Branch et al. |
| 5,761,083 A | 6/1998 | Brown, Jr. et al. |
| 5,764,742 A | 6/1998 | Howard et al. |
| 5,767,791 A | 6/1998 | Stoop et al. |
| 5,771,274 A | 6/1998 | Harris |
| 5,774,052 A | 6/1998 | Hamm et al. |
| 5,781,143 A | 7/1998 | Rossin |
| 5,790,644 A | 8/1998 | Kikinis |
| 5,790,662 A | 8/1998 | Valerij et al. |
| 5,790,938 A | 8/1998 | Talarmo |
| 5,796,727 A | 8/1998 | Harrison et al. |
| 5,798,964 A | 8/1998 | Shimizu et al. |
| 5,801,643 A | 9/1998 | Williams et al. |
| 5,812,531 A | 9/1998 | Cheung et al. |
| 5,815,505 A | 9/1998 | Mills |
| 5,818,822 A | 10/1998 | Thomas et al. |
| 5,822,273 A | 10/1998 | Bary et al. |
| 5,822,309 A | 10/1998 | Ayanoglu et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,848,054 A | 12/1998 | Mosebrook et al. |
| 5,852,658 A | 12/1998 | Knight et al. |
| 5,854,994 A | 12/1998 | Canada et al. |
| 5,856,974 A | 1/1999 | Gervais et al. |
| 5,862,201 A | 1/1999 | Sands |
| 5,864,772 A | 1/1999 | Alvarado et al. |
| 5,870,686 A | 2/1999 | Monson |
| 5,872,773 A | 2/1999 | Katzela et al. |
| 5,873,043 A | 2/1999 | Comer |
| 5,874,903 A | 2/1999 | Shuey et al. |
| 5,875,185 A | 2/1999 | Wang et al. |
| 5,880,677 A | 3/1999 | Lestician |
| 5,883,884 A | 3/1999 | Atkinson |
| 5,883,886 A | 3/1999 | Eaton et al. |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,758 A | 4/1999 | Argyroudis |
| 5,892,924 A | 4/1999 | Lyon et al. |
| 5,896,097 A | 4/1999 | Cardozo |
| 5,897,421 A | 4/1999 | Rink et al. |
| 5,897,607 A | 4/1999 | Jenney et al. |
| 5,898,369 A | 4/1999 | Godwin |
| 5,898,733 A | 4/1999 | Satyanarayana |
| 5,905,438 A | 5/1999 | Weiss et al. |
| 5,905,442 A | 5/1999 | Mosebrook et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,909,429 A | 6/1999 | Satyanarayana et al. |
| 5,914,656 A | 6/1999 | Ojala et al. |
| 5,914,672 A | 6/1999 | Glorioso et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,101 A | 7/1999 | Dasgupta |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,940,771 A | 8/1999 | Gollnick et al. |
| 5,941,363 A | 8/1999 | Partyka et al. |
| 5,941,955 A | 8/1999 | Wilby et al. |
| 5,946,631 A | 8/1999 | Melnik |
| 5,948,040 A | 9/1999 | DeLorme et al. |
| 5,949,779 A | 9/1999 | Mostafa et al. |
| 5,949,799 A | 9/1999 | Grivna et al. |
| 5,953,319 A | 9/1999 | Dutta et al. |
| 5,953,371 A | 9/1999 | Rowsell et al. |
| 5,953,507 A | 9/1999 | Cheung et al. |
| 5,955,718 A | 9/1999 | Levasseur et al. |
| 5,957,718 A | 9/1999 | Cheng et al. |
| 5,960,074 A | 9/1999 | Clark |
| 5,963,146 A | 10/1999 | Johnson et al. |
| 5,963,452 A | 10/1999 | Etoh et al. |
| 5,963,650 A | 10/1999 | Simionescu et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,371 A | 11/1999 | Mason, Jr. et al. |
| 5,978,578 A | 11/1999 | Azarya et al. |
| 5,986,574 A | 11/1999 | Colton |
| 5,987,011 A | 11/1999 | Toh |
| 5,987,331 A | 11/1999 | Grube et al. |
| 5,987,421 A | 11/1999 | Chuang |
| 5,991,625 A | 11/1999 | Vanderpool |
| 5,991,639 A | 11/1999 | Rautiola et al. |
| 5,994,892 A | 11/1999 | Turino et al. |
| 5,995,022 A | 11/1999 | Plis et al. |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,884 A | 12/1999 | Cook et al. |
| 6,005,963 A | 12/1999 | Bolle et al. |
| 6,018,659 A | 1/2000 | Ayyagari et al. |
| 6,021,664 A | 2/2000 | Granato et al. |
| 6,023,223 A | 2/2000 | Baxter, Jr. |
| 6,026,095 A | 2/2000 | Sherer et al. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,046,978 A | 4/2000 | Melnik |
| 6,054,920 A | 4/2000 | Smith et al. |
| 6,055,561 A | 4/2000 | Feldman et al. |
| 6,060,994 A | 5/2000 | Chen |
| 6,061,604 A | 5/2000 | Russ et al. |
| 6,064,318 A | 5/2000 | Kirchner, III et al. |
| 6,067,017 A | 5/2000 | Stewart et al. |
| 6,067,030 A | 5/2000 | Burnett et al. |
| 6,069,886 A | 5/2000 | Ayerst et al. |
| 6,073,169 A | 6/2000 | Shuey et al. |
| 6,073,266 A | 6/2000 | Ahmed et al. |
| 6,073,840 A | 6/2000 | Marion |
| 6,075,451 A | 6/2000 | Lebowitz et al. |
| 6,078,251 A | 6/2000 | Landt et al. |
| 6,084,867 A | 7/2000 | Meier |
| 6,087,957 A | 7/2000 | Gray |
| 6,088,659 A | 7/2000 | Kelley et al. |
| 6,094,622 A | 7/2000 | Hubbard et al. |
| 6,097,703 A | 8/2000 | Larsen et al. |
| 6,100,816 A | 8/2000 | Moore |
| 6,100,817 A | 8/2000 | Mason, Jr. et al. |
| 6,101,427 A | 8/2000 | Yang |
| 6,101,445 A | 8/2000 | Alvarado et al. |

| | | |
|---|---|---|
| 6,108,614 A | 8/2000 | Lincoln et al. |
| 6,112,983 A | 9/2000 | D'Anniballe et al. |
| 6,115,393 A | 9/2000 | Engel et al. |
| 6,115,580 A | 9/2000 | Chuprun et al. |
| 6,119,076 A | 9/2000 | Williams et al. |
| 6,121,593 A | 9/2000 | Mansbery et al. |
| 6,121,885 A | 9/2000 | Masone et al. |
| 6,122,759 A | 9/2000 | Ayanoglu et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,133,850 A | 10/2000 | Moore |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,163,276 A | 12/2000 | Irving et al. |
| 6,167,239 A | 12/2000 | Wright et al. |
| 6,169,484 B1 * | 1/2001 | Schuchman et al. ........ 340/573.1 |
| 6,172,616 B1 | 1/2001 | Johnson et al. |
| 6,173,159 B1 | 1/2001 | Wright et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,178,173 B1 | 1/2001 | Mundwiler et al. |
| 6,181,255 B1 | 1/2001 | Crimmins et al. |
| 6,181,284 B1 | 1/2001 | Madsen et al. |
| 6,181,981 B1 | 1/2001 | Varga et al. |
| 6,185,307 B1 | 2/2001 | Johnson, Jr. |
| 6,188,354 B1 | 2/2001 | Soliman et al. |
| 6,188,675 B1 | 2/2001 | Casper et al. |
| 6,192,282 B1 | 2/2001 | Smith et al. |
| 6,192,390 B1 | 2/2001 | Berger et al. |
| 6,195,018 B1 | 2/2001 | Ragle et al. |
| 6,198,390 B1 | 3/2001 | Schlager et al. |
| 6,199,068 B1 | 3/2001 | Carpenter |
| 6,201,962 B1 | 3/2001 | Sturniolo et al. |
| 6,205,143 B1 | 3/2001 | Lemieux |
| 6,208,247 B1 | 3/2001 | Agre et al. |
| 6,208,266 B1 | 3/2001 | Lyons et al. |
| 6,212,175 B1 | 4/2001 | Harsch |
| 6,215,404 B1 | 4/2001 | Morales |
| 6,215,440 B1 | 4/2001 | Geldart et al. |
| 6,218,953 B1 | 4/2001 | Petite |
| 6,218,958 B1 | 4/2001 | Eichstaedt et al. |
| 6,218,983 B1 | 4/2001 | Kerry et al. |
| 6,219,409 B1 | 4/2001 | Smith et al. |
| 6,229,439 B1 | 5/2001 | Tice |
| 6,233,327 B1 | 5/2001 | Petite |
| 6,234,111 B1 | 5/2001 | Ulman et al. |
| 6,236,332 B1 | 5/2001 | Conkright et al. |
| 6,243,010 B1 | 6/2001 | Addy et al. |
| 6,246,676 B1 | 6/2001 | Chen et al. |
| 6,246,677 B1 | 6/2001 | Nap et al. |
| 6,246,886 B1 | 6/2001 | Oliva |
| 6,249,516 B1 | 6/2001 | Brownrigg et al. |
| 6,259,369 B1 | 7/2001 | Monico |
| 6,271,752 B1 | 8/2001 | Vaios |
| 6,275,166 B1 | 8/2001 | del Castillo et al. |
| 6,275,707 B1 | 8/2001 | Reed et al. |
| 6,286,050 B1 | 9/2001 | Pullen et al. |
| 6,286,756 B1 | 9/2001 | Stinson et al. |
| 6,288,634 B1 | 9/2001 | Weiss et al. |
| 6,288,641 B1 | 9/2001 | Casais |
| 6,295,291 B1 | 9/2001 | Larkins |
| 6,301,514 B1 | 10/2001 | Canada et al. |
| 6,304,556 B1 | 10/2001 | Haas |
| 6,305,205 B1 | 10/2001 | Derks et al. |
| 6,305,602 B1 | 10/2001 | Grabowski et al. |
| 6,307,843 B1 | 10/2001 | Okanoue |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,327,245 B1 | 12/2001 | Satyanarayana et al. |
| 6,329,902 B1 | 12/2001 | Lee et al. |
| 6,334,117 B1 | 12/2001 | Covert et al. |
| 6,351,223 B1 | 2/2002 | DeWeerd et al. |
| 6,356,205 B1 | 3/2002 | Salvo et al. |
| 6,357,034 B1 | 3/2002 | Muller et al. |
| 6,362,745 B1 | 3/2002 | Davis |
| 6,363,057 B1 | 3/2002 | Ardalan et al. |
| 6,363,422 B1 | 3/2002 | Hunter et al. |
| 6,366,217 B1 | 4/2002 | Cunningham et al. |
| 6,366,622 B1 | 4/2002 | Brown et al. |
| 6,369,769 B1 | 4/2002 | Nap et al. |
| 6,370,489 B1 | 4/2002 | Williams et al. |
| 6,373,399 B1 | 4/2002 | Johnson et al. |
| 6,380,851 B1 | 4/2002 | Gilbert et al. |
| 6,384,722 B1 | 5/2002 | Williams |
| 6,392,692 B1 | 5/2002 | Monroe |
| 6,393,341 B1 | 5/2002 | Lawrence et al. |
| 6,393,381 B1 | 5/2002 | Williams et al. |
| 6,393,382 B1 | 5/2002 | Williams et al. |
| 6,396,839 B1 | 5/2002 | Ardalan et al. |
| 6,400,819 B1 | 6/2002 | Nakano et al. |
| 6,401,081 B1 | 6/2002 | Montgomery et al. |
| 6,405,018 B1 | 6/2002 | Reudink et al. |
| 6,411,889 B1 | 6/2002 | Mizunuma et al. |
| 6,415,155 B1 | 7/2002 | Koshima et al. |
| 6,415,245 B2 | 7/2002 | Williams et al. |
| 6,416,471 B1 | 7/2002 | Kumar et al. |
| 6,421,354 B1 | 7/2002 | Godlewski |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,441,723 B1 | 8/2002 | Mansfield, Jr. et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,496,696 B1 | 12/2002 | Melnik |
| 6,504,357 B1 | 1/2003 | Hemminger et al. |
| 6,504,834 B1 | 1/2003 | Fifield |
| 6,507,794 B1 | 1/2003 | Hubbard et al. |
| 6,509,722 B2 | 1/2003 | Lopata |
| 6,513,060 B1 | 1/2003 | Nixon et al. |
| 6,515,586 B1 | 2/2003 | Wymore |
| 6,519,568 B1 | 2/2003 | Harvey et al. |
| 6,532,077 B1 | 3/2003 | Arakawa |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Mastronardi et al. |
| 6,574,234 B1 | 6/2003 | Myer et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,654,357 B1 | 11/2003 | Wiedeman |
| 6,665,278 B2 | 12/2003 | Grayson |
| 6,671,586 B2 | 12/2003 | Davis et al. |
| 6,671,819 B1 | 12/2003 | Passman et al. |
| 6,674,403 B2 | 1/2004 | Gray et al. |
| 6,678,255 B1 | 1/2004 | Kuriyan |
| 6,678,285 B1 | 1/2004 | Garg |

| Patent Number | Date | Inventor(s) |
|---|---|---|
| 6,691,173 B2 | 2/2004 | Morris et al. |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,751,196 B1 | 6/2004 | Hulyalkar et al. |
| 6,771,981 B1 | 8/2004 | Zalewski et al. |
| 6,775,258 B1 | 8/2004 | van Valkenburg et al. |
| 6,804,532 B1 | 10/2004 | Moon et al. |
| 6,816,088 B1 | 11/2004 | Knoska et al. |
| 6,826,607 B1 | 11/2004 | Gelvin et al. |
| 6,832,251 B1 | 12/2004 | Gelvin et al. |
| 6,842,430 B1 | 1/2005 | Melnik |
| 6,858,876 B2 | 2/2005 | Gordon et al. |
| 6,859,831 B1 | 2/2005 | Gelvin et al. |
| 6,888,876 B1 | 5/2005 | Mason, Jr. et al. |
| 6,891,838 B1 | 5/2005 | Petite et al. |
| 6,900,737 B1 | 5/2005 | Ardalan et al. |
| 6,906,636 B1 | 6/2005 | Kraml |
| 6,914,533 B2 | 7/2005 | Petite |
| 6,914,893 B2 | 7/2005 | Petite |
| 6,922,558 B2 | 7/2005 | Delp et al. |
| 6,959,550 B2 | 11/2005 | Freeman et al. |
| 6,970,434 B1 | 11/2005 | Mahany et al. |
| 7,020,701 B1 | 3/2006 | Gelvin et al. |
| 7,027,416 B1 | 4/2006 | Kriz |
| 7,027,773 B1 | 4/2006 | McMillin |
| 7,053,767 B2 | 5/2006 | Petite et al. |
| 7,054,271 B2 | 5/2006 | Brownrigg et al. |
| 7,064,679 B2 | 6/2006 | Ehrke et al. |
| 7,103,511 B2 | 9/2006 | Petite |
| 7,117,239 B1 | 10/2006 | Hansen |
| 7,181,501 B2 | 2/2007 | Defosse |
| 7,254,372 B2 | 8/2007 | Janusz et al. |
| 7,274,332 B1 * | 9/2007 | Dupray ......................... 342/450 |
| 7,304,587 B2 | 12/2007 | Boaz |
| 7,349,682 B1 | 3/2008 | Bennett, III et al. |
| 7,424,527 B2 | 9/2008 | Petite |
| 7,468,661 B2 | 12/2008 | Petite et al. |
| 7,480,501 B2 | 1/2009 | Petite |
| 7,484,008 B1 | 1/2009 | Gelvin et al. |
| 7,573,813 B2 | 8/2009 | Melnik |
| 7,653,394 B2 | 1/2010 | McMillin |
| 7,739,378 B2 | 6/2010 | Petite |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite et al. |
| 2002/0013679 A1 | 1/2002 | Petite |
| 2002/0016829 A1 | 2/2002 | Defosse |
| 2002/0019725 A1 | 2/2002 | Petite |
| 2002/0027504 A1 | 3/2002 | Davis et al. |
| 2002/0031101 A1 | 3/2002 | Petite et al. |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite et al. |
| 2002/0193144 A1 | 12/2002 | Belski et al. |
| 2003/0001754 A1 | 1/2003 | Johnson et al. |
| 2003/0018922 A1 * | 1/2003 | Litwin et al. ................. 713/310 |
| 2003/0023146 A1 | 1/2003 | Shusterman |
| 2003/0028632 A1 | 2/2003 | Davis |
| 2003/0030926 A1 | 2/2003 | Aguren et al. |
| 2003/0034900 A1 | 2/2003 | Han |
| 2003/0035438 A1 | 2/2003 | Larsson |
| 2003/0036822 A1 * | 2/2003 | Davis et al. ................... 700/295 |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0078029 A1 | 4/2003 | Petite |
| 2003/0093484 A1 | 5/2003 | Petite |
| 2003/0129977 A1 * | 7/2003 | Dolwin ......................... 455/422 |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo et al. |
| 2004/0047324 A1 | 3/2004 | Diener |
| 2004/0053639 A1 | 3/2004 | Petite et al. |
| 2004/0090950 A1 | 5/2004 | Lauber et al. |
| 2004/0113810 A1 | 6/2004 | Mason, Jr. et al. |
| 2004/0131125 A1 | 7/2004 | Sanderford, Jr. et al. |
| 2004/0133917 A1 | 7/2004 | Schilling |
| 2004/0183687 A1 | 9/2004 | Petite et al. |
| 2004/0228330 A1 | 11/2004 | Kubler et al. |
| 2005/0017068 A1 | 1/2005 | Zalewski et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0243867 A1 | 11/2005 | Petite |
| 2005/0270173 A1 | 12/2005 | Boaz |
| 2006/0095876 A1 | 5/2006 | Chandra |
| 2007/0112907 A1 | 5/2007 | Defosse |
| 2008/0186898 A1 | 8/2008 | Petite |
| 2009/0006617 A1 | 1/2009 | Petite |
| 2009/0068947 A1 | 3/2009 | Petite |
| 2009/0096605 A1 | 4/2009 | Petite |
| 2009/0215424 A1 | 8/2009 | Petite |
| 2009/0227224 A1 * | 9/2009 | Aftelak et al. ............. 455/404.2 |
| 2009/0243840 A1 | 10/2009 | Petite et al. |
| 2010/0250054 A1 | 9/2010 | Petite |

FOREIGN PATENT DOCUMENTS

| | | |
|---|---|---|
| EP | 0663746 B1 | 7/1995 |
| EP | 0718954 A1 | 6/1996 |
| EP | 0740873 B1 | 11/1996 |
| EP | 0749259 A2 | 12/1996 |
| EP | 0749260 A2 | 12/1996 |
| EP | 0766489 A2 | 4/1997 |
| EP | 0768777 A2 | 4/1997 |
| EP | 0812502 B1 | 12/1997 |
| EP | 0825577 A1 | 2/1998 |
| EP | 0999717 A2 | 5/2000 |
| EP | 1096454 A2 | 5/2001 |
| FR | 2817110 A1 | 5/2002 |
| GB | 2229302 A | 9/1990 |
| GB | 2247761 A | 3/1992 |
| GB | 2262683 A | 6/1993 |
| GB | 2297663 A | 8/1996 |
| GB | 2310779 A | 9/1997 |
| GB | 2326002 A | 12/1998 |
| GB | 2336272 A | 10/1999 |
| GB | 2352004 A | 1/2001 |
| GB | 2352590 A | 1/2001 |
| JP | 60261288 A | 12/1985 |
| JP | 1255100 A | 10/1989 |
| JP | 11353573 A | 12/1999 |
| JP | 2000113590 A | 4/2000 |
| JP | 2001063425 A | 3/2001 |
| JP | 2001088401 A | 4/2001 |
| JP | 2001309069 A | 11/2001 |
| JP | 2001319284 A | 11/2001 |
| JP | 2001357483 A | 12/2001 |
| JP | 2002007672 A | 1/2002 |
| JP | 2002007826 A | 1/2002 |
| JP | 2002085354 A | 3/2002 |
| JP | 2002171354 A | 6/2002 |
| KR | 2001025431 A | 4/2001 |
| WO | WO 90/13197 | 11/1990 |
| WO | WO 95/12942 | 5/1995 |
| WO | WO 95/24177 | 9/1995 |
| WO | WO 95/34177 | 12/1995 |
| WO | WO 96/10307 | 4/1996 |
| WO | WO 98/00056 | 1/1998 |
| WO | WO 98/10393 | 3/1998 |
| WO | WO 98/37528 | 8/1998 |
| WO | WO 98/45717 | 10/1998 |

| | | |
|---|---|---|
| WO | WO 99/13426 | 3/1999 |
| WO | WO 00/23956 | 4/2000 |
| WO | WO 00/36812 | 6/2000 |
| WO | WO 00/55825 | 9/2000 |
| WO | WO 01/15114 | 3/2001 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | WO 2004/002014 | 12/2003 |

OTHER PUBLICATIONS

Haartsen, "Bluetooth—The Universal Radio Interface for Ad Hoc, Wireless Connectivity;" Ericsson Review No. 3, 1998; pp. 110-117.
Hahn et al., "Packet Radio Network Routing Algorithms: A Survey," IEEE Communications Magazine, vol. 22, No. 11, Nov. 1984, pp. 41-47.
HAI Omni, Features & Specifications, Home Automation, Inc., available at http://web.archive.org/web/19970216055832/www.homeauto.com/omni on Feb. 17, 2009, pp. 1-6.
Hall, "Tactical Internet System Architecture for Task Force XXI," 1996 IEEE, pp. 219-230.
Hamilton et al., "Optimal Routing in Multihop Packet Radio Networks," 1990 IEEE, pp. 389-396.
Harrington, "More Visible Vehicles," ActionLINE, Jul. 2003 (4 pages).
Harrison, "Microwave Radio in the British Telecom Access Network," Second IEE National Conference on Telecommunications, Conference Publication No. 300, Date: unknown, pp. 208-213.
Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.
Hedrick, "Routing Information Protocol" (Jun. 1988), RFC 1058, available at Http://Tools.Ietf.Org/Html/Rfc1058, Jun. 24, 2009, pp. 1-34.
Hinden et al., "The DARPA Internet Gateway," RFC 823, Publisher: unknown, Sep. 1982, pp. 1-43.
Hogan, "Call of the Wi-Fi," Entrepeneur Magazine, Sep. 2003, pp. 39-42.
Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.com/_/print/PrintArticle.aspx?id=18414624, pp. 1-3.
Home Automation Inc., "HAI Company Background;" Publisher: Unknown, Date: unknown, pp. 1-2.
Home Toys, Inc., "HTINews Review," available at http://www.hometoys.com/htinews/aug97/reviews/homevis/homevis1.htm on Mar. 2, 2009, pp. 1-26.
Honeywell, Inc., "Honeywell Home Control Version 2.0 Demonstratin," available at http://web.archive.org/web/19980630195929/www.hbc.honeywell.com/ on Mar. 5, 2009 (7 pages).
Hong et al., "U.S. Lightning Market Characterization, vol. II.: Energy Efficient Lighting Technology Options," Sep. 30, 2005, Reportprepared for Building Technologies Program, Office of Energy Efficiency and Renewable Energy, pp. 1-36.
Hotel Technology Next Generation, "A Guide for Understanding Wireless in Hospitality," an HTNG White Paper, Jun. 2006 (Jayne O'Neill, ed.), pp. 1-77.
Hruschka et al., "Packet Radio, Drahtlose Datenubertragung im Amateurfunk," Elektor, Jun. 1991, pp. 54-57 and 84.
Hsu et al., "Wireless Communications for Smart Dust," Berkeley: UCLA, Jan. 30, 1998, pp. 1-20.
Hubner et al., "A Distributed Multihop Protocol for Mobile Stations to Contact a Stationary Infrastructure," The Third IEE Conference on Telecommunications, Conference Publication No. 331, Date: unknown, pp. 204-207.
Internet Protocol, Version 4 (IPv4), RFC791 (Sep. 1981).
Internet Protocol, Version 6 (IPv6) Specification, RFC 2460 (Dec. 1998).
Internet Protocol; DARPA Internet Program Protocol Specification, John Postel Editor; Information Sciences Institute, University of Southern California, California; Sep. 1981; pp. 1-45.
Iwata et al., "Scalable Routing Strategies for Ad Hoc Wireless Networks," IEEE Journal on Selected Areas in Communications, vol. 17, No. 8, Aug. 1999, pp. 1369-1379.
Jacobsen, "The Building Blocks of a Smart Sensor for Distributed Control Networks," IEEE Technical Applications Conference Northcon, Nov. 4-6, 1998, pp. 285-290.
JDS Technologies, "Infrafred Xpander, IR-XP2, User Manual," Date: unknown, pp. 1-15.
JDS Technologies, "Model: 8R5PR, 8 Channel RS485 Relay Xpander, Installation Manual," pp. 1-5.
JDS Technologies, "Stargate 8 Channel RS-485 HUB," Publisher: unknown, Date: unknown, pp. 1.
JDS Technologies, "Stargate Interactive Automation System," 1998, pp. 1-2.
JDS Technologies, "Stargate, Operation Manual," Mar. 2000, pp. 1-114.
JDS Technologies, "Stargate-IP System Layout," Publisher: unknown; Date: unknown, pp. 1.
JDS Technologies, "Support: Protocol Specifications," available at http://jdstechnologies.com/protocol.htm, on Feb. 16, 2009, pp. 1-32.
JDS Technologies, "TimeCommander, TimeCommander Plus, User Guide," Jun. 1998, pp. 1-95.
JDS Technologies, "Web Xpander, Installation and Operation Manual," Feb. 2004, pp. 1-34.
Jimenez-Cedeno et al., "Centralized Packet Radio Network: A Communication Approach Suited for Data Collection in a Real-Time Flash Flood Prediction System," ACM-SAC 1993, pp. 709-713.
Johnson Controls, Inc., LonWorks® Digital Controller, 1998, pp. 1-12.
Johnson et al., "Dynamic Source Routing in Ad Hoc Wireless Networks", Computer Science Department, Carnegie Mellon University, A Chapter in Mobile Computing, vol. 353, pp. 1-18, 1996.
Johnson et al., "Dynamic Source Routing in Ad Hoc Wireless Networks," reprinted in Mobile Computing; Tomasz Imielinski and Hank Korth eds., 1996; Kluwer Academic Publishers, pp. 153-181.
Johnson et al., "Protocols for Adaptive Wireless and Mobile Networking," IEEE Personal Communications, 3(1), Feb. 1996, pp. 1-18.
Johnson et al., "Route Optimization in Mobile IP," Internet Draft (Nov. 28, 1994), available at http://www.monarch.cs.rice.edu/internet-drafts/draft-ietf-mobileip-optim-00.txt., Sep. 26, 2009, pp. 1-29.
Johnson, "Mobile Host Internetworking Using IP Loose Source Routing," Carnegie Mellon University CMU-CS-93-128, DARPA Order No. 7330, Feb. 1993, pp. 1-18.
Johnson, "Routing in Ad Hoc Networks of Mobile Hosts," 1995 IEEE, pp. 158-163.
Johnson, "Scalable and Robust Internetwork Routing for Mobile Hosts," 1994 IEEE, pp. 1-11.
Jubin et al., "The DARPA Packet Radio Network Protocols," Proceedings of the IEEE, vol. 75, No. 1, Jan. 1987, pp. 21-32.
Jubin, "Current Packet Radio Network Protocols," Proc. of the IEEE Infocom (Mar. 26-28, 1985), pp. 86-92.
Kaashoek et al., "FLIP: An Internetwork Protocol for Supporting Distributed Systems," ACM Transactions on Computer Systems, vol. 11, No. 1, Feb. 1993, pp. 73-106.
Kaiser et al., "Detailed Progress Report—LWIM Applications, Systems Verification and Field Test," UCLA.
Kaiser et al., "Low Power Wireless Integrated Microsensors (LWIM), BAA 94-15 Proposal Abstract," UCLA Electrical Engineering Department, Rockwell Science Center, Date: unknown, 15 pages.
Kaiser et al., "Low Power Wireless Integrated Microsensors (LWIM), Request for Support to Project", UCLA Electrical Engineering Department, Rockwell Science Center, Sep. 13, 1994, 71 pages.
Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.
Kaiser et al., "Program Mission: Low Power Wireless Integrated Microsensor (LWIM)," UCLA, Date: unknown.
Kaiser, "Circuits and Systems for Embedded Wireless Devices: Low Power Sensor, Interface, Signal Processing, Communication, and Network Systems," École Polytechnique Fédérale de Lausanne, pp. 1-40.
Nunavut et al., Web Based Remote Security System (WRSS) Model Development, IEEE, Apr. 7-9, 2000, pp. 379-382.
X10, "CK11A ActiveHome, Home Automation System, Owner's Manual," Oct. 23, 1997, pp. 1-56.
X10.com: The Supersite for Home Automation, "What's in the Kit," available at http://web.archive.org/web/19991111133453/www.com/products/x, on Mar. 2, 2009, pp. 1-2.
X10.com: The Supersite for Home Automation, "Wireless Remote Control System (RC5000)," available at http://web.archive.org/web/1999111453227/www.x10.com/products/x1 on Mar. 2, 2009, pp. 1.
X10: The Supersite for Home Automation, "Transceiver Module," available at http://web.archive.org/web/20000229141517/www.x10.com/products/x on Mar. 2, 2009, pp. 1.
Xecom Incorporated, "EX900S Smart Spread Spectrum Transceiver," Nov. 2003 (13 pages).
Yadav, "Border Security Using Wireless Integrated Network Sensors (WINS)"; ECE 7th SEM, UE6551.
Young, "USAP: A Unifying Dynamic Distributed Mulitchannel TDMA Slot Assignment Protocol," Rockwell International Communication Systems Division, IEEE (1996).
Yu, "Target Identification Processor for Wireless Sensor Network," Dissertation, Los Angeles: University of California, 1999, pp. 1-110.
Zander et al., "The SOFTNET Project: A Retrospect," 1988 IEEE, pp. 343-345.
Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.
Zimmermann et al., "Daten Funken, Modacom-Telekom-Datenfunkdienst;" Bates SENSUS15305-15309, Publisher: unknown; Date: unknown, pp. 1-6.
Kahn et al., Advances in Packet Radio Technology, Proceedings of the IEEE, vol. 66, No. 11, pp. 1468-1496 (Nov. 1978).
Agre et al., "Development Platform for Self-Organizing Wireless Sensor Networks," Rockwell Science Center and UCLA, Date:Apr. 1999, pp. 257-268.
Kahn, "The Organization of Computer Resources into a Packet Radio Network," IEEE, Jan. 1977, vol. Com-25 No. 1, pp. 169-178.
Rosen, "Exterior Gateway Protocol (EGP)," Bolt Beranek and Newman Inc., Oct. 1982, pp. 1-48.
ADEMCO Group, Control/Communicator 5110XM Installation Instructions, Apr. 1996, Ademco Group, Author: unknown, pp. 1-76.
ADEMCO Group, Vista-128FB Commercial Fire and Burglary Partitioned Security System Quick Start Guide, Oct. 1998, ADEMCO Group, Author: unknown, pp. 1-68.
Brain, "How Motes Work: A Typical Mote," available at http://computer.howstuffworks.com/mote4.htm, on Feb. 25, 2010, pp. 1-2.
Cook et al., Water Distribution and Control by Wireless Networking, Electronic Systems Technology; Date: unknown, pp. 1-3.
U.S. Appl. No. 12/477,329 Non-Final Office Action dated Aug. 19, 2010.
U.S. Appl. No. 12/477,329 Non-Final Office Action dated Dec. 28, 2009.
U.S. Appl. No. 12/356,358 Final Office Action dated Sep. 15, 2010.
U.S. Appl. No. 12/356,358 Non-Final Office Action dated Jan. 21, 2010.
U.S. Appl. No. 10/792,608 Non-Final Office Action dated Jan. 22, 2010.
U.S. Appl. No. 10/792,608 Final Office Action dated Sep. 2, 2009.
U.S. Appl. No. 10/792,608 Non-Final Office Action dated Feb. 3, 2009.
U.S. Appl. No. 10/792,608 Final Office Action dated Aug. 19, 2008.
U.S. Appl. No. 12/792,608 Restriction Requirement dated Dec. 21, 2007.
U.S. Appl. No. 10/792,608 Non-Final Office Action dated Mar. 21, 2007.
U.S. Appl. No. 12/816,266 Non-Final Office Action dated Oct. 12, 2010.
U.S. Appl. No. 11/814,632 Final Office Action dated Dec. 7, 2010.
U.S. Appl. No. 11/814,632 Non-Final Office Action dated Jul. 13, 2010.
U.S. Appl. No. 11/125,009 Non-Final Office Action dated Dec. 9, 2010.
U.S. Appl. No. 11/125,009 Non-Final Office Action dated Mar. 1, 2010.
U.S. Appl. No. 11/125,009 Non-Final Office Action dated Apr. 6, 2009.
U.S. Appl. No. 11/125,009 Non-Final Office Action dated Oct. 1, 2008.
U.S. Appl. No. 11/125,009 Notice of Allowance dated Sep. 21, 2009.
U.S. Appl. No. 12/169,536 Non-Final Office Action dated Oct. 20, 2010.
U.S. Appl. No. 12/689,220 Non-Final Office Action dated Dec. 15, 2010.
U.S. Appl. No. 11/300,902 Non-Final Office Action dated Aug. 6, 2010.
U.S. Appl. No. 11/300,902 Non-Final Office Action dated Nov. 17, 2009.
U.S. Appl. No. 11/300,902 Non-Final Office Action dated Oct. 7, 2008.
U.S. Appl. No. 11/300,902 Final Office Action dated Jun. 4, 2008.
U.S. Appl. No. 11/300,902 Non-Final Office Action dated Oct. 11, 2007.
U.S. Appl. No. 11/300,902 Advisory Action dated Aug. 11, 2008.
U.S. Appl. No. 12/482,892 Non-Final Office Action dated Dec. 13, 2010.
MacGregor et al., "Multiple Control Stations in Packet Radio Networks", Bolt, Beranek and Newman, Inc., Cambridge, MA, IEEE 1982, pp. 10.3-1-10.3-5, 1982.
Mak et al., "Design Considerations for Implementation of Large Scale Automatic Meter Reading Systems," IEEE Transactions on Power Delivery, vol. 10, No. 1, Jan. 1995, pp. 97-103.
Malkin, "RFC 2453, RIP Version 2 (Nov. 1998)," available at http://tools.ietf.org/html/rfc2453, Jun. 24, 2009, pp. 1-40.
Maltz et al., "Experiences Designing and Building a Multi-Hop Wireless Ad Hoc Network Testbed", School of Computer Science, Carnegie Mellon University, pp. 1-22, Mar. 5, 1999.
Maltz, "On-Demand Routing in Multi-Hop Wireless Mobile Ad Hoc Networks," Thesis, May 2001, pp. 1-192.
Marcy et al., "Wireless Sensor Networks for Area Monitoring and lintegrated Vehicle Health Management Applications," Rockwell Science Center, Thousand Oaks, CA, AIAA-99/4557; Date: unknown, pp. 1-11.
Markie et al., "LonWorks and PC/104: A winning combination," PC/104 Embedded Solutions, Summer 1998, pp. 1-8.
Martel et al., "Home Automation Report: A Modular Minimum Complexity, High-Resolution and Low CostField Device Implementation for Home Automation and Healthcare," MIT; Publisher: unknown; Mar. 31, 1998; pp. 1-29.
McQuillan et al., "The ARPA Network Design Decisions," Computer Networks, vol. 1, No. 5, Aug. 1977 pp. 243-289.
McQuillan et al., "The New Routing Algorithm for the ARPANET," IEEE Transactions on Communications, vol. COM-28, No. 5, May 1980, pp. 711-719.
Mills, "Exterior Gateway Protocol Formal Specification" (Apr. 1984), RFC 904, available at http://tools.ietf.org/html/rfc904, Jun. 24, 2009, pp. 1-32.
Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).
Moy, "RFC 2328, OSPF Version 2 (Apr. 1998)," available at http://tools.ietf.org/html/rfc2328, Jun. 24, 2009, pp. 1-245.
Mozer et al., "The Neural Network House: An Overview," in L. Niklasson & Boden (eds.), Current trends in connectionism (pp. 371-380); Hillsdale: Erlbaun, 1995; pp. 1-9.
Murthy et al., "An Efficient Routing Protocol for Wireless Networks, Mobile Networks and Applications 1," (1996), pp. 183-197.

Natkunanathan et al. "WINS: Signal Search Engine for Signal Classification," EED, UCLA; Date: unknown; pp. 1-6.
Natkunanathan et al., "A Signal Search Engine for Wireless Integrated Network Sensors," EED, UCLA Electrical Engineering Department;; Date: unkown; pp. 1-4.
Negus et al., "HomeRF™ and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.
Negus et al., "HomeRF™ and SWAP: Wireless Networking for the Connected Home," Mobile Computing and Communications Review, vol. 2, No. 4, Date: unknown, pp. 28-37.
NEXTGEN Searches, "IPCO v. The Wireless Sensor Network Industry? Special Report on IPCO v. Oncor et al.," Corporate Manager's Edition, 2009, pp. 1-16.
Nilsen et al., "Storage Monitoring Systems for the Year 2000," Dept. of Energy, Office of Scientific and Technical Information, Report No. Sand—97-8532C, available at http://www.osti.gov/bridge/product.biblio.jsp?query_id=3&page=0&osti_id=303988 (1997).
Ondo, "PLRS/JTIDS Hybrid," Filled Artillery Journal, Jan.-Feb. 1981, pp. 20-25.
Oran (ed.), "OSI IS-IS Intra-Domain Routing Protocol," RFC 1142 (Feb. 1990), available at http://tools.ietf.org/html/rfc1142, Jun. 24, 2009, pp. 1-665.
Park et al., "SensorSim: A Simulation Framework for Sensor Networks," ACM, 2000, pp. 104-111.
Perkins et al., "A Mobile Networking System Based on Internet Protocol," Publisher: unknown, Date: unknown, pp. 1-17.
Perkins et al., "Ad-Hoc On-Demand Distance Vector Routing "AODV"," http://moment.cs.ucsb.edu/AODV/aodv.html, Aug. 25, 2009, pp. 1-5.
Perkins et al., "Continuous, transparent network access for portable users, A Mobile Networking System Based on Internet Protocol," IEEE Personal Communications, First Quarter 1994, pp. 32-41.
Perkins et al., "Highly Dynamic Destination-Sequenced Distance-Vector Routing (DSDV) for Mobile Computers," SIGCOM Conference on Communications Architectures, Protocols ans Applications, London England UK (Aug. 1994); pp. 234-244.
Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.
Perkins et al., "RFC3561—Ad Hoc On-Demand Distance Vector (AODV) Routing (Jul. 2003)," available at http://tools.ietf.org/html?rfc 3561, Aug. 25, 2009, pp. 1-38.
Pittway Corporation, "Company History," available at http://www.fundinguniverse.com/company-histories/Pittway-Corporation Mar. 6, 2009, pp. 1-5.
Plaintiffs' Opening Markman Brief in Support of Their Proposed Claim Constructions, filed by the patent owner and its co-plaintiff in *SIPCO LLC et al.* v. *The Toro Co. et al.*, Case No. 2:08-CV-00505-TJS (E.D. Pa.) filed on Sep. 26, 2008.
Pleading—Defendant DIGI International Inc.'s First Amended Answer and Defenses of *SIPCO, LLC* v. *Control4 Corporation et al.*, Civil Action No. 6:10-cv-249, currently pending in the U.S. District Court for the Eastern District of Texas, Tyler Division, filed Nov. 22, 2010, pp. 1-27.
Pleading—Defendant Siemens Industry, Inc.'s First Amended Answer and Defenses of *SIPCO, LLC* v. *Control4 Corporation et al.*, Civil Action No. 6:10-cv-249, currently pending in the U.S. District Court for the Eastern District of Texas, Tyler Division, filed Nov. 22, 2010, pp. 1-27.
Pleading—Defendant The Toro Company, The Toro Company's Second Supplemented Objections and Answers to Plaintiffs SIPCO LLC and Advanced Sensor Technology, Inc.'s Interrogatory No. 4 to Defendant *The Toro Company of SIPCO LLC, et al.* v. *The Toro Company et al.* Civil Action No. 08-CV-00505-TJS (pp. 1-9).
Pleading—Defendant The Toro Company, Third Supplemented Objections and Answers to Plaintiffs SIPCO LLC and Advanced Sensor Technology, Inc.'s Interrogatory No. 4 to Defendant *The Toro Company of SIPCO LLC, et al.* v. *The Toro Company et al.*, Civil Action No. 08-CV-00505-TJS (pp. 1-9).
Pleading—Expert Report of Randy H. Katz, Ph. D, of *SIPCO, LLC et al.* v. *The Toro Company et al.*, Case No. 2:08-cv-00505.
Poor, Robert D., "Hyphos: A Self-Organizing, Wireless Network," Massachusetts Institute of Technology (Jun. 1997).
Postel (ed.), "Transmission Control Protocol, Version 4," RFC793, available at http://www.faqs.org/rfcs/rfc793.html, Sep. 1981, pp. 1-85.
Postel (Editor), "Internet Protocol, DARPA Internet Program Protocol Specification," RFC 791 (Sep. 1981), Information Sciences Institute, University of So. Cal., pp. 1-45.
Pottie et al., "Adaptive Wireless Arrays for Interactive RSTA in SUO (AWAIRS)," UCLA, Electrical Engineering Department; Date: unknown, pp. 1-20.
Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.
Pottie et al., "WINS: Principles and Practice," EDD, UCLA; Date: unknown, pp. 1-10.
Pottie et al., "Wireless Integrated Network Sensors," Communications of the ACM, vol. 43, No. 5, May 2000, pp. 51-58.
Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.
Pottie, "AWAIRS: Mini-Site Review, Project Status," UCLA: Rockwell Science Center, Feb. 23, 1998, pp. 1-58.
Pottie, "Hierarchical Information Processing in Distributed Sensor Networks," ISIT, Aug. 16-21, 1998, IEEE, 1998, pp. 163.
Pottie, "R&D Quarterly and Annual Status Report," SPAWAR (contractor), Apr. 31, 1999.
Pottie, "Wireless Sensor Networks," ITW 1998, Jun. 22-26, 1998, available at http://dantzig.ee.ucla.edu/oclab/Pottie.html, 2 pages.
Printout of 47 C.F.R. 15 (131 pages).
Rabaey et al., "PicoRadio Support Ad Hoc Ultra-Low Power Wireless Networking," Computer, IEEE, Jul. 2000, pp. 42-48.
Radlherr, "Datentransfer Ohne Draht und Telefon," Funkschau, Nov. 1991, pp. 49-52.
Raji, "Control Networks and the Internet, Rev. 2.0," Echelon Corp., 1998, pp. 1-39.
Raji, "End-to-End Solutions with LonWorks® Control Technology: Any Point, Any Time, Any Where," Echelon Corp.;, 1998, pp. 1-30.
Raji, "Control Networks and the Internet," Echelon Corp., Rev. 2.0, available at http://www.echelon.com/solutions/opensystems/papers/Control_Internet.pdf (1998).
Rants and Ramblings, "Go Wireless . . . At a Payphone," May 10, 2003, http://www.morethanthis.net/blog/archives/2003/05/10/000301.html (2 pages).
"1997 Project Summary, Held Untethered Nodes, University of California at Los Angeles," available at http://web.archive.org/web/199812052324758/http://www.darpa.mil/leaving.asp?url=http://www.janet.ucla.edu/glomo, Jul. 25, 2008, pp. 1-5.
"1997 Project Summary, Mobile Versatile Radios (MoVeR), University of California at Los Angeles," available at http://web.archive.org/web/19990222140122/http://www.darpa.mil/leaving.asp?url=http://www.janet.ucla.edu/, Jul. 25, 2008, pp. 1-4.
"1997 Project Summary, Towards a Wireless Overlay Internetworking Architecture, University of California at Berkeley," available at http://web.archive.org/web/19990202065939/http://www.darpa.mil/leaving.asp?url=http://daedalus.cs.berkeley.edu, Jul. 25, 2008, pp. 1-8.
"3Com Invests in Coactive Networks," Coactive (press release), Author: unknown, Dec. 14, 1999, pp. 1-4.
"5808 Photoelectric Smoke/Heat Detector with Built0in Wireless Transmitter Installation Instructions," Ademco, 1998.
"ABB Kent-Taylor Interfacing," Author: unknown, Engineering Report, No. 93-011, Jun. 18, 1996, pp. 1-9.
"AES Central Station Installation & Operation Manual, Document No. 40-0551e," AES Intellinet, Nov. 1996.
"AlarmNet-C Service Shutdown," Honeywell, Inc., Author: unknown, Date: unknown, pp. 1.

"Allen-Bradley Interfacing," Author: unknown, Engineering Report, No. 90-023, Jul. 21, 1999, pp. 1-11.
AN/TSQ-129 Position Location Reporting System (PLRS), Author: unknown, available at http://www.fas.org/man/dod-101/sys/land/plrs.htm on Feb. 22, 2010, pp. 1-3.
"AWAIRS Adaptive Wireless Arrays Interactive Recconaissance, Surveillance, and Target Acquisition in Small Unit Operations".
"Barrington Interface," Author: unknown, Engineering Report, No. 90-013, Revised: Oct. 1994, pp. 1.
Bell Canada launches public wireless Internet hotspot pilot, Dec. 10, 2002, http://www.bell.ca/3n/about/press/release/2002/pr_20021210.asp (3 pages).
"Bristol Babcock Interfacing," Author: unknown, Engineering Report, No. 95-001, Revised: Apr. 17, 1996, pp. 1-4.
"Caddx Installation Instructions Package, document No. 466-1486," Caddx Controls, Aug. 1998.
"Caddx Installation Instructions Package, document No. 466-1786," CADDX Installation Controls, Inc., Caddx Controls; Author: unknown; Aug. 1998, pp. 1-58.
"Caddx Installation Instructions Package," document No. 466-1786, CADDX Installation Controls, Inc., Caddx Controls; Author: unknown; Jul. 15, 1999, pp. 1-116.
"CADDX NetworX NX-8 Control/Communicator Installation Manual," Caddx Controls, 1996.
"Case Study: Genentech Uses Coactive's Technology to Centralize Monitor and Control Functions in a Mixed Legacy and New Equipment Environment," Coactive, Author: unknown, 1998, pp. 1-4.
"Case Study: Ingham Regional Medical Center Uses Coactive Technology to Monitor and Control Critical Power Generations in a Multi-Campus Environment," Coactive, 1998, pp. 1-4.
"Central Station Manual Section 1 System Overview, document No. 40-0551," AES Intellinet, Dec. 1996.
"Circon Systems Partners with Coactive Networks to Deliver Circon WebControl™," Coactive (press release), Author: unknown; Feb. 7, 2000, pp. 1-4.
"CIRCON Technology Connects Building Management Systems to Internet Using Coactive Routers," Coactive (press release), May 20, 1997.
"CISCO's John Chambers Discusses the Internet Consumer Revolution at CES Using Demo Based on Echelon's LonWorks Technology," Home Toys (press release), Jan. 8, 1999.
Coactive Bridges Gap between Control Systems and Corporate Data Networks with New Off-the-Shelf Router Family, Coactive (press release), Jun. 8, 1998.
"Coactive Enhances Residential Gateway to Enable Multiple Home Networks," Coactive (press release), Author: unknown; Jan. 6, 2000, pp. 1-4.
"Coactive Joins 3Com to Demonstrate Convergence of Control and Enterprise Networks at Retail Systems '98," Coactive (press release), Author: unknown, Jun. 16, 1998, pp. 1-4.
"Coactive Launches First Architecture to Support the Convergence Between Contol and IP Networks," Coactive (press release), Author: unknown, May 20, 1998, pp. 1-4.
"Coactive Leads Standardization Effort for Lon/Talk Routers," Coactive (press release), Author: unknown, May 20, 1997. pp. 3.
"Coactive Networks and Diverse Networks Team to Deliver End-to-End Infrastructure for Enabling the Digital Home," Coactive (press release), Author: unknown, Aug. 28, 2000, pp. 1-4.
"Coactive Networks and Innovex Technologies Deliver Internet Access to Home Security, Lighting and Climate Control," Coactive (press release), Author: unknown, Feb. 29, 2000, pp. 1-4.
"Coactive Networks and Silicon Energy Partner to Deliever an End-to-End Solution for Internet-Based Energy Monitoring and Analysis," Coactive (press release), Author: unknown, Sep. 19, 2000, pp. 1-4.
"Coactive Networks and Vicinium Systems team to Deliver a Complete Television-Based Interface to Digital Homes and Neighborhoods," Coactive (press release), Author: unknown, Jun. 19, 2000, pp. 1-4.
"Coactive Networks Announces First Shipments of Internet Gateway to Home Control Systems," Coactive (press release), Author: unknown, May 3, 1999, pp. 1-4.

"Coactive Networks Announces Formation of Technical Advisory Board," Coactive (press release), Author: unknown, Oct. 5, 1998, pp. 1-4.
"Coactive Networks Announces System Provider Partner Program," Coactive (press release), Author: unknown, Jan. 25, 1999, pp. 1-4.
"Coactive Networks Expands Support for Management and HMI Applications," Coactive (press release), Author: unknown, Nov. 2, 1998, pp. 1-4.
"Coactive Networks Names Gus Ezcurra Vice President of Sales," Coactive (press release), Author: unknown, Jul. 20, 1998, pp. 2.
"Coactive Networks Names Janice Roberts, 3Com Senior VP, to Board of Directors," Coactive (press release), Author: unknown, Jun. 2, 1998, pp. 2.
"Coactive Networks Powers Innovative Energy Management Solution," Coactive (press release), Author: unknown, Jan. 5, 2001, pp. 1-4.
"Coactive Networks President Named to LonMark Board of Directors," Coactive (press release), Jun. 14, 1998.
"Coactive Networks Shatters Price Barriers with New IP Gateway to Home Control Systems," Coactive (press release), Author: unknown, Oct. 26, 1998, pp. 1-4.
"Coactive Networks to Supply Internet-Based Home Gateways for up to 400,000 customers; First Phase of Deliveries Valued at US$2 Million," Coactive (press release), Author: unknown, Oct. 25, 1999.
"Coactive Networks Unveils the First Full-Service Residential Gateway," Coactive (press release), Author: unknown, May 3, 2000, pp. 1-4.
"Coactive Receives $2 Million in Funding," Coactive (press release), Oct. 15, 1997.
"Coactive Receives First Round of Venture Funding Investors Embrace Control Network Connectivity Technology," Coactive (press release), Author: unknown, Dec. 1, 1997, pp. 2.
"DSC-3500 Meeting the Control and Conservation Challenge," Johnson Controls, 1984, pp. 1-6.
"DTE Energy Technologies Selects Coactive Networks Internet Gateways to Roll Out New Class of E-Services to Businesses," Coactive (press release), Author: unknown, May 3, 2000, pp. 1-4.
"DTE Energy Technologies Selects Coactive Networks to Power Distributed Generation Solutions Worldwide," Coactive (press release), Author: unknown, Aug. 1, 2001, pp. 1-4.
"Echelon Corporation Demonstrates Internet Connectivity in Digital Home Applications at 1999 International Consumer Electronics Show," Home Toys (press release), Dec. 15, 1998.
"Eight Leading Controls Companies Join Coactive Partner Program," Coactive (press release), Author: unknown, Aug. 21, 2000, pp. 1-4.
"Enhanced Position Location Reporting System (EPLRS)," Author: unknown, available at http://www.globalsecurity.org/military/systems/ground/eplrs.htm on Feb. 22, 2010, pp. 1-3.
"ESTeem Engineering Report, Johnson Controls Interface No. 91-102," Author: unknown, Publisher: unknown, Nov. 1994, pp. 1-14.
"ESTeem Model 96F," Author: unknown, ESTeem Radios; Sep. 6, 1996, pp. 1-2.
"Foxboro Interfacing," Author: unknown, Engineering Report, No. 91-023, Revised: Jun. 19, 1996, pp. 1-5.
"GE Fanuc Interfacing," Author: unknown, Engineering Report, No. 91-010, Revised: Apr. 11, 1996, pp. 1-8.
"General PLC/RTU Interfacing," Author: unknown, Engineering Report, No. 92-010, Revised: Jun. 18, 1996, pp. 1-5.
"HAI Omni: Features & Specifications," Home Automation, Inc. (archived web page), 1997.
"Home Telemetry Gateway Specifications Sheet: Connector 2000 Series," Coactive 1998.
"How Does the New Power Company Deliver on the Promise of Energy Reconstructing?" NewPower (press release), Author: unknown, May 31, 2001, pp. 1-6.
"IEEE Standards Board: Project Authorization Request (PAR) Form;" http://grouper.ieee.org/groups/802/11/PARs/par80211bapp.html, Mar. 24, 1998.
"Important Dealer Notification—Honeywell AlarmNet-M Network Alert," Source: unknown, Author: unknown, Apr. 2007, pp. 1.

"inCode Telecom Transforming Payphones into Wi-Fi Hot Spots," Jan. 14, 2003, http://www.pocketpcmag.com/news/incode.asp (2 pages).

"Industrial Communications," Author: unknown, available at http://web.archive.org/web/19990222162354/www.metricom.com/industrial/ on May 10, 2010, pp. 1-3.

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications," Author: unknown, IEEE, Std. 802.11-1997, 1997, pp. 1-445.

"Integrated Communication Services" of Industrial Communications; pp. 1-3; available at web.archive.org/web/19990222162354/www.metricom.com/industrial.

"International Search Report and Written Opinion for International Application No. PCT/US2006/002342," Search Authority European Patent Office, mailed May 31, 2006.

"IOConnect Architecture™," Coactive, 2001, pp. 1-4.

"JC/83RF System: Cost-effective Multiple Facility Management by Radio Network," Johnson Controls, Date: unknown, pp. 1-6.

"JC/83RF System: Multiple Facility Management by Radio Network," Johnson Controls, Publication No. 2161, 1983, pp. 1-4.

"Keltron's Home Page with Frames, Index," available at http://web.archive.org/web/19990831161957/http://www.keltroncorp.com, on Mar. 24, 2009, pp. 1.

"Local and Metropolitan Area Networks: Wireless Medium Access Control (MAC) and Physical (PHY) Specifications, Annex A: Protocol Implementation Conformance Statement (PICS) Proforma," Author: unknown; IEEE, Nov. 1997, pp. 1-75.

"LonTalk Protocol, LonWorks™ Engineering Bulletin," Echelon Corp.; Author: unknown; Apr. 1993, pp. 1-27.

"LonWorks® Products, 1998, Version A," Echelon Corp.; Author: unknown; 1997, pp. 1-21.

"LonWorks® Router User's Guide," Echelon Corp., Author: unknown; 1995, pp. 1-136.

"LonWorks® SMX™ Transceiver," datasheet, Echelon Corp.; Author: unknown; 1997, pp. 1-18.

"M100 Series Motor Actuator," Author: unknown, Johnson Controls, Inc., Apr. 1993, pp. 1-20.

"M100C Series Actuator with Digital Control Signal Input and R81CAA-2 Interface Board," Installation Bulletin, Johnson Controls, 2000, pp. 1-12.

"Man-Portable Networked Sensor System (1997-)," Author: unknown, available at http://www.spawar.navy.mil/depts/d30/d37/d371/mpnss/mpnss.html on May 20, 2010, pp. 1-4.

"March of the Motes," Author: unknown, New Scientist, vol. 179, issue 2409, Aug. 23, 2003, pp. 1-8.

"Metasys Compatible Products," Author: unknown; Johnson Controls, Inc., 1997 (9 pages).

"Metasys Extended System Architecture, vol. II," Author: unknown, Publisher: unknown, Sep. 1999.

"Metasys N2 System Protocol Specification for Vendors," Author: unknown, Publisher: unknown, Jun. 1996.

"Modicon Interfacing," Author: unknown, Engineering Report, No. 90-022, Revised: Apr. 12, 1996, pp. 1-9.

"Moore Products—Hart Protocol Interfacing," Author: unknown, Engineering Report, No. 94-007, Revised: Mar. 1, 1996, pp. 1-3.

"MTC Teams with Coactive Networks to Deliver an Advanced Energy Communications and Management Solution," Coactive (press release), Author: unknown, Feb. 5, 2001, pp. 1-4.

"Net77 Central Station Manual Section 3," AES Intellinet, Dec. 1996.

"NewPower and Coactive Networks Announce Strategic Alliance to Deliver the Connected Home," Coactive (press release), Author: unknown, Mar. 14, 2001, pp. 1-4.

"NX-480 Wireless Motion Sensor, document No. 466-1479 Rev. D," Caddx Controls, May 1, 1998.

"Omni Automation System," Author: unknown, Home Automation, Inc., Date: unknown, pp. 1-266.

"Omni Installation Manual," Author: unknown; Home Automation, Inc., Oct. 1997, pp. 1-88.

"Omni Owner's Manual," Author: unknown; Home Automation, Inc., Date: unknown, pp. 1-136.

"Omron Interfacing," Author: unknown, Engineering Report, No. 95-003, Revised: Apr. 17, 1996, pp. 1-4.

"Opto-22 Protocol," Author: unknown, Engineering Report, No. 93-010, Revised: May 31, 1996, pp. 1-8.

"Part 15.1: Wireless Medium Access Control (MAC) and Physical Layer (PHY) Specifications for Wireless Personal Area Networks (WPANS)," www.ieee802.org/15/Bluetooth/802-15-1_Clause_05.pdf, Jun. 14, 2002.

"Phoenix Contact Interfacing, Author: unknown," Engineering Report, No. 94-001, Revised: Jun. 20, 1996, pp. 1-7.

"Phonelin / HPNA / HomePNA Networks," http://www.homenethelp.com/web/howto/HomeNet-HPNA.asp (visited Jul. 29, 2003) (3 pages).

"PLC Direct (Koyo) Interfacing, Author: unknown," Engineering Report, No. 96-001, Revised: Apr. 10, 1996, pp. 1-8.

"Power/Perfect Energy Management Systems," Author: unknown, Johnson Controls, 1983, pp. 1-4.

"Selected Vendor Telecommunications Products," available at http://eetd.lbl.gov/ea/ems/reports/39015a.pdf (describing public uses in 1995), pp. 1-83.

"Smart Home Technology Leader Intelli Selects Coactive Networks Internet Gateways," Coactive (press release), Author: unknown, Sep. 11, 2000, pp. 1-4.

"Special Poll Feature," Author: unknown, Engineering Report, No. 93-008, Sep. 1993, pp. 1-5.

"Square D Interfacing," Author: unknown, Engineering Report, No. 88-010, Revised: Apr. 18, 1996, pp. 1-9.

"Technology Review, Metricom's Ricochet Packet Radio Network," Ham Radio Online, 1996, Author: unknown, pp. 1-3.

"Texas Instruments Interface," Author: unknown, Engineering Report, No. 91-021, Revised: Nov. 1994, pp. 1-3.

"The New Power Company Announces Revolutionary Energy-Saving Program the Gives Consumers Remote Control of the Their Thermostats via the Internet," NewPower (press release), Author: unknown, Apr. 24, 2001.

"The SNVT Master List and Programmer's Guide," Echelon Corp., Author: unknown, Mar. 1996, pp. 1-23.

To Starbucks and beyond: 802.11 wireless Internet access takes off, CommunicationsSolutions.com, vol. 4, Issue 1, Q1 2003, pp. 8-9.

"Toshiba Interfacing," Author: unknown, Engineering Report, No. 91-011, Revised: Jun. 19, 1996, pp. 1-4.

"TranstexT® Advanced Energy Management System," Article, Author: unknown, Publisher: unknown, Date: unknown, pp. 1-2.

"TranstexT® Advanced Energy Management System," Brochure, Author: unknown, Integrated Communication Systems, Inc., 1990, pp. 1-8.

Elster's Initial Disclosure of Invalidity Contentions Pursuant to LPR 4.3; *IPCO, LLC* v. *Elster Electricity, LLC*, Northern District of Georgia Case No. 1:05-cv-1138 (183 pages).

Elster's First Supplement to its Initial Disclosure of Invalidity Contentions Pursuant to LPR 4.3; *IPCO, LLC* v. *Elster Electricity, LLC*, Northern District of Georgia Case No. 1:05-cv-1138 (154 pages) unknown.

Elster's Second Supplemental to its Initial Disclosure of Invalidity Contentions Pursuant to LPR 4.3; *IPCO, LLC* v. *Elster Electricity, LLC*, Northern District of Georgia Case No. 1:05-cv-1138 (111 pages).

Defendant's Joint Preliminary Invalidity Contentions filed by Defendants Crestron Electronics, Inc. and Wayne-Dalton Corporation in *SIPCO, LLC* v. *Amazon.Com, Inc. et al.*, District Court for the Eastern District of Texas Case No. 2:08-cv-359 (180 pages).

Trilliant Network, Inc.'s Invalidity Contentions Pursuant to Patent Rule 3-3, *IP CO. LLC* v. *Oncor Electric Delivery Company LLC et al.*, District Court for the Eastern District of Texas Case No. 2:09-cv-37 (112 pages).

Sensus's Invalidity Contentions filed by Defendant Sensus USA Inc. in *SIPCO, LLC* v. *SENSUS USA Inc.*, District Court for the Eastern District of Texas Case No. 2:09-cv-37 (21 pages).

Defendant EKA Systems, Inc.'s Invalidity Contentions, *IP CO. LLC* v. *Oncor Electric Delivery Company LLC et al.*, District Court for the Eastern District of Texas Case No. 2:09-cv-37 (110 pages).

EKA Systems, Inc.'s Invalidity Contentions Pursuant to Patent Rule 3-3, *IP CO, LLC* v. *Oncor Electric Delivery Company LLC et al.*, District Court for the Eastern District of Texas Case No. 2:09-cv-37 (110 pages).
Sensus's Invalidity Contentions filed by Defendant Sensus USA Inc. in *SIPCO, LLC* v. *SENSUS USA Inc.*, District Court for the Eastern District of Texas Case No. 6:09-cv-532 (22 pages).
Defendant Datamatic, LTD's Invalidity Contentions to Plaintiff, *SIPCO, LLC* v. *DATAMATIC Ltd, et al.*, District Court for the Eastern District of Texas Case No. 6:09-cv-532 (2 pages with 7 claim chart exhibits).
Johnson Controls, Inc.'s Invalidity Contentions and Disclosures Pursuant to P.R. 3-3 and 3-4, *SIPCO, LLC* v. *DATAMATIC Ltd, et al.*, District Court for the Eastern District of Texas Case No. 6:09-cv-532 (59 pages).
Trilliant Networks, Inc.'s Invalidity Contentions to Plaintiff, *Sipco, LLC* v. *Datamatic Ltd, et al.*, District Court for the Eastern District of Texas Case No. 6:09-cv-532 (418 pages).
Defendant Datamatic, Ltd's Invalidity Contentions to Plaintiff Pursuant to P.R. 3-3(a), *Sipco, LLC* v. *Datamatic Ltd, et al.*, District Court for the Eastern District of Texas Case No. 6:09-cv-532 (2 pages with 7 claim chart exhibits).
Johnson Controls, Inc.'s Supplement Letter to the Invalidity Contentions, *Sipco, LLC* v. *Datamatic Ltd, et al.*, District Court for the Eastern District of Texas Case No. 6:09-cv-532 (5 pages and 99 page Addendum).
Defendant's Invalidity Contentions Pursuant to P.R. 3-3 and 3-4 filed by Control4 Corporation et al., *Sipco, LLC* v. *Control4Corporation*, Eastern District of Texas Case No. 6:10-cv-249 (85 pages).
Johnson Controls, Inc.'s Supplemental Invalidity Contentions and Disclosures Pursuant to P.R. 3-3 and 3-4, *Sipco, LLC* v. *Datamatic Ltd, et al.*, District Court for the Eastern District of Texas Case No. 6:09-cv-532 (89 pages).
Defendant Toro Company's Motion for Summary Judgment of Invalidity, *Sipco, LLC* v. *The Toro Company, JLH Labs, LLC* and *Jason Hill*, District Court for the Eastern District of Pensylvania Case No. 08-CV-00505-TJS.
ADEMCO Group, 7720P Programming Tool, User Guide, Mar. 1992, ADEMCO Group, Author: unknown, available at http://www.guardianalarms.net; pp. 1-8.
ADEMCO Group, 7720Plus Subscriber Radio Installation Instructions, Oct. 1996, ADEMCO Group, Author: unknown, available at http://www.guardianalarms.net; pp. 1-30.
ADEMCO Group, 7720ULF Combination Fire Control and Long Range Radio Transmitter, 1997, ADEMCO Group, Author: unknown, available at http://web.archive.org/web/19990501210612/www.ademco.com/ademco on Mar. 5, 2009, pp. 1-3.
ADEMCO Group, 7720ULF Subscriber Radio, Installation Instructions, Mar. 1995, ADEMCO Group, Author: unknown, available at http://www.guardianalarms.net, pp. 1-20.
ADEMCO Group, 7720V2 Self-Contained Long Range Radio Transmitter, 1997, ADEMCO Group, Author: unknown, available at http://web.archive.org/web/19990501212349/www.ademco.com/ademco on Mar. 5, 2009 pp. 1-4.
ADEMCO Group, 7720V2 Subscriber Radio, Installation Instructions, Jun. 1996, ADEMCO Group, Author: unknown, available at http://www.guardianalarms.net, pp. 1-24.
ADEMCO Group, 7810iR Internet Receiver, Installation and Setup Guide, May 2002, ADEMCO Group, Author: unknown, available at http://www.guardianalarms.net, pp. 1-58.
ADEMCO Group, 7820 Appendicies, Mar. 1995, ADEMCO Group, Author: unknown, available at http://www.guardianalarms.net, pp. 1-2.
ADEMCO Group, 7820 Integrated Radio Transmitter, Installation Instructions, Aug. 1995, ADEMCO Group, Author: unknown, available at http://www.guardianalarms.net, pp. 1-52.
ADEMCO Group, 7825 Outdoor Antenna with Bracket, Installation Instructions, Feb. 1995, ADEMCO Group, Author: unknown, available at http://www.guardianalarms.net, pp. 1-2.
ADEMCO Group, 7830R SafetyNet Subscriber Radio, Installation Instructions, Jun. 1996, ADEMCO Group, Author: unknown, available at http://www.guardianalarms.net, pp. 1-32.

ADEMCO Group, 7830R Subscriber Transmitter, 1997, available at http://web.archive.org/web/19990501215427/www.ademco.com. ademco on Mar. 5, 2009, pp. 1-3.
ADEMCO Group, 7835C Cellular Control Channel Transceiver, Installation and Setup Guide, Sep. 1998, ADEMCO Group, Author: unknown, available at http://www.guardianalarms.net, pp. 1-32.
ADEMCO Group, 7835C Cellular SafetyNet Subscriber Radio Transceiver, 1997ADEMCO Group, Author: unknown, available at http://web.archive.org/web/19990801221202/www.ademco.com/on Mar. 5, 2009, pp. 1-3.
ADEMCO Group, 7845C Cellular Control Channel Transceiver, Installation and Setup Guide, Sep. 1990, ADEMCO Group, Author: unknown, available at http://www.guardianalarms.net, pp. 1-104.
ADEMCO Group, 7845CZ Seven Zone Cellular Control Channel Transceiver, Installation and Setup Guide, Sep. 2001, ADEMCO Group, Author: unknown, available at http://www.guardianalarms.net, pp. 1-64.
ADEMCO Group, 7845i Internet Communications Module, Installation and Setup Guide, Mar. 2002, ADEMCO Group, Author: unknown, available at http://www.guardianalarms.net, pp. 1-42.
ADEMCO Group, 7920SE 900MHz Fully Synthesized Transceiver, 1997, ADEMCO Group, Author: unknown, available at http://web.archive.org/web/19990501222639/www.ademco.com/ on Mar. 5, 2009, pp. 1-3.
ADEMCO Group, 7920SE Transceiver, Installation Instructions, Apr. 1995, ADEMCO Group, Author: unknown, available at http://www.guardianalarms.net, pp. 1-80.
ADEMCO Group, Ademco World Leader in Home Security Products, 1997, ADEMCO Group, Author: unknown, available at http://web.archive.org/web/19990428164624/www.ademco.com/ademco on Mar. 5, 2009, pp. 1-2.
ADEMCO Group, AlarmNet Introduces Control Channel Cellular for Commercial Fire/Burglary Applications, ADEMCO Group (press release), Aug. 31, 1999, available at http://web.archive.org/web/19990420234120/www.ademco.com/pr0831 on Mar. 31, 2009.
ADEMCO Group, AlarmNet, 1997, ADEMCO Group, Author: unknown, available at http://web.archive.org/web/199904240234130/www.ademco.com/ademco on Mar. 5, 2009, pp. 1-3.
ADEMCO Group, Alpha Vista No. 5130XT Security System, Installation Instructions, Mar. 1989, ADEMCO Group, Author: unknown, pp. 96.
ADEMCO Group, Compass Network Downloader, ADEMCO Group, Author: unknown, Date: unknown, available at http://www.guardianalarms.net pp. 1-109.
ADEMCO Group, Compass, 1997, ADEMCO Group, Author: unknown, available at http://web.archive.org/web/19990209094401/www.ademco.com/ademco on Mar. 5, 2009.
ADEMCO Group, Control/Communicator 5110XM User's Manual, Apr. 1996, ADEMCO Group, Author: unknown, pp. 1-30.
ADEMCO Group, Fire and Burglary System Model 5120XM User's Manual, Apr. 1996, ADEMCO Group, Author: unknown, pp. 1-40.
ADEMCO Group, Home Page, ADEMCO Group, Author: unknown, available at http://web.archive.org/web/19961023204954/http://ademco.com/ on Mar. 5, 2009, pp. 1.
ADEMCO Group, LYNX—Quick Install Security System, 1997, ADEMCO Group, Author: unknown, available at http://web.archive.org/web/19990116225005 pp. 1-3.
ADEMCO Group, Lynx Quick Start Guide, Oct. 1998, ADEMCO Group, Author: unknown, pp. 1-4.
ADEMCO Group, Lynx Security System Installation and Setup Guide, Oct. 1998, ADEMCO Group, Author: unknown, pp. 1-48.
ADEMCO Group, Lynx Security System Programming Form & Summary of Connections, Oct. 1998, ADEMCO Group, Author: unknown, pp. 1-16.
ADEMCO Group, Lynx Security System User Guide, Oct. 1998, ADEMCO Group, Author: unknown, pp. 1-40.
ADEMCO Group, Powerline Carrier Device Modules, 1997 ADEMCO Group, Author: unknown, available at http://web.archive.org/web/19990218035115/www.ademco.com/ademco on Mar. 5, 2009, pp. 1-2.

ADEMCO Group, Remote Keypads 6128, 6137, 6137R, 6138, 6139 & 6139R, Installation Guide, Aug. 1998, ADEMCO Group, Author: unknown, pp. 1-2.
ADEMCO Group, Security System Model 4110DL Programming Form, Oct. 1996, ADEMCO Group, Author: unknown, pp. 1-8.
ADEMCO Group, Security System Model 4110XM Programming Form, Jul. 1996, ADEMCO Group, Author: unknown, pp. 1-4.
ADEMCO Group, Security System Model 4120EC Programming Form, Sep. 1993, ADEMCO Group, Author: unknown, pp. 1-2.
ADEMCO Group, Security System Model 4120XM Programming Form, Sep. 1992, ADEMCO Group, Author: unknown, pp. 1-4.
ADEMCO Group, Security System Model 4130XM, 4140XM, 5130XM Programming Form, Date: unknown, ADEMCO Group, Author: unknown, pp. 1-4.
ADEMCO Group, Security System Model 4130XT/4140/5130XT Programming Form, Jul. 1989, ADEMCO Group, Author: unknown, pp. 1-2.
ADEMCO Group, Security System Model 4140XMP Programming Form, Jan. 1992, ADEMCO Group, Author: unknown, pp. 1-2.
ADEMCO Group, Security System Model 4140XMPT Programming Form, ADEMCO Group, Author: unknown, Date: unknown, pp. 1-2.
ADEMCO Group, Security System Model 4140XMPT2 Programming Form, Apr. 1996, ADEMCO Group, Author: unknown, pp. 1-4.
ADEMCO Group, Security System Model 5110XM Programming Form, Apr. 1996, ADEMCO Group, Author: unknown, pp. 1-4.
ADEMCO Group, Security System Model 5120XM Programming Form, Jun. 1996, ADEMCO Group, Author: unknown, pp. 1-4.
ADEMCO Group, Security System Model 5140XM Programming Form, Jun. 1993, ADEMCO Group, Author: unknown, pp. 1-4.
ADEMCO Group, Security System Model Vista-10 Programming Form, Sep. 1994, ADEMCO Group, Author: unknown, pp. 1-4.
ADEMCO Group, Security System Model Vista-10SE Programming Form, Apr. 1997, ADEMCO Group, Author: unknown, pp. 1-24.
ADEMCO Group, Security System Model Vista-128B Commercial Burglary Partitioned Security System with Scheduling, Quick Start Guide, Jun. 1998, ADEMCO Group, Author: unknown, pp. 1-39.
ADEMCO Group, Security System User's Manual, Sep. 1996, ADEMCO Group, Author: unknown, pp. 1-88.
ADEMCO Group, The Vista-100 Series, 1997, ADEMCO Group, Author: unknown, available at http://web.archive.org/web19970620010543/www.ademco.com/ademco on Mar. 5, 2009.
ADEMCO Group, The Vista-10SE, 1997, ADEMCO Group, Author: unknown, available at http://web.archive.org/web/19990502214402/www.ademco/com/ademco on Mar. 5, 2009, pp. 1-4.
ADEMCO Group, via16 Programming Form, Jul. 1993, ADEMCO Group, Author: unknown, pp. 1-2.
ADEMCO Group, vial 6 Security System, Installation Instructions, Jan. 1992, ADEMCO Group, Author: unknown, pp. 1-24.
ADEMCO Group, via-30+, Vista 10, 4111XM Security System User's Manual, Jul. 1994, ADEMCO Group, Author: unknown, pp. 1-44.
ADEMCO Group, via-30Pse Security System Programming Guide, Apr. 1997, ADEMCO Group, Author: unknown, pp. 1-24.
ADEMCO Group, via-30PSE, VISTA-1SE Security System User's Manual, Jan. 1997, ADEMCO Group, Author: unknown, pp. 1-88.
ADEMCO Group, Vista 4120XM and 4140XMP Security System User's Manual, Jan. 1994, ADEMCO Group, Author: unknown, pp. 1-60.
AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.
AES IntelliNet Model 7050-E Radio Subscriber Unit Installation Manual, AES IntelliNet, Author: unknown, Jul. 17, 2000, available at www.guardianalarms.net, pp. 1-4.
AES IntelliNet Model 7440 & 7440-XL RF Subscriber Unit, Addendum, AES IntelliNet, Author: unknown, Aug. 29, 2002.
AES IntelliNet Net 77 Version 1.48.30, Installation & Operation Manual, Document 40-0551u, AES Corporation, Author: unknown, Jun. 1999, pp. 1-30.
AES IntelliNet Net 77 Version 1.48.4, Installation & Operation Manual, Document 40- 0551u, AES Corporation, Author: unknown, Nov. 2000, pp. 1-36.
AES IntelliNet Net 7K Version 1.48.4, Installation & Operation Manual, Document 40-0551, AES Corporation, Nov. 2000, pp. 1-36.
AES IntelliNet Net7K Version 3, Installation & Operation Manual, Document 40-0551, AES Corporation, Jun. 1999, pp. 1-30.
AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.
AES IntelliNet Theory of Operation, AES IntelliNet; Author: unknown, Dec. 1996, downloaded from http://www.guardianalarms.net, pp. 1-18.
AES IntelliNet Wireless Network Glossary of Terms, document 40-0551 u, AES IntelliNet, Author: unknown, Dec. 96, pp. 1-15.
AES IntelliNotes Universal Serial data Interface/USDI, Bulletin No. 55, AES Corporation, Author: unknown, Apr. 5, 2001, pp. 1-12.
AES IntelliTAP Model 7068, Version 1.08, Installation Guide, AES IntelliNet, Author: unknown, Jun. 15, 2000, pp. 1-11.
AES IntelliTRAK 7555-Rt GPS Based Vehicle Tracking Unit, Version 2.0a, AES IntelliNet, Author: unknown, Feb. 20, 2001, pp. 1-16.
AES IntelliTRAK 7555-Rt GPS Based Vehicle Tracking Unit, Version 2.12, AES IntelliNet, Author: unknown, Nov. 6, 2002, pp. 1-16.
AES Net7000, Installation & Operation Manual, AES Intellinet, Author: unknown, Nov. 24, 1996, pp. 1-76.
AES Net77 Wireless Network Management Software Installation & Operation ManuCentral Station Manual, Section 3, AES IntelliNet, Author: unknown, Dec. 1996, pp. 1-87.
AES UL/ULC System Configuration, AES Corporation, Author: unknown, May 1, 2003, pp. 1.
Agre et al., "Autoconfigurable Distributed Control Systems," ISADS, Apr. 27, 1995.
Agre et al., "Development Platform for Self-Organizing Wireless Sensor Networks," Rockwell Science Center and UCLA, Date:unknown, pp. 1-25.
Agre et al., "Technical and Management Proposal for Adaptive Wireless Arrays for Interactive Reconnaissance, Surveillance and Target Acquisition in Small Unit Operations (AWAIRS)," Defense Advanced Research Projects Agency Broad Agency Announcement 96-26, UCLA, Date: unknown, pp. 1-50.
Airpath Wireless, Inc., "Hot Spot Hardware," Copyright 2003, http://www.airpath.com/programs/hardward/hardware.htm (vistited Jul. 29, 2003) (2 pages).
AlarmLink, Inc. A Brief History available at http://www.alarmlink.com/Default.aspx?tabid=28, on Mar. 23, 2009, pp. 1.
AlarmLink, Inc. Alarm Over IP Products, available at http://www.alarmlink.com/Default.aspx?tabid=38 on Mar. 24, 2009, pp. 1.
AlarmLink, Inc. Central Stations, availabe at http://www.alarmlink.com/Default.aspx?tabid=35, on Mar. 24, 2009.
AlarmLink, Inc. Home Page, avaliable at http://www.alarmlink.com/ on Mar. 24, 2009, pp. 1.
Alarm Link, Inc., "MeshWorks of Los Angeles," available at http://www.alarmlink.com/Default.aspx?tabid=39 on Mar. 24, 2009, pp. 1.
Alwan et al., "Adaptive Mobile Multimedia Networks," IEEE Personal Communications, Apr. 1996, pp. 34-51.
Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.
Amir, "The Ricochet System Architecture," available at http://www.lariat.org/Berkeley/node2.html, on May 1996, pp. 1-5.
Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.
Asada et al., "Wireless Integrated Network Sensors: Low Power Systems on a Chip," UCLA, Rockwell Science Center; Date: unknown, pp. 1-24.
Asada et al., "Wireless Integrated Sensors Networks: Low Power Systems on a Chip," Publisher: unknown, Date: unknown, pp. 1-8.
Asada, "Wireless Integrated Network Sensors (WINS)," UCLA, SPIE vol. 3673, Mar. 1999, pp. 11-18.

Baba et al., "Wireless Medium Access Control Protocol for CAN," 4th Int'l CAN Conf., Berlin, Germany, available at http://www.cancia.org/fileadmin/cia/files/icc/4/baba1.pdf (1997).
Bagby, "Calypso Ventures Inc.—WLAN background," 2 pages.
Baker et al. "The Architectual Organization of a Mobile Radio Network via a Distributed Algorithm," IEEE, Nov. 1981.
Ball et al., "Reliability of Packet Switching Broadcast Radio Networks," IEEE Transactions on Circuits and Systems, vol. CAS-23, No. 12, Dec. 1976, pp. 806-813.
Bapna, et al., "Antenna Pointing for High Bandwidth Communications from Mobile Robots," Paper, Field Robotics Center, The Robotics Institute, Carnegie Mellon University, date: unknown, pp. 1-6.
Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.
Bergstein, "US telco plans WiFi payphone," May 12, 2003, http://www.news.com.au/common/story_page/0,4057,6420676%5E1 5306,0 0.html (2 pages).
BGE, 5743 Wireless Dual Switch™ Glass Break Detector, Installation and Operating Instructions, BGE, Author: unknown; Date: unknown, pp. 1-2.
BGE, 5742 Wirelss Audio Switch™ Glass Break Detector, Installation and Operating Instructions, BGE, Author: unknown, Date: unknown, pp. 1-10.
Bhatnagar et al., "Layer Net: A New Self-Organizing Network Protocol," Department of Electrical Engineering, SUNY, IEEE, 1990.
Black, "Lutron RF Technology, Reliable, First, Forward Thinking," Lutron Electronics Co. Inc., Aug. 2006, pp. 1-16.
Blaney, "HomeRF™ Working Group, 4th Liason Report," IEEE, 802.11-98/360, Nov. 1998, Slides 1-12.
Brain, "How Motes Work," available at http://computer.howstuffworks.com/mote.htm, on Feb. 25, 2010, pp. 1-2.
Brain, "How Motes Work: Ad hoc Networks," available at http://computer.howstuffw orks.com/mote3.htm on Feb. 25, 2010, pp. 1-3.
Brain, "How Motes Work: The Basic Idea," available at http://computer.howstuff works.com/mote1.htm, on Feb. 25, 2010, pp. 1-2.
Brain, "How Motes Work: Typical Applications," available at http://computer.howstuff works.com/mote2.htm, on Feb. 25, 2010, pp. 1-2.
Brayer, "Implementation and Performance of Survivable Computer Communication with Autonomous Decentralized Control," IEEE Communications Magazine, Jul. 1983, pp. 34-41.
Brownrigg et al., "Development of a Packet-Switching Network for Library Automation," Proceedings of the National Online Meeting Apr. 12-14, 1983, pp. 67-74.
Brownrigg et al., "Distributions, Networks, and Networking: Options for Dissemination," Workshop on Electronic Texts, Session III, available at http://palimpsest.standford.edu/byorg/lc/etextw/sess3.html, Jul. 17, 2007, pp. 1-10.
Brownrigg et al., "Electrons, Electronic Publishing, and Electronic Display," Information Technology and Libraries (Sep. 1985), pp. 201-207.
Brownrigg et al., "Implementing Library Automation Plans in a University Computing Environment, Planning for Computing in Higher Education 5," EDUCOM Series in Computing and Telecommunications in Higher Education, 1980, pp. 215-225.
Brownrigg et al., "Online Catalogues: Through a Glass Darkly," Information Technology and Libraries, Mar. 1983, pp. 104-115.
Brownrigg et al., "Packet Radio for Library Automation," Information Technology and Libraries 3 (Sep. 1984), pp. 229-244.
Brownrigg et al., "Packet Switching and Library Automation: A Management Perspective," Proceedings of the 45th ASIS Annual Meeting Oct. 17-21, 1982, vol. 19, pp. 54-57.
Brownrigg et al., "Technical Services in the Age of Electronic Publishing," Library Resource & Technical Services, Jan./Mar. 1984, pp. 59-67.
Brownrigg et al., "User Provided Access to the Internet," available at http://web.simmons.edu/~chen/nit/NIT'92/033-bro.htm, Jun. 9, 2005, pp. 1-6.
Brownrigg, "Continuing Development of California State Radio Packet Project," Proceedings of the ASIS 1992 Mid-Year Meeting (Silver Spring, MD: American Society for Information Science, 1992), pp. 97-100.
Brunninga, "A Worldwide Packet Radio Network," Signal, vol. 42, No. 10, Jun. 1988, pp. 221-230.
Bryan et al., "Man-Portable Networked Sensor System," Publisher: unknown, Date: unknown, pp. 1-10.
Bult et al. Low Power Systems for Wireless Microsensors, UCLA Electrical Engineering Department, 1996 ISLPED, pp. 1-5.
Bult et al., "A Distributed, Wireless MEMS Technology for Condition Based Maintenance," EED, Defense Technical Information Center, UCLA, Electrical Engineering Department, Rockwell Science Center; Apr. 22-26, 1996.
Bult et al., "A Distributed, Wireless MEMS Technology for Condition Based Maintenance," Publisher: unknown; Nov. 1997, pp. 1-8.
Bult et al., "Low Power Systems for Wireless Microsensors," EED, UCLA; ILSPED; 1996, pp. 1-15.
Bult et al., "Low Power Systems for Wireless Microsensors," UCLA Electrical Engineering Department, Los Anegeles, CA and Rockwell Science Center, Thousand Oaks, CA; Aug. 14, 1996, pp. 25-29.
Bult et al., "Low Power Wireless Integrated Microsensors (LWIM)," EED, UCLA; ARPA—LPE PI Meeting, Apr. 27-28, 1995, pp. 1-30.
Bult et al., "Wireless Integrated Microsensors," EED, UCLA Electrical Engineering Department, Rockwell Science Center, TRF; Jun. 6, 1996, pp. 205-210.
CADDX-CADDI Controls, Inc., Ranger 9000E, User's Manual, downloaded from http://www.guardianalarms.net, May 17, 1996, pp. 1-9.
Carlisle, "Edison's NetComm Project," Proceedings of the 33rd Annual Rural Electric Power Conference, IEEE, Apr. 1989, pp. B5/1-B5/4.
Chen et al., "Route Optimization and Location Updates for Mobile Hosts," 1996 IEEE, Proceedings of the 16th ICDCS, pp. 319-326.
Chen, Emerging Home Digital Networking Needs, DSP Solutions R & D Center, Texas Instruments, Inc., pp. 1-6.
Cisco Systems, Inc., Enhanced Interior Gateway Routing Protocol, Cisco Systems, Inc., Updated Sep. 9, 2005, pp. 1-44.
Cisco Systems, RFC1812—Requirements for IP Version 4 Routers, Fred Baker ed. (Jun. 1995), available at http://www.faqs.org/rfcs/rfc1812.html, Sep. 14, 2009, pp. 1-129.
Clement, "SCADA System Using Packet Radios Helps to Lower Cincinnati's Telemetry Costs," WATER/ Engineering & Management, Aug. 1996, pp. 18-20.
Cleveland, "Performance and Design Considerations for Mobile Mesh Networks," Milcom '96 Conference Proceedings, vol. 1 of 3, Oct. 22-24, 1996, pp. 245-249.
Clever Solutions—Metricom offers wireless data networks—includes related articles on Metricom's technology and the SONeTech company—Company Profile, available at http://findarticles.com/p/articles/mi_m0REL/is_n 11_v93/ai_147 70465/?tag=content;col. 1, on Nov. 22, 1993 (3 pages).
Coactive Networks, Inc., A New Solution for Offering Multive Telemetry Services to the Home, Coactive, 1999, pp. 1-8.
Coactive Networks, Inc., Coactive Connector® 1000 Series, Coactive, 2000, pp. 1-4.
Coactive Networks, Inc., Coactive Connector® 2000 Series, Coactive, Date: unknown, pp. 1-8.
Coactive Networks, Inc., Connecting Networks to the Real World™, Coactive, Date: unknown, pp. 1-4.
Coactive Networks, Inc., Corporate Backgrounder, Coactive, 2001, pp. 1-6.
Coactive Networks, Inc., Corporate Fact Sheet, Coactive, 2001, pp. 2.
Coactive Networks, Inc., Router—LE: Remote Access to LonWorks Over Ethernet, Coactive, 1998, pp. 1-4.
Coactive Networks, Inc., Router—LL: Connect LonWorks Networks Across Internet Protocol, Coactive, 1998, pp. 1-4.
Cohen et al., "IP Addressing and Routing in a Local Wireless Network," 1992 IEEE, 1992, pp. 626-632.
Cook et al., "Water Distribution and Control by Wireless Networking," Electronic Systems Technology, Date: unknown, pp. 1-3.
Corbell et al., "Technical Implementation in Support of the IAEA's Remote Monitoring Field Trial At the Oak Ridge Y-12 Plant," Dept. of Energy, Office of Scientific and Technical Information, Report No. SAND—096-1934C, available at http://www.osti.gov/bridge/product.biblio.jsp?qu ery_id=1&page=0&osti_id=270678 (1996).

Corbell et al., "Technical Results of Y-12/IAEA Field Trial of Remote Monitoring System," Dept. of Energy, Office of Scientific and Technical Information, Report No. SAND—97-1781C, available at http://www.osti.gov/bridge/product.biblio.jsp?query_id=0&page=0&osti_id=505711 (1997).

Corcoran et al., "Browser-Style Interfaces to a Home Automation Network," IEEE Transactions on Consumer Electronics, vol. 43, No. 4, Nov. 1997, pp. 1063-1069.

Corcoran et al., "CEBus Network Access via the World-Wide-Web," available at http://ieeexplore.ieee.org/xpl/freeabs—all.jsp?arnumber= 517285, on Mar. 29, 2009, Paper published on Consumer Electronics, 1996, Digest of Technical Papers, pp. 236-237.

Corcoran et al., "CEBus Network Access via the World-Wide-Web," IEEE, 1996.

Corson et al., "Architectural Considerations for Mobile Mesh Networking," Milcom '96 Conference Proceedings vol. 1 of 3, Oct. 22-24, 1996, pp. 225-229.

Corson et al., "Internet-Based Mobile Ad Hoc Networking," IEEE Internet Computing, Jul.-Aug. 1999, pp. 63-70.

Court's claim construction Order dated Feb. 10, 2009, in *Sipco LLC et al.* v. *The Toro Co. et al.*, Case No. 2:08-cv-00505-TJS (E.D. Pa.).

Custom Solutions, Inc. Acessories, available at http://web.archive.org/web/19981206221844/www.csi3.com/hv_pv4.htm on Feb. 27, 2009, pp. 1-3.

Custom Solutions, Inc., HomAtion 2000 for HomeVision, Press Release, available at http://web.archive.org/web/19981207075734/www.csi3.com/HV_PR_0 on Feb. 27, 2009, pp. 1-2.

Custom Solutions, Inc., HomeVision 2.7 "How to" Information, Date: unknown; pp. 1-146.

Custom Solutions, Inc., HomeVision 2.7 Auto Report Feature, Date: unknown, pp. 1-10.

Custom Solutions, Inc., HomeVision 2.7 Interface Command Protocol, Date: unknown, pp. 1-40.

Custom Solutions, Inc., HomeVision 2.7 Interface Command Protocol, Date: unknown, pp. 1-80.

Custom Solutions, Inc. HomeVision 2.7, Date: unknown, pp. 1-42.

Custom Solutions, Inc. HomeVision 2.7, Document Purpose, Date: unknown, pp. 1-28.

Custom Solutions, Inc. HomeVision 2.7, Summary of Changes—2.7, Date: unknown, pp. 1-26.

Custom Solutions, Inc. HomeVision 2.7, Welcome to HomeVision, Date: unknown, pp. 1-18.

Custom Solutions, Inc. HomeVision 2.7e, Owner's Manual (1999); pp. 1-596.

Custom Solutions, Inc. HomeVision 2.7e, Version History Overview, Date: unknown, pp. 1-38.

Custom Solutions, Inc. HomeVision Description, available at http://web.archive.org/web/19981206004955/http://www.csi3.com/HV.htm on Mar. 2, 2009, pp. 1-14.

Custom Solutions, Inc. HomeVision PC 2.62 Interface Command Protocol, date: unknown, pp. 1-36.

Custom Solutions, Inc. HomeVision PC 2.62, Welcome to HomeVision PC, Date: unknown; pp. 1-16.

Custom Solutions, Inc. HomeVision PC 2.62, Document Purpose, Date: unknown, pp. 1-24.

Custom Solutions, Inc. HomeVision PC 2.62, Summary of Changes—2.62, date: unknown, pp. 1-8.

Custom Solutions, Inc. HomeVision PC 2.62, Version History Overview, Date:unknown, pp. 1-6.

Custom Solutions, Inc., HomeVision—PC Description, available at http://web.archive.org/web/19981205094024/http://www.csi3.com/hvpc.htm on Mar. 2, 2009, pp. 1-6.

Custom Solutions, Inc., HomeVision—PC Software, available at http://web.archive.org/web/19990224053817/http://www.csi3.com/hvp3pc.htm on Feb. 27, 2009, pp. 1-2.

ADEMCO Group, Vista 4130XT Security System Installation Instructions, Oct. 1998, ADEMCO Group, Author: unknown, pp. 1-84.

ADEMCO Group, Vista 4140XMPT2 Partitioned Security System with Scheduling Installation Instructions, May 1993, ADEMCO Group, Author: unknown, pp. 1-68.

ADEMCO Group, Vista AT 4140 Security System Installation Instructions, Sep. 1998, ADEMCO Group, Author: unknown, pp. 1-68.

ADEMCO Group, Vista Series 4120EC Security System User's Manual, Sep. 1992, ADEMCO Group, Author: unknown, pp. 1-28.

ADEMCO Group, Vista Series 4130XM, 5130XM, 4140XMP Security System User's Manual, Feb. 1992, ADEMCO Group, Author: unknown, pp. 1-32.

ADEMCO Group, Vista Series 4140XMPT/4140XMPT-Ul Partitioned Security System User's Manual, Jun. 1993, ADEMCO Group, Author: unknown, pp. 1-32.

ADEMCO Group, Vista Series 4140XMP, Installation Instructions, Jan. 1992, ADEMCO Group, Author: unknown, pp. 1-52.

ADEMCO Group, Vista Series 5140XM User's Manual, Aug. 1992, ADEMCO Group, Author: unknown, pp. 1-28.

ADEMCO Group, Vista XM Series 4140XM, 5130XM, 4130XM, Installation Instructions, Jul. 1990, ADEMCO Group, Author: unknown, pp. 1-26.

ADEMCO Group, Vista XM Series, Installation Instructions, ADEMCO Group, Author: unknown, Oct. 1991, pp. 1-16.

ADEMCO Group, Vista-10 Security System, Installation Instructions, Sep. 1994, ADEMCO Group, Author: unknown, pp. 1-56.

ADEMCO Group, Vista-100 Commercial Fire & Burglary Alarm Partitioned Security System with Scheduling, Installation Instructions and Programming Guide, Jan. 1998, ADEMCO Group, Author: unknown, pp. 1-233.

ADEMCO Group, Vista-100 Commercial Fire & Burglary Alarm System User's Manual, Nov. 1995, ADEMCO Group, Author: unknown, pp. 1-66.

ADEMCO Group, Vista-100 Commercial Fire & Burglary Alarm System with Scheduling Quick Start, Apr. 1996, ADEMCO Group, Author: unknown, pp. 1-24.

ADEMCO Group, Vista-10SE Security System, Installation Instructions, May 1997, ADEMCO Group, Author: unknown, pp. 1-88.

Ademco Group, Vista-128B Commercial Burglary Partitioned Security System with Scheduling, Installation and Setup Guide, Jul. 1998, Ademco Group, Author: unknown, pp. 1-252.

Ademco Group, Vista-128FB Commercial Fire and Burglary Partioned Security System with Scheduling, Installation, and Setup Guide, Oct. 1998, Ademco Group, Author: unknown, pp. 1-220.

Ademco Group, Vista-128FB Commercial Fire and Burglary Partitioned Security System User Guide, Oct. 1998, Ademco Group, Author: unknown, pp. 1-80.

Ademco Group, Vista-20 2-Partitioned Security System, Installation Instructions, Nov. 1995, Ademco Group, Author: unknown, pp. 1-120.

Ademco Group, Vista-20 2-Partitioned Security System, Programming Form, Apr. 1996, Ademco Group, Author: unknown, pp. 1-8.

Ademco Group, Vista-20 Security System User's Manual, Apr. 1995, Ademco Group, Author: unknown, pp. 1-52.

Ademco Group, Vista-20HW 2-Partitioned Security System, Installation Instructions, Apr. 1996, Ademco Group, Author: unknown, pp. 1-100.

Ademco Group, Vista-20HW 2-Partitioned Security System, Programming Form, Apr. 1996, Ademco Group, Author: unknown, pp. 1-8.

Ademco Group, Vista-20HWse 2-Partitioned Security System, Installation Instructions, Aug. 1997, Ademco Group, Author: unknown, pp. 1-84.

Ademco Group, Vista-20HWse 2-Partitioned Security System, Programming Form, Aug. 1997, Ademco Group, Author: unknown, pp. 1-8.

Ademco Group, Vista-20SE 2-Partitioned Security System, Installation Instructions, Aug. 1997, Ademco Group, Author: unknown, pp. 1-100.

Ademco Group, Vista-20SE 2-Partitioned Security System, Programming Guide, Aug. 1997, Ademco Group, Author: unknown, pp. 1-8.

Ademco Group, Vista-20SE/Vista-20HWse Security System User's Manual, Jun. 1997, Ademco Group, Author: unknown; pp. 1-52.

Ademco Group, Vista-30Pse Security System, Installation Instructions, Apr. 1997, Ademco Group, Author: unknown; pp. 1-104.

Ademco Group, Vista-40 2-Partition Security System, Installation and Setup Guide, Jul. 1998, Ademco Group, Author: unknown; pp. 1-380.

ADEMCO Group, Vista-40 2-Partition Security System, Programming Guide, Jul. 1998, ADEMCO Group, Author: unknown; pp. 1-24.

ADEMCO Group, Vista-40 Programming Guide, Jun. 1997, ADEMCO Group, Author: unknown; available at www.guardianalarms.net pp. 1-20.

ADEMCO Group, Vista-40 Security System User's Guide, Jul. 1998, ADEMCO Group, Author: unknown; pp. 1-60.

ADEMCO Group, Vista-50, Vista 50UL Security System, Nov. 1994, ADEMCO Group, Author: unknown; pp. 1-66.

ADEMCO Group, Vista-50P, Vista-50PUL Partitioned Security System with Scheduling, Installation Instructions and Programming Guide, Oct. 1997, ADEMCO Group, Author: unknown; pp. 1-199.

ADEMCO Group, Vista-50P, Vista-50PUL Security System User's Manual, Jul. 1995, ADEMCO Group, Author: unknown; pp. 1-66.

ADEMCO Group, Vista-50P, Vista-50PUL, Partitioned Security System with Scheduling, Quick Start, Aug. 1995, ADEMCO Group, Author: unknown; pp. 1-28.

ADEMCO Group, Vista5140XM Commercial Fire and Burglary Alarm System Installation Instructions, Jun. 1993, ADEMCO Group, Author: unknown, pp. 1-74.

ADEMCO Group, Vista—AT Security System User's Manual, Sep. 1998, ADEMCO Group, Author: unknown; pp. 1-56.

ADEMCO Group, V-Link Downloading Software User's Guide, Jun. 1994, ADEMCO Group, Author: unknown; available at http://www.guardianalarms.net, pp. 1-126.

ADEMCO Group, V-Plex Security Technology, 1997, ADEMCO Group, Author: unknown, available at http://web.archive.org/web/19990421110527/www.ademco.com/ademco on Mar. 5, 2009, pp. 1-6.

ADEMCO Group, Wireless Transmitters/Receivers: 5700 Wireless Transmitters, 1997, ADEMCO Group, Author: unknown, available at http://web.archive.org/web/19990127120423/www.ademco.com/ademco on Mar. 5, 2009, pp. 1-2.

ADEMCO Group, Wireless Transmitters/Receivers: 5800 Wireless Transmitters, 1997, ADEMCO Group, Author: unknown, available at http://web.archive.org/web/19990218181254/www.ademco/com/ademco on Mar. 5, 2009, pp. 1-2.

ADEMCO Group, Wirelss User Interface Devices, 1997, ADEMCO Group, Author: unknown, available at http://web.archive.org/web/19990421190353/www.ademco.com/ademco on Mar. 5, 2009, pp. 1-4.

ADEMCO Group,Vista Series Partitioned Security Systems Model 4140XMPT Installation Instructions, Feb. 1992, ADEMCO Group, Author: unknown, pp. 160.

AES—7700 Central Station, Installation & Operation Manual, Document 40/0551 u, AES Corporation, Author: unknown, Nov. 2003, pp. 1-40.

AES—IntelliGuard 7470, AES IntelliNet, Author: unknown, Nov. 2003, pp. 1-15.

AES 7000 Smart Central Station InstaCentral Station Installation & Operation Manual, Document No. 40-551, AES IntelliNet, Author: unknown; Nov. 20, 1996, pp. 1-48.

AES 7067 IntelliTap-II Digital Dialer Interface: A Supplemental Alarm Supporting Device, AES IntelliNet, Author: unknown, Aug. 5, 2004, pp. 1-4.

AES 7099 Central Station Installation & Operation Manual, Document No. 40/0050, AES IntelliNet, Author: unknown; 1998, pp. 1-20.

AES 7450 RF Subscriber Unit Installation Manual, AES IntelliNet, Author: unknown, 1998, pp. 1-8.

AES 7750-F RF Smart Subscriber Unit Version 2, Including 7750-F-4x4 and 7750-F-8, Installation & Operation Manual, AES IntelliNet, Author: unknown, Apr. 2001 (Updated Nov. 2003), pp. 1-60.

AES 7750-F RF Smart Subscriber Unit Version 2, Installation & Operation Manual, AES IntelliNet, Author: unknown, Aug. 2000, pp. 1-30.

AES Central Alarm Monitoring, Author: unknown, available at http://web.archive.org/web/19990225163745/www.aes-intellinet.com/ae, on Mar. 5, 2009, pp. 1-3.

AES IntelliNet 7450 Addendum, AES Corporation, Author: unknown, Jul. 9, 2002, pp. 1-2.

AES IntelliNet Dealer's List by State, Author: unknown, available at http://web.archive.org/web/200102162324026/www.aes-intellinet.com/list on Mar. 5, 2009, pp. 1-13.

AES IntelliNet Model 7003 Central Station, Installation & Operation Manual, AES IntelliNet, Author: unknown, Jan. 9, 2001, available at http://www.guardianalarms.net, pp. 1-25.

AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.

Rehkter et al., "A Border Gateway Protocol 4 (BGP-4)," RFC 1771, (Mar. 1995), available at http://tools.ietf.org/html.rfc1771, Jun. 24, 2009, pp. 1-58.

Reuters, "Verizon Launches Wi-Fi Hot Spots," May 18, 2003, http://www.wired.com/news/wireless/0,1382,58830,00.html (2 pages).

Ritter et al., The Architecture of Metricom's Microcellular Data Network™ (MCDN) and Details of its Implementation as the Second and Third Generation Ricochet™ Wide-Area Mobile Data Service, IEEE, 2001, pp. 143-152.

Ross et al., "PNC/DOE Remote Monitoring Project at Japan's Joyo Facility," Office of Scientific and Technical Information, Report No. SAND—96-1937C, available at http://www.osti.gov/bridge/product.bib lio.jsp?query_id=0&pa ge=0&osti_id=270680 (1996).

Saffo, Paul, "Sensors: The Next Wave of Infotech Innovation," Institute for the Future (1997).

Salkintzisa et al., "Design and implementation of a low-cost wireless network for remote control and monitoring applications," Elservier, Microprocessors and Microsystems, 1997, pp. 79-88.

Saltzer et al., "Source Routing for Campus-wide Internet Transport (Sep. 15, 1980)," available at http://groups.csail.mit.edu/ana/publications/pubPDFs/Sourcerouting.html, Sep. 21, 2009, pp. 1-14.

Schneider et al., "International Remote Monitoring Project Argentina Nuclear Power Station Spent Fuel Transfer Remote Monitoring System," Dept. of Energy, Office of Scientific and Technical Information, Report No. SAND—97-1784C, available at http://www.osti.gov/bridge/product.bibli o.jsp?query_id=1&page=0&osti_id=505674 (1997).

Schulman et al., "SINCGARS Internet Controller—Heart of the Digitized Battlefield," Proceedings of the 1996 Tactical Communications Conference, Apr. 30-May 2, 1996, pp. 417-421.

Shacham et al., "A Packet Radio Network for Library Automation," 1987 IEEE Military Communications Conference, vol. 2, at 21.3.1 (Oct. 1987); pp. 456-462.

Shacham et al., "Dynamic Routing for Real-Time Data Transport in Packet Radio Networks," IEEE Proceedings of INFOCOM '82, pp. 152-159.

Shacham et al., "Future Directions in Packet Radio Architectures and Protocols," Proceedings of the IEEE, vol. 75, No. 1, Jan. 1987, pp. 83-99.

Shacham et al., "Future Directions in Packet Radio Technology," Proceedings of IEEE Infocom 85, Mar. 26-28, 1985, pp. 93-98.

Shacham et al., "Packet Radio Networking," Telecommunications vol. 20, No. 9, Sep. 1986, pp. 42,43,46,48,64 and 82.

Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.

Sohrabi et al., Protocols for Self-Organization of a Wireless Sensor Network, IEEE Personal Communications, Oct. 2000, pp. 16-27.

Stern, "Verizon to Offer Wireless Web Link Via Pay Phones," May 10, 2003, http://www.washingtonpopst.com/ac2/wp-dyn?pagename=article&node=&contentID=A367 . . . (3 pages).

Subramanian et al., An Architectural for Building Self-Configurable Systems, IEEE, 2000, pp. 63-73.

Sunshine, "Addressing Problems in Multi-Network Systems," (Apr. 1981), available at ftp://ftp.isi.edu/in-notes/ien/ien178.txt, Sep. 14, 2009, pp. 1-26.

Sunshine, "Addressing Problems in Multi-Network Systems," Proceedings INFOCOM '82, 1982 IEEE, pp. 12-19.

Sunshine, "Network Interconnection and Gateways," IEEE Journal on Selected Areas in Communications, vol. 8, No. 1, Jan. 1990, pp. 4-11.

Sunshine, "Source Routing in Computer Networks," Information Sciences Department of The Rand Corporation (1977), Publisher: unknown, pp. 29-33.
Sutherland, Ed, "Payphones: The Next Hotspot Wave?," Jan. 28, 2003, http://www.isp-planet.com/fixed_wireless/news/2003/bellcanada_030128.html (3 pages).
Tanenbaum, "Computer Networks," 4th Int'l CAN Conf., Berlin, Germany, 1997.
Thodorides, "Wireless Integrated Network Sensors," Power Point Presentation, Publisher: unknown, Apr. 15, 2003, pp. 1-19.
Thomas, "Extending CAN Networks by Incorporating Remote Bridging," ESTeem Radios, Nov. 1994.
Thomas, "Extending CAN Networks by Incorporating Remote Bridging," 4th Int'l CAN Conf., Berlin, Germany, available at http://www.can-cia.org/fileadmin/cia/files/icc/4/thom as.pdf (1997).
Tobagi et al, "Packet Radio and Satellite Networks," IEEE Communications Magazine, vol. 22, No. 11, Nov. 1984, pp. 24-40.
Toh, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.
Totolo, Home RF, A New Protocol on the Horizon, Feb. 1999, available at www.hometoys.com/htinews/feb99/articles/totolo/totolo.htm on Mar. 2, 2009.
Transmission Control Protocol; "DARPA Internet Program Protocol Specification," John Postel Editor; Information Sciences Institute, University of Southern California, California; Sep. 1981; pp. 1-85.
Varadhan et al., "SDRP Route Construction," Internet Draft, available at draft-ietf-sdr-route-construction-01.{ps,txt}, Feb. 27, 2005, pp. 1-12.
Vardhan, "Wireless Integrated Network Sensors (WINS): Distributed In Situ Sensing for Mission and Flight Systems," 2000 IEEE Aerospace Conference Proceedings, (2000).
Verizon, "Verizon Broadband Anytime," Copyright 2003, https://www33.verizon.com/wifi/login/loacations/locations-remote.jsp (2 pages).
Wang et al., "Energy-Scalable Protocols for Battery Operated MicroSensor Networks," Department of Electrical Engineering Massachusetts Institute of Technology, 1999.
Warrock, "School Give Report on Radio-Based FMS," Energy User News, Nov. 7, 1983, pp. 1.
Weiser, "Some Computer Science Issues in Ubiquitous Computing," Communications of the ACM, Jul. 1993.
Weiser, "The Computer for the 21st Century," Scientific American, Sep. 1991.
Westcott et al., "A Distributed Routing Design for a Broadcast Environment," 1982 IEEE Military Communications Conference on Progress in Spread Spectrum Communications, vol. 3, Oct. 17-20, 1982, pp. 10.4.1-10.4.5.
Westcott et al., "Hierarchical Routing for Very Large Networks," IEEE Military Communications Conference, Oct. 21-24, 1984, Conference Record vol. 2, pp. 214-218.
Westcott, "Issues in Distributed Routing for Mobile Packet Radio Networks," Proceedings of Computer Networks Compcon '82, Sep. 20-23, 1982, pp. 233-238.
Wey, Jyhi-Kong et al., "Clone Terminator: An Authentication Service for Advanced Mobile Phone System", 1995 IEEE 45th Vehicular Technology Conference, Chicago, IL, pp. 175-179 + Cover Page, Jun. 25-28, 1995.
Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.
Wikipedia, "Bellman-Ford Algorithm," available at unknown date http://en.wikipedia.org/wiki/Bellman-Ford.
Wikipedia, "Border Gateway Protocol," available at http://en.wikipedia.org/wiki/Border_Gateway_Protocol, Jun. 24, 2009, pp. 1-13.
Wikipedia, "Distance-Vector Routing Protocol," available at http://en.wikipedia.org/wiki/Distance-Vector_Routing_Protocol, Jun. 24, 2009, pp. 1-4.
Wikipedia, "Enhanced Interior Gateway Routing Protocol," available at http://en.wikipedia.org/wiki/EIGRP, Jun. 24, 2009, pp. 1-7.
Wikipedia, "Exterior Gateway Protocol," available at http://en.wikipedia.org/wiki/Exterior_Gateway_Protocol, Jun. 24, 2009, pp. 1.
Wikipedia, "Interior Gateway Routing Protocol," available at http://en.wikipedia.org/wiki/Interior_Gateway_Routing_Protocol, Jun. 24, 2009, pp. 1-2.
Wikipedia, "IS-IS," available at http://en.wikipedia.org/wiki/IS-IS, Jun. 24, 2009, pp. 1-3.
Wikipedia, "L. R. Ford, Jr.," available at http://en.wikipedia.org/wiki/L._R._Ford,_Jr, Jun. 24, 2009, pp. 1.
Wikipedia, "Open Shortest Path First," available at http://en.wikipedia.org/wiki/open_shortest_path_first.
Wikipedia, "Richard E. Bellman," available at http://en.wikipedia.org/wiki/Richard_Bellman, Jun. 24, 2009, pp. 1-3.
Wikipedia, "Routing Information Protocol," available at http://en.wikipedia.org/wiki/Routing_Information_Protocol, Jun. 24, 2009, pp. 1-4.
Will et al., "Wireless Networking for Control and Automation of Off-road Equipment," ASAE, Jul. 18-21, 1999, pp. 1-10.
Wilson, Lexicon 700t Touchscreen Remote, Jan. 1, 1999, available at http://avrev.com/home-theater-remotes-system-control/remotes-system on Mar. 2, 2009, pp. 1-3.
Wright (ed.), Home-automation networks mature with the PC industry chases a new home LAN, EDN Design Feature, Date: unknown, pp. 1-9.
Wu, Jie, "Distributed System Design", Department of Computer Science and Engineering, Florida Atlantic University, CRC Press, pp. 177-180, 204 + Cover Pages, 1999.
Kaiser, "Embedded Wireless Devices: Sensors," Outline, École Polytechnique Féérale de Lausanne, pp. 1-53.
Kaiser, "Embedded Wireless Devices: Signal Processing," Outline, École Polytechnique Fédérale de Lausanne, pp. 1-19.
Kaiser, "Embedded Wireless Devices: Wireless Networkin " Outline, École Polytechnique Fédérale de Lausanne, pp. 1-16.
Kaiser, "Embedded Wireless Devices: Wireless Physical Layer," Outline, École Polytechnique Fédérale de Lausanne, pp. 1-29.
Karn et al., "Packet Radio in the Amateur Service," IEEE Journal on Selected Areas in Communications, vol. SAC-3, No. 3, May 1985, pp. 431-439.
Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.
Katz et al., "The Bay Area Research Wireless Access Network (BARWAN)," University of California at Berkeley, available at http://www.cs.berkeley.edu/-randy/Daedalus/BARWAN/BARWAN_index.html, 6 pages.
Katz et al., "Towards a Wireless Overlay Internetworking Architecture", DARPA ITO Sponsored Research, 1997 Project Summary, University of California, Berkeley, pp. 1-8, Including a Slide Show Presentation of 56 Pages at http://daedalus.cs.berkeley.edu/talks/retreat.6.96/overview.pdf.
Kemp, "Home Automation Application Guide," Applications for Home Automation in Any Home, vol. 1, 2000, pp. 1-106.
Kleinrock et al., "Hierarchical Routing for Large Networks, Performance Evaluation, and Optimization," Computer Networks 1 (1977), pp. 155-174.
Kocom, "Digital Home Network, Kitchen TV Phone KTD-505, User's Manual," pp. 1-7.
Kohno et al., "An Adaptive Sensor Network System for Complex Environments in Intelligent Autonomous Systems (Kakazu et al., eds.)," IOS Press, 1998, pp. 21-28.
Kooser et al., "Testing 1-2-3," Entrepreneur Magazine, Sep. 2003, pp. 27-30.
Krishnamachari, "Networking Wireless Sensors," Cambridge University Press, Date: unknown, pp. 1-10.
Krishnamachari, "Wireless Sensor Networks: the Vision;" Cambridge University Press; pp. 1-10.
Lacoss, "Distributed Sensor Networks, Final Report," Lincoln Laboratory at Massachusetts Institute of Technology, Sep. 30, 1986, pp. 1-225.
Lauer et al., "Survivable Protocols for Large Scale Packet Radio Networks," IEEE Global Telecommunications Conference, Nov. 26-29, 1984, vol. 1 of 3, pp. 468-471.

Lauer, "Packet-Radio Routing, Routing in Communications Networks," Ch. 11 (1995) pp. 351-396.

Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.

Leiner et al., "Goals and Challenges of the DARPA GloMo Program;" IEEE Personal Communications; Dec. 1996, vol. 3, No. 6; pp. 34-45.

Leviton Manufacturing Co., Inc., "The DECORA® Collection of Designer Devices," 2006, pp. 1-85.

Lewis et al., "Packet-Switching Applique for Tactical VHF Radios," 1987 IEEE Military Communications Conference, Oct. 19-22, 1987, Conference Record vol. 2 of 3, pp. 449-455.

Lin et al., "Adaptive Clustering for Mobile Wireless Networks;" Publisher: unknown; Date: unknown; pp. 1-21.

Lin et al., "CMOS Front End Components for Micropower RF Wireless Systems;" EED, UCLA Electrical Engineering Department; 1998, pp. 1-5.

Lin et al., "Wireless Integrated Network Sensors (WINS) for Tactical Information Systems," UCLA, Rockwell Science Center; Date: unknown; pp. 1-5.

Linear Corporation, "Supervised Digital Security Transmitter t-90, Installation Instructions," 2006, pp. 1-2.

Linear Corporation, "Supervised Digital Security Transmitters TX-91, TX-92, TX-94, Operation Instructions," 1993, pp. 1.

Linear Corporation, "Supervised Wireless Receiver and Zone Expander SRX-64A, Installation Instructions," 2003, pp. 1-2.

Local and Metropolitan Area Networks: Wireless Medium Access Control (MAC) and Physical (PHY) Specifications, Author: unknown; IEEE, Nov. 1997, pp. 1-98.

Clare et al., "Self-Organizing Distributed Sensor Networks," UCLA, Rockwell Science Center.

Clare, "AWAIRS Progress Review: Planned Milestones," UCLA Rockwell Science Center, Nov. 20, 1998.

Lougheed et al., "A Border Gateway Protocol 3 (BGP-3)," RFC 1267, (Oct. 1991), available at http://tools.ietf.org/html/rfc1267, Jun. 24, 2009, pp. 1-36.

Lowe et al., "Publishing Bibliographic Data on Optical Disks: A Prototypical Application and Its Implications," Third International Conference on Optical Mass Data Storage, Proceedings of SPIE, vol. 529, pp. 227-236.

Lutron Electronics Co. Inc., Connecting to a RadioRA System via a Local Area Network, Application Note #127, Date: unknown, pp. 1-16.

Lutron Electronics Co. Inc., Homeowner's Guide for the RadioRA® Quick Start Package, 2004, pp. 1-8.

Lutron Electronics Co. Inc., How to Retrofit RadioRA® Wall-Mounted Master Control into an existing home, Application #41, 2004, pp. 1-2.

Lutron Electronics Co. Inc., Interfacing RadioRA ® to Security and Fire Alarm Systems, Application Note #59, pp. 1-4.

Lutron Electronics Co. Inc., IR/RS232 Interface for Bang & Olufsen® Remote Control and RadioRA®, Application Note #119, 2004, pp. 1-3.

Lutron Electronics Co. Inc., Level Capture with a RadioRA® Master Control, Application Note #73, 2003, pp. 1-3.

Lutron Electronics Co. Inc., Modem Installation for HomeWorks®, Application Note #9, 1998, pp. 1-4.

Lutron Electronics Co. Inc., RadioRA® RA-IR-KIT Installation Instructions, Application Note #61, 2000, pp. 1-4.

Lutron Electronics Co. Inc., RadioRA® RF Signal Repeater, 1998, pp. 1-2.

Lutron Electronics Co. Inc., RadioRA® Single-Location Switch, Controls for Permanently Installed Lighting Loads, 1998, pp. 1-2.

Lutron Electronics Co. Inc., RadioRA® Table Lamp Controls, Dimming and Switching Controls for Table and Floor Lamps, 1999, pp. 1-2.

Lutron Electronics Co. Inc., Using a Photocell with the RadioRA® System, Application Note #45, 1998, pp. 1-4.

Lutron Electronics Co. Inc., Using an Astronomic Timeclock with the RadioRA® System, Application Note #42, 1998, pp. 1-2.

Lutron Electronics Co. Inc., Using the RadioRA® System to Activate Scenes 5-16 on a GRAFIK Eye® Control Unit, Application Note #48, 1998, pp. 1-4.

Lutron Electronics Co. Inc., Using the RadioRA® Telephone Interface, Application Note #46, 1998, pp. 1-2.

Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.

Lynch et al., "Beyond the Integrated Library System Concept: Bibliographic Networking at the University of California," Proceedings of the Second National Conference on Integrated Online Library Systems Proceedings, Sep. 1984, pp. 243-252.

Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.

Lynch et al., "Document Delivery and Packet Facsimile," Proceedings of the 48th ASIS Annual Meeting, vol. 22, Oct. 20-24, 1985, pp. 11-14.

Lynch et al., "Electronic Publishing, Electronic Imaging, and Document Delivery, Electronic Imaging '86," (Boston, MA: Institute for Graphic Communication, Inc., 1986), pp. 662-667.

Lynch et al., "Library Applications of Electronic Imaging Technology," Information Technology and Libraries, Jun. 1986, pp. 100-105.

Lynch et al., "Packet Radio Networks: Architectures, Protocols, Technologies and Applications," Pergamon Press, 1 ed., 1987, pp. 1-275.

Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.

Lynch et al., "The Telecommunications Landscape: 1986," Library Journal, Oct. 1, 1986, pp. 40-46.

Reexamination Control No. 90-008011 Request for Ex Parte unknown Reexamination of 6,044,062.

Reexamination Control No. 90-008011 Grant of Reexamination Request.

Reexamination Control No. 90-008011 Non-Final Office Action dated Nov. 19, 2007.

Reexamination Control No. 90-008011 Final Office Action dated Aug. 13, 2008.

Reexamination Control No. 90-010301 Request for Ex Parte unknown Reexamination of 6,891,838.

Reexamination Control No. 90-010315 Request for Ex Parte unknown Reexamination of 7,103,511.

Reexamination Control No. 90-010301 Grant of Reexamination Request.

Reexamination Control No. 90-010315 Denial of Reexamination Request.

Reexamination Control No. 90-010315 Petition to Review Denial of Request for Reexamination.

Reexamination Control No. 90-010507 Request for Ex Parte Reexamination of 7,103,511.

Reexamination Control No. 90-010509 Request for Ex Parte Reexamination of 7,103,511.

Reexamination Control No. 90-010510 Request for Ex Parte Reexamination of 6,891,838.

Reexamination Control No. 90-010505 Substitute Request for Ex Parte Reexamination of 7,103,511.

clate. Reexamination Control No. 90-010507 Substitute Request for Ex Parte Reexamination of 7,103,511.

Reexamination Control No. 90-010508 Substitute Request for Ex Parte Reexamination of 7,103,511.

Reexamination Control No. 90-010509 Substitute Request for Ex Parte Reexamination of 7,103,511.

Reexamination Control No. 90-010510 Substitute Request for Ex Parte Reexamination of 6,891,838.

Reexamination Control No. 90-010511 Substitute Request for Ex Parte Reexamination of 6,891,838.

Reexamination Control No. 90-010512 Substitute Request for Ex Parte Reexamination of 6,891,838.
Reexamination Control No. 90-010505 Grant of Reexamination Request.
Reexamination Control No. 90-010507 Grant of Reexamination Request.
Reexamination Control No. 90-010508 Grant of Reexamination Request.
Reexamination Control No. 90-010509 Grant of Reexamination Request.
Reexamination Control No. 90-010510 Grant of Reexamination Request.
Reexamination Control No. 90-010511 Grant of Reexamination Request.
Reexamination Control No. 90-010512 Grant of Reexamination Request.
Reexamination Control No. 90-010301 Non-Final Office Action dated Dec. 2, 2009.
Reexamination Control No. 90-010315 Denial of Petition to Review Denial of Request for Reexamination.
Reexamination Control No. 90-010505 Non-Final Office Action dated Mar. 3, 2010.
Reexamination Control No. 90-010507 Non-Final Office Action dated Mar. 3, 2010.
Reexamination Control No. 90-010508 Non-Final Office Action dated Mar. 3, 2010.
Reexamination Control No. 90-010509 Non-Final Office Action dated Mar. 3, 2010.
Reexamination Control No. 90-008011 Examiner Answer to Appeal Brief.
Reexamination Control No. 90-010505 Final Office Action dated Aug. 2, 2010.
Reexamination Control No. 90-010507 Final Office Action dated Aug. 2, 2010.
Reexamination Control No. 90-010508 Final Office Action dated Aug. 2, 2010.
Reexamination Control No. 90-010509 Final Office Action dated Aug. 2, 2010.
Reexamination Control No. 90-010510 Final Office Action dated Aug. 20, 2010.
Reexamination Control No. 90-010511 Final Office Action dated Aug. 20, 2010.
Reexamination Control No. 90-010512 Final Office Action dated Aug. 20, 2010.
Reexamination Control No. 90-010301 Final Office Action dated Nov. 5, 2010.
Reexamination Control No. 90-010510 Final Office Action dated Nov. 5, 2010.
Reexamination Control No. 90-010511 Final Office Action dated Nov. 5, 2010.
Reexamination Control No. 90-010512 Final Office Action dated Nov. 5, 2010.
Reexamination Control No. 90-008011 BPAI Decision.
Reexamination Control No. 90-010510 Non-Final Office Action dated Dec. 2, 2009.
Reexamination Control No. 90-010511 Non-Final Office Action dated Dec. 2, 2009.
Reexamination Control No. 90-010512 Non-Final Office Action dated Dec. 2, 2009.
Reexamination Control No. 90-010301 Notice of Intent to Issue Reexam Certificate dated Dec. 13, 2010.
Prophet, Graham, Living in a Wireless Wonderland, available at http://www.ednmag.com/infoaccess.asp, Jun. 5, 2010, pp. 79-94.
U.S Appl. No. 12/816,266 Non-Final Office Action dated Jun. 15, 2011.
U.S. Appl. No. 12/169,536 Non-Final Office Action dated Jun. 8, 2011.
U.S. Appl. No. 12/169,536 Non-Final Office Action dated Nov. 21, 2011.
U.S. Appl. No. 12/689,220 Final Office Action dated Oct. 5, 2011.
U.S. Appl. No. 12/482,892 Non-Final Office Action dated Jun. 28, 2011.
U.S. Appl. No. 12/482,892 Non-Final Office Action dated Nov. 25, 2011.
Custom Solutions, Inc., HomeVision—PC Version 2.62, Owner's Manual (1997), pp. 1-234.
Custom Solutions, Inc., Media Information, Feb. 16, 1999, available at http://web.archive.org/web/19990502073249/www.csi3.com/hv_media.htm on Feb. 27, 2009, pp. 1-2.
Custom Solutions, Inc., Using Enerzone StatNet Thermostats with HomeVision (1998) pp. 1-16.
Davies et al., "Internetworking in the Military Environment," Proceedings of IEEE Infocom '82 (1982) pp. 19-29.
Davies et al., "The Application of Packet Switching Techniques to Combat Net Radio," Proceedings of the IEEE, vol. 75, No. 1, Jan. 1987, pp. 43-55.
Davis et al., "Knowledge-Based Management of Cellular Clone Fraud," IEEE (1992), pp. 230-234.
Deering et al., "Internet Protocol, Version 6 (IPv6)," RFC1883, Publisher: unknown, Dec. 1995, pp. 1-37.
Deering et al., "Internet Protocol, Version 6 (IPv6)," RFC2460, The Internet Society, Dec. 1998, pp. 1-39.
Diaz, "Intervehicular Information System (IVIS): the Basis for a Tactical Information System," SAE International, Mar. 1994, pp. 1-14.
Dixon et al., "Addressing, Bridging and Source Routing," IEEE Network, Jan. 1988, vol. 2, No. 1, pp. 25-32.
Dong et al., "Low Power Signal Processing Architectures for Network Microsensors," ACM, 1997, pp. 173-177.
Echelon Corp., "LonTalk® Protocol Specification," Doc. No. 19550, available at http://ww w.enerlon.com/JobAids/Lontalk%20Protocol%20Spec.pdf (1994).
Echelon Corp., "Series 90™-30 PLC LonWorks® Bus Interface Module User's Manual," Doc. No. GFK-1322A, available at http://www.pdfsupply.com/pdfs/gfk1322a.pdf (1997).
Elson et al., "Fine-Grained Network Time Synchronization Using Reference Broadcasts," UCLA Computer Science Department, May 17, 2002, pp. 1-14.
Eng et al., "BAHAMA: A Broadband Ad-Hoc Wireless ATM Local-Area Network," 1995 IEEE International Conference on Communications, Jun. 18-22, 1995, pp. 1216-1223.
Ephremides et al., "A Design Concept for Reliable Mobile Radio Networks with a Frequency Hopping Signaling," IEEE 1987, pp. 1-18.
ESTeem Application Paper—AgriNorthwest Employee's Provide Wireless Control System (describing a system that was in use prior to Mar. 1999).
ESTeem Application Paper—Allen-Bradley Goes Wireless on Alaska's North Slope (describing a system that was in use prior to Mar. 1999).
ESTeem Application Paper—Build Your Own Wireless Power Distribution System (describing a system that was in use prior to Mar. 1999).
ESTeem Application Paper—Lost Cabin Gas Plant Uses Wireless Control to Enhance Production & Safety (describing a system that was in use prior to Mar. 1999).
ESTeem Application Paper—Northwest Farm Applies Wireless Solution (describing a system that was in use prior to Mar. 1999).
ESTeem Application Paper—Wireless Control of Polluted Water (describing a system that was in use prior to Mar. 1999).
ESTeem Application Paper—Wireless Mobile Mapping System (describing a system that was in use prior to Mar. 1999).
ESTeem Application Paper—Wireless Networking for Kodiak's Coast Guard Station (describing a system that was in use prior to Mar. 1999).
ESTeem Application Paper—Wireless Networking for Natural Gas Extraction (describing a system that was in use prior to Mar. 1999).
ESTeem Models 85, 95, 96, & 98 User's Manual (describing the ESTeem 96C and 96F radios used prior to 1999).
Estrin et al., "Next Century Challenges: Scallable Coordination in Sensor Networks," ACM, 1999, pp. 263-270.
Estrin et al., "RFC1940—Source Demand Routing: Packet Format and Forwarding Specification (Version 1)," Network Working Group, May 1996, available at http://www.faqs.org/rfcs/rfc1940.html, Sep. 14, 2009, pp. 1-20.

Estrin et al., "Source Demand Routing: Packet Format and Forwarding Specification (Version 1)", Network Working Group, Internet Draft, Jan. 19, 1995, pp. 1-28.

Federal Communications Commission, "Notice of Proposed Rule Making and Order," Adopted Dec. 17, 2003, Released Dec. 30, 2003 (54 pages).

Frank, "Transmission of IP Datagrams Over NET/ROM Networks, ARRL Amateur Radio 7th Computer Networking Conference," Oct. 1988, pp. 65-70.

Frank, "Understanding Smart Sensors," Artech House (1996).

Frankel, "Packet Radios Provide Link for Distributed Survivable Command Control Communications in Post-Attack Scenarios," Microwave System News, Jun. 1983, Circle Reader Service No. 77, pp. 80-108.

Franz, "HiperLAN—Der ETSI-Standard fur locale Funknetze," NTZ, Sep. 1995, 10 pages.

Fullmer, "Collision Avoidance Techniques for Packet-Radio Networks," Dissertation, University of California at Santa Cruz , Jun. 1998, pp. 1-162.

Gale et al., "The Impact of Optical Media on Information Publishing," Bulletin of the American Society for Information Science, vol. 12, No. 6, Aug./Sep. 1986, pp. 12-14.

Garbee, "Thoughts on the Issues of Address Resolution and Routing in Amateur Packet Radio TCP/IP Networks," ARRL Amateur Radio 6th Computer Networking Conference, Aug. 1987, p. 56-58.

Garcia-Luna-Aceves, "A Fail-Safe Routing Algorithm for Multishop Packet-Radio Networks," IEEE Infocom '86, Technical Sessions: Apr. 8-10, 1986, pp. 434-442.

Garcia-Luna-Aceves, "A Minimum-hop Routing Algorithm Based on Distributed Information," Elsevier Science Publishers, B.V. (North Holland), 1989, pp. 367-382.

Garcia-Luna-Aceves, "Routing Management in Very Large Scale Networks," Elsevier Science Publishers, B.V. (North Holland), 1988, pp. 81-93.

Garcia-Luna-Aceves, J.J et al., "Wireless Internet Gateways (WINGS)", 1997 IEEE, pp. 1271-1276, 1997.

GE Security, "NetworkX NX-4," 2004, pp. 1-2.

GE Security, "NetworkX NX-548E," 2006, pp. 1-2.

Geier et al., "Networking Routing Techniques and their Relevance to Packet Radio Networks," ARRL/CRRL Amateur Radio 6th Computer Networking Conference, London, Ontario, Canada, Sep. 1990, pp. 105-117.

Gerla et al., "Multicluster, Mobile, Multimedia Radio Network," UCLA Computer Science Department; Baltzer Journals; Wireless Networks; Jul. 12, 1995, pp. 255-265.

Golden Power Manufacturing, "6030 PCT Programmable Communicating Thermostat," Author: unknown, 2007, pp. 1-3.

Golden Power Manufacturing, "Ritetemp Universal Wireless Thermostat," Author: unknown, 2007, pp. 1-2.

Goldman et al., "Impact of Information and Communications Technologies on Residential Customer Energy Services," Paper, Berkeley: UCLA, Oct. 1996, pp. 1-89.

Gower et al., "Congestion Control Using Pacing in a Packet Radio Network", Rockwell International, Collins Communications Systems Division, Richardson, TX, IEEE 1982, pp. 23.1-1-23.1-6, 1982.

Grady et al., "Telemetry Options for Small Water Systems," Special Report SR14-1999, Publisher: unknown, Sep. 1999, pp. 1-23.

Guardian Alarms, Inc., "Home Security System—Model 7068 Digital Dialer Interface," Author: unknown, available at www.guardianalarms.net, 2007, pp. 1.

Guardian Alarms, Inc., "Security Company—Home Alarm System Monitoring—AES 7067 IntelliTap-II Digital Dialer Interface," Author: unknown, available at www.guardianalarms.net, 2007, pp. 1.

Guardian Alarms, Inc., "Security System—Alarm System Monitoring—7160 EZ Router," Author: unknown, available at www.guardianalarms.net, 2007, pp. 1.

Guardian Alarms, Inc., "Security System—Alarm System Monitoring—NET 7000," Author: unknown, available at www.guardianalarms.net, 2007, pp. 1.

Guardian Alarms, Inc., "Security System—Alarm System Monitoring—Radionics FDX," Author: unknown, available at www.guardianalarms.net, 2007, pp. 1.

"Wayport's Value Proposition: To provide the industry's best high-speed Internet and business center experience for the airport passenger to stay productive," http://www.wayport.net/airportsoverview (visited Jul. 29, 2003) (2 pages).

"Welcome to UtiliNet: A Wireless Data Communications Solution from Metricom, Inc.," Author: unknown, available at http://web.archive.org/web/199806028045812/www.metricom.com/industrial/utilinet.html on May 10, 2010, pp. 1-10.

"Westinghouse Numa Logic Interface," Author: unknown, Engineering Report, No. 91-013, Date: unknown, pp. 1-7.

"What's Behind Ricochet: A Network Overview," Author: unknown, available at http://web.archive.org/web/20000815090824/www.ricochet.com/ricochet_advantage/tech_overview.html, Aug. 15, 2000, pp. 1-4.

"Wireless Access List—Atlanta Hartsfield International Airport," http://www.ezgoal.com/hotsports/wireless/f.asp?fid=63643 (visited Jul. 29, 2003) (1 page).

"Wireless Access List—0 ATL Admirals Club," http://www.ezgoal.com/hotspots/wireless/f.asp?fid=60346 (visited Jul. 29, 2003) (1 page).

"Wireless Accessories, catalog pages," Home Automation, Inc (archived web page), 1997.

"ESTeem Model 96C," ESTeem Radios (describing a system that was for sale at least as early as 1994).

"Site Survey Report," ESTeem Radios, Sep. 24, 1993.

"Technical Bulletin—Johnson Controls," ESTeem Radios, Jan. 29, 1998.

Abbott et al., "Wireless Product Applications for Utilities," Electric Power Research Institute, Feb. 1996, pp. 1-137.

About AES Corporation, AES IntelliNet, Author: unknown, available at http://web.archive.org/web/19990127093116/www/aes-intellinet.com/ae, on Mar. 5, 2009, pp. 1-2.

ADEMCO Group, 7720NX Network Extender,ADEMCO Group, Author: unknown, 1998; pp. 1-2.

ADEMCO Group, 4110DL Security System, Installation Instructions, Oct. 1996, ADEMCO Group, Author: unknown, pp. 1-15.

ADEMCO Group, 4110XM Security System, Installation Instructions, Jul. 1996, ADEMCO Group, Author: unknown, pp. 1-20.

ADEMCO Group, 4120EC Security System, Installation Instructions, Nov. 1990, ADEMCO Group, Author: unknown, pp. 1-17.

ADEMCO Group, 4120XM Security System, Installation Instructions, Oct. 1993, ADEMCO Group, Author: Unknown, pp. 1-80.

ADEMCO Group, 4140XMPT2 Partitioned Security System with Scheduling User's Manual, May 1993, ADEMCO Group, Author: unknown; pp. 1-54.

ADEMCO Group, 4281, 5881, and 5882 Series RF Receivers Installation Instructions, Oct. 1996, ADEMCO Group, Author: unknown; pp. 1-6.

ADEMCO Group, 5330 Alpha Console, Installation Instructions, May 90, ADEMCO Group, Author: unknown, pp. 1-24.

ADEMCO Group, 5706 Smoke Detector with Built-In Wireless Transmitter, Installation Instructions, Dec. 1991, ADEMCO Group, Author: unknown, pp. 18.

ADEMCO Group, 5707 Smoke Detector with Built-in Wireless transmitter, Installation Instructions, Aug. 1992, ADEMCO Group, Author: unknown, pp. 1-12.

ADEMCO Group, 5715 Universal Transmitter, Installation Instructions, Mar. 1989, ADEMCO Group; Author: unknown; pp. 1-4.

ADEMCO Group, 5775 Passive Infrared Motion Detector/Transmitter, Installation Instructions, Jul. 1991, ADEMCO Group, Author: unknown; pp. 1-4.

ADEMCO Group, 5808C Photoelectronic Smoke Detector with Built-In Wireless Transmitter Installation Instructions, 1998, ADEMCO Group, Author: unknown; pp. 1-4.

ADEMCO Group, 5800TM Transmitter Module Installation Instructions, Apr. 1994, ADEMCO Group, Author: unknown; pp. 1.

ADEMCO Group, 5801 Remote Wireless Panic Transmitter Installation Instructions, Apr. 1994, ADEMCO Group, Author: unknown; pp. 2.

ADEMCO Group, 5802CP Belt Clip Transmitter Installation Instructions, Nov. 1994, ADEMCO Group, Author: unknown; pp. 1.

ADEMCO Group, 5802MN, Supervised Miniature Transmitter Installation Instructions, Jan. 1995, ADEMCO Group, Author: unknown; pp. 1.

ADEMCO Group, 5802MN2 Supervised Miniature Transmitter Installation Instructions, Jun. 1997, ADEMCO Group, Author: unknown; pp. 1.

ADEMCO Group, 5803 Wireless Key Transmitter Installation Instructions, Nov. 1994, ADEMCO Group, Author: unknown, pp. 2.

ADEMCO Group, 5804 Wireless Key Transmitter Installation Instructions, Jul. 1995, ADEMCO Group, Author: unknown, pp. 3.

ADEMCO Group, 5804BD Bi-Directional Key Transmitter Installation Instructions, Apr. 1997, ADEMCO Group, Author: unknown, pp. 4.

ADEMCO Group, 5806 Smoke Detector with Built-In Wireless Transmitter Installation Instructions, May 1998, ADEMCO Group, Author: unknown, pp. 1-4.

ADEMCO Group, 5807 Smoke Detector with Built-In Wireless Installation Instructions, May 1998, ADEMCO Group, Author: unknown, pp. 1-6.

ADEMCO Group, 5808 Photoelectronic Smoke/Heat Detector with Built-In Wireless Transmitter Installation Instructions, 1998, ADEMCO Group, Author: unknown, pp. 1-8.

ADEMCO Group, 5808 Wireless Smoke Detector, 1999, available at http://web.archive.org/web/20000118015507/www.ademco.com/ademco on Mar. 5, 2009 pp. 1-4.

ADEMCO Group, 5809 Rate-of Rise Heat Detector/Transmitter Installation Instructions, Nov. 1994, ADEMCO Group, Author: unknown; pp. 1-2.

ADEMCO Group, 5816 Door/Window Transmitter Installation Instructions, Nov. 1994, ADEMCO Group, Author: unknown; pp. 1-2.

ADEMCO Group, 5816TEMP Low Temperature Transmitter Installation Instructions, May 1998, ADEMCO Group, Author: unknown; pp. 1-2.

ADEMCO Group, 5818 Recessed Transmitter Installation Instructions, Jan. 1994, ADEMCO Group, Author: unknown; pp. 1-2.

ADEMCO Group, 5819 Shock Processor Transmitter Installation Instructions, May 1998, ADEMCO Group, Author: unknown; pp. 1-2.

ADEMCO Group, 5819WHS Wireless Shock Sensor and Processor, 1997, available at http://web.archive.org/web/19990428164624/www.ademco.com/ademco on Mar. 5, 2009, pp. 1.

ADEMCO Group, 5819WHS/5819BRS Shock Processor Transmitter Installation Instructions, May 1998, ADEMCO Group, Author: unknown; pp. 1-2.

ADEMCO Group, 5827 Remote Wireless Keypad/Transmitted Installation Instructions, Apr. 1994, ADEMCO Group, Author: unknown; pp. 1.

ADEMCO Group, 5827BD and 5827BDE Wireless Bi-Directional Keypads Installation Instructions and Operating Guide, Mar. 1996, ADEMCO Group, Author: unknown; pp. 1-6.

ADEMCO Group, 5849 Glass Break Detector/Transmitted Installation Instructions, Oct. 1997, ADEMCO Group, Author: unknown; pp. 1-4.

ADEMCO Group, 5850 Glass Break Detector/Transmitter Installation Instructions, May 1998, ADEMCO Group, Author: unknown; pp. 1-4.

ADEMCO Group, 5890 Passive Infrared Motion Detector/Transmitted Installation Instructions, May 1998, ADEMCO Group, Author: unknown; pp. 1-8.

ADEMCO Group, 5890 Wireless PIR Motion Detector, 1997, available at http://web.archive.org/web/19990429054256/www.ademco.com/asc on Mar. 5, 2009, pp. 1-3.

ADEMCO Group, 5890PI Passive Infrared Motion Detector/Transmitter Installation Instructions, Mar. 1998, ADEMCO Group, Author: unknown; pp. 1-4.

ADEMCO Group, 6128RF Keypad/Receiver—full wireless capability, 1997, ADEMCO Group, Author: unknown; pp. 1-2.

ADEMCO Group, 6128RF Keypad/Transceiver Installation Instructions, Jul. 1998, ADEMCO Group, Author: unknown; pp. 1-8.

ADEMCO Group, 6128RF Keypad/Transceiver, User Guide, May 1998, ADEMCO Group, Author: unknown; pp. 1.

ADEMCO Group, 6128WL Keypad/Receiver Installation Instructions, Oct. 1998, ADEMCO Group, Author: unknown; pp. 1-8.

ADEMCO Group, 6128WL Keypad/Receiver User Guide, Oct. 1998, ADEMCO Group, Author: unknown; pp. 1.

ADEMCO Group, 7715DF MicroFAST Installation Tool, User Manual, Feb. 1998, ADEMCO Group, Author: unknown; pp. 1-32.

ADEMCO Group, 7720 Subscriber Radio, Installation Instructions, Jan. 1992, ADEMCO Group, Author: unknown, available at http://www.guardianalarms.net, pp. 1-18.

ADEMCO Group, 7720NX Network Extender, 1997, ADEMCO Group, Author: unknown, available at http://web.archive.org/web/19990220035932/www.ademco.com/ademco on Mar. 5, 2009, pp. 1-3.

* cited by examiner

SYSTEMS AND METHODS FOR PROVIDING EMERGENCY MESSAGES TO A MOBILE DEVICE

CROSS-REFERENCE TO RELATED APPLICATION & PRIORITY CLAIM

This application is a continuation-in-part of U.S. patent application Ser. No. 12/356,358, filed Jan. 20, 2009, and entitled "System and Method For Transmitting An Emergency Message Over An Integrated Wireless Network," which is a continuation of U.S. patent application Ser. No. 10/000,477, filed Oct. 24, 2001, and entitled "System and Method For Transmitting An Emergency Message Over An Integrated Wireless Network," and both are incorporated herein by reference in their entirety as if fully set forth below.

BACKGROUND OF THE INVENTION

1. Field of the Invention

The present invention generally relates to communicating emergency messages and, in particular, to a system and method for generating and transmitting an emergency message through an integrated wireless communication network.

2. Related Art

Emergency messages are generated to indicate that a person is in need of assistance or that an emergency condition is present at property. The emergency message is transmitted to parties capable of rendering assistance.

One example of a conventional personal emergency message is a 911 telephone call. Emergency 911 telephone calls are quickly directed to switchboard operators who are trained to determine the nature of the emergency condition, to determine which type of assistance is required and who should provide the assistance (e.g. firemen, paramedics, police), and where the emergency assistance should be directed to such that the person making the 911 telephone call receives appropriate and timely assistance.

However, emergency 911 telephone calls are limited in the ability to obtain information from the caller requesting emergency assistance. First, the caller must be able to verbally communicate the nature of the emergency to the switchboard operator. Thus, additional information that may be important could, in some instances, not be available if the caller can not talk or is having difficulty communicating. Second, location information can be determined if the telephone is a fixed location type device that can be traced to a known location or address. The location of Cellular and mobile telephones can not be determined unless the caller is capable of telling the operator where the caller is calling from. Furthermore, in many situations, it would be advantageous to have access to other types of information regarding the person calling for emergency assistance. Some illustrative examples of such information includes persons to contact in an emergency, doctor's name, home address or allergies.

Another example of a conventional emergency message is an alarm from a home or business security system. Various automated detection devices sense conditions within the home or business, and summon emergency assistance in the event that one of the monitored parameter are violated. Examples include smoke detected by a smoke detector, opening of a door or window detected by a contact sensor, pressure detected by a pressure sensor, sound detected by a sound sensor, breaking of an infrared light beam detected by an infrared detector and/or motion detected by a motion sensor. Detection of a violation of a monitored parameter may indicate an emergency situation where emergency assistance should be provided to the monitored home or business. Additionally, there may be a personal help request device, such as a panic alarm, special entry code entered on a key pad, a touch button or the like that is configured to indicate that a person in the home or building requires emergency assistance.

However, such conventional home or business security systems are not secure in that such conventional systems communicate with the security monitoring personnel over a conventional telephone system. Thus, damage to the serving telephone system may prevent delivery of the emergency message. For example, an intruder may sever the telephone lines prior to entry into the home or business. Or, a fire may disable the outside phone lines before the fire spreads into the home or building.

Also, such conventional home or business security systems are labor intensive and expensive to install. Hard wire connections are installed between each detecting device and a central security control box. The control box, coupled to the telephone system, is configured to dial up the security monitoring personnel to request emergency assistance when one of the detectors detects a violation of the monitored criteria. Therefore, many hours of installation labor is required to install even a relatively simple home or business security system.

Additionally, such conventional home or business security systems are not automatically configured to contact selected persons when one of the detectors detects a violation of the monitored parameter. Some security monitoring services do call predefined telephone numbers to notify a person of the request for emergency assistance. For example, a homeowner may be called at work by the person monitoring the security system. However, if the homeowner is not at the work telephone, the homeowner may not be timely notified.

Furthermore, such conventional home or business security systems are not configured to receive and respond to remote communications from the homeowner or business employee. For example, the homeowner may desire to authorize a new security password on a temporary basis. Or, the homeowner may desire to remotely deactivate (or activate) the security system rather than having to enter the home to manually enter, via a keyboard, the security password. Furthermore, such passwords must be manually entered within a limited time period (otherwise, an intrusion into the home is assumed). The limited time provided for entering the security code may be particularly inconvenient when the person is bringing into the house (or removing from the house) a number of items, such as boxes, packages, furniture and/or children.

Thus, a heretofore unaddressed need exists in the industry for providing an emergency message system that more accurately indicates the nature, location and other pertinent information of an emergency situation. Also, there is a heretofore unaddressed need in the industry to provide a less expensive to install emergency message home or business security system. Also, there is a heretofore unaddressed need to provide a more convenient and effective emergency message system.

SUMMARY OF THE INVENTION

The present invention overcomes the inadequacies and deficiencies of the prior art as discussed hereinabove. One embodiment of the present invention, an emergency message system, provides a system and method for providing an emergency message such that the appropriate emergency assistance is dispatched in response to the emergency message. The emergency message system employs a transceiver network with a plurality transceivers. A plurality of transceivers are coupled to detection devices at a plurality of customer premises. In one embodiment, one transceiver is coupled to one detection device. The transceivers each have unique identification codes. In one embodiment, transceivers broadcast to and receive radio frequency (RF) signals. A site controller provides communications between the plurality of transceiver units and an emergency message management controller residing in an emergency message system control center.

One embodiment of the present invention can also be viewed as providing a method for communication emergency messages. In this regard, the method can be broadly summarized by the following steps. Generating an emergency message with an emergency message transceiver having at least an identification code uniquely assigned to the emergency message transceiver, and communicating the emergency message from the emergency message transceiver to a network transceiver such that the emergency message is communicated over an intermediate communication system to an emergency message management controller.

Another embodiment of the present invention can be broadly summarized by the following steps. Receiving an emergency message broadcasted from an emergency message transceiver having at least an identification code uniquely assigned to the emergency message transceiver, determining information relevant to the received emergency message by associating the information with the identification code of the emergency message transceiver, and communicating the emergency message and the relevant information such that assistance is summoned in response to the received emergency message.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION a. Overview of the Emergency Message System

In general, the present invention relates to a system and method for communicating an emergency message that is transmitted from a transceiver, through a transceiver network, to an emergency message system control center so that emergency assistance is dispatched in response to the emergency message. The emergency message, in one embodiment, is generated in response to a monitor detecting a violation of a monitored criteria. In other embodiments, the emergency message is generated in response to actuation of a personal emergency message device, a 911 call or upon detection of other signals indicating an emergency condition.

Figure 1:
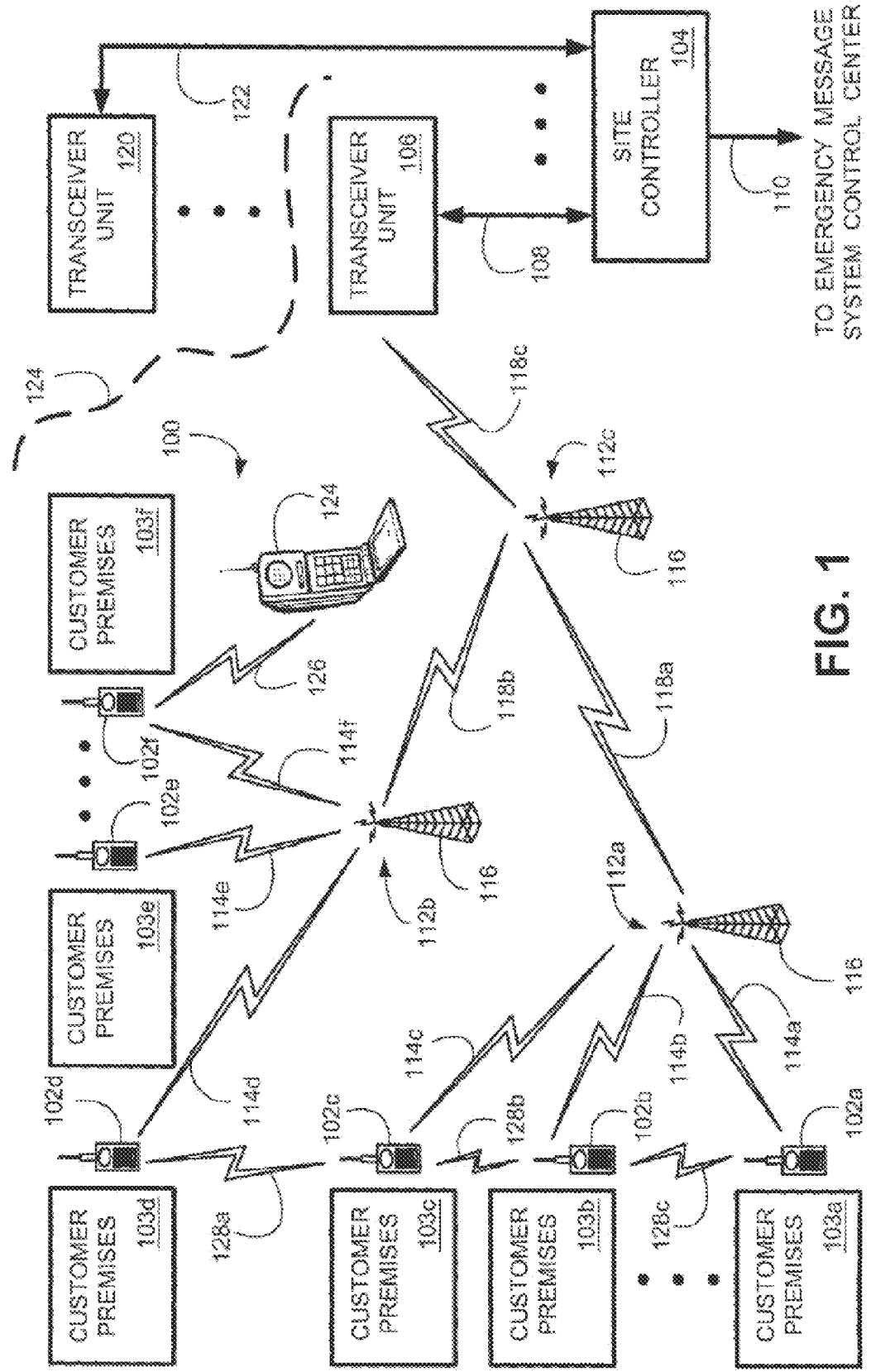
FIG. 1 is a block diagram illustrating a portion of a plurality transceivers residing transceiver network configured to detect and communicate emergency messages.

FIG. 1 is a block diagram illustrating a portion of a transceiver network 100 having a plurality transceivers. Preferably, transceivers 102a-102f (emergency message transceivers) are configured to selectively broadcast and/or receive emergency messages using radio frequency (RF) signals. A site controller 104 provides communications between a transceiver unit 106, via connection 108, and the emergency message system control center 300 (FIG. 3), via connection 110.

Figure 2:
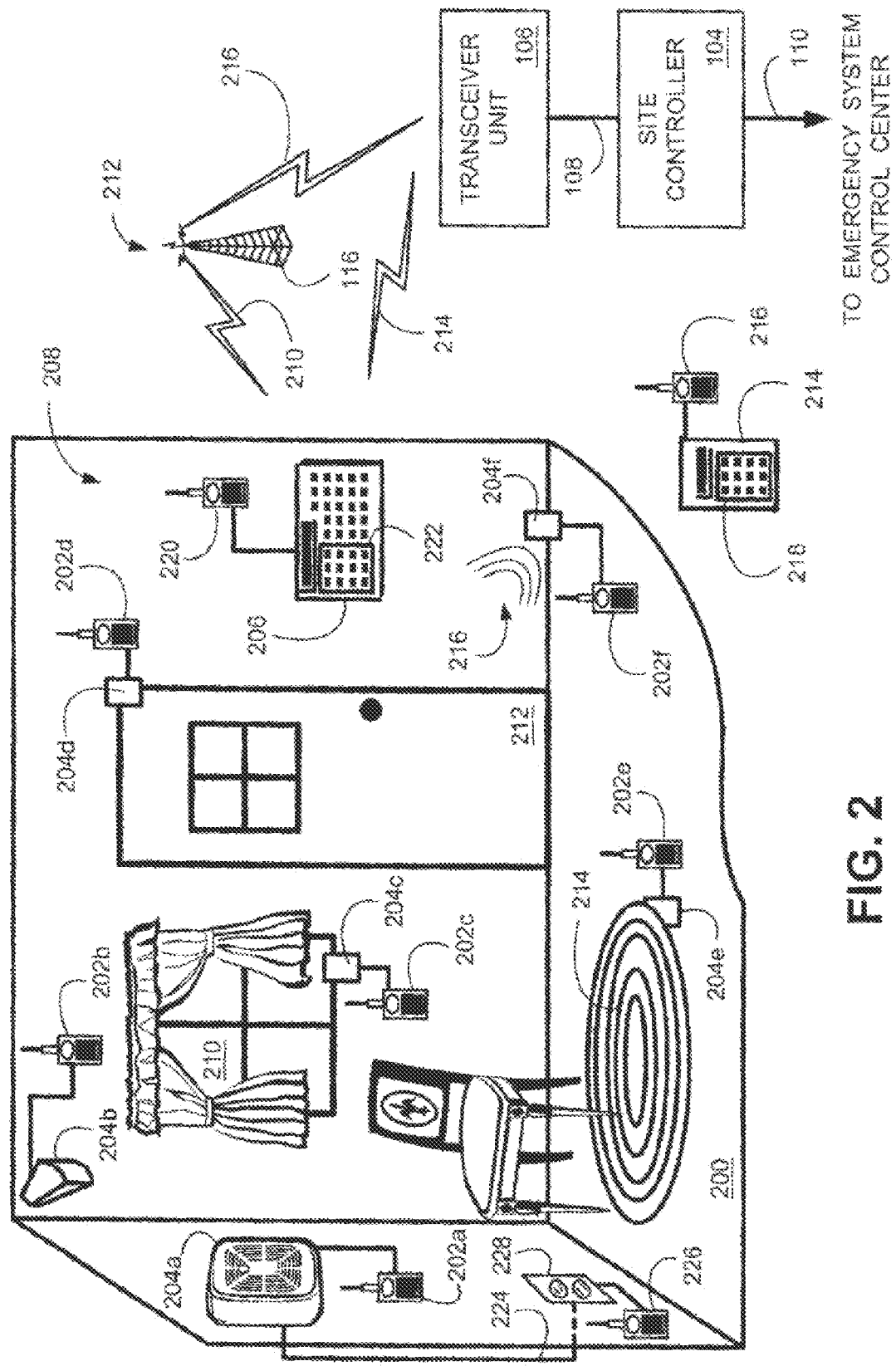
FIG. 2 is a block diagram illustrating selected transceivers coupled to monitoring devices coupled to the transceivers of FIG. 1.

FIG. 2 is a block diagram illustrating one embodiment of an emergency message transceiver system with transceivers 202a-202f coupled to detection devices 204a-204f residing in one of the exemplary customer premises of FIG. 1. The customer premises 200 includes a wall-mounted base station 206 to form an integrated security system 208.

Transceivers 202a-202f detect signals generated by the detection devices 204a-204f that indicate a violation of a monitored parameter, described in greater detail below. In response to receiving a signal from its respective detection device, the transceiver 202a-202f transmits an emergency message via an RF signal 210 that is detected by transmitter station 212. Transmitter station 212, located on a suitable high point, such as a tower 116 (see also FIG. 1), transmits an RF signal 216 to the transceiver unit 106. The transceiver unit 106 communicates the emergency message to the site controller 104 such that the emergency message is relayed on to the emergency message system control center 300 (FIG. 3).

Figure 3:
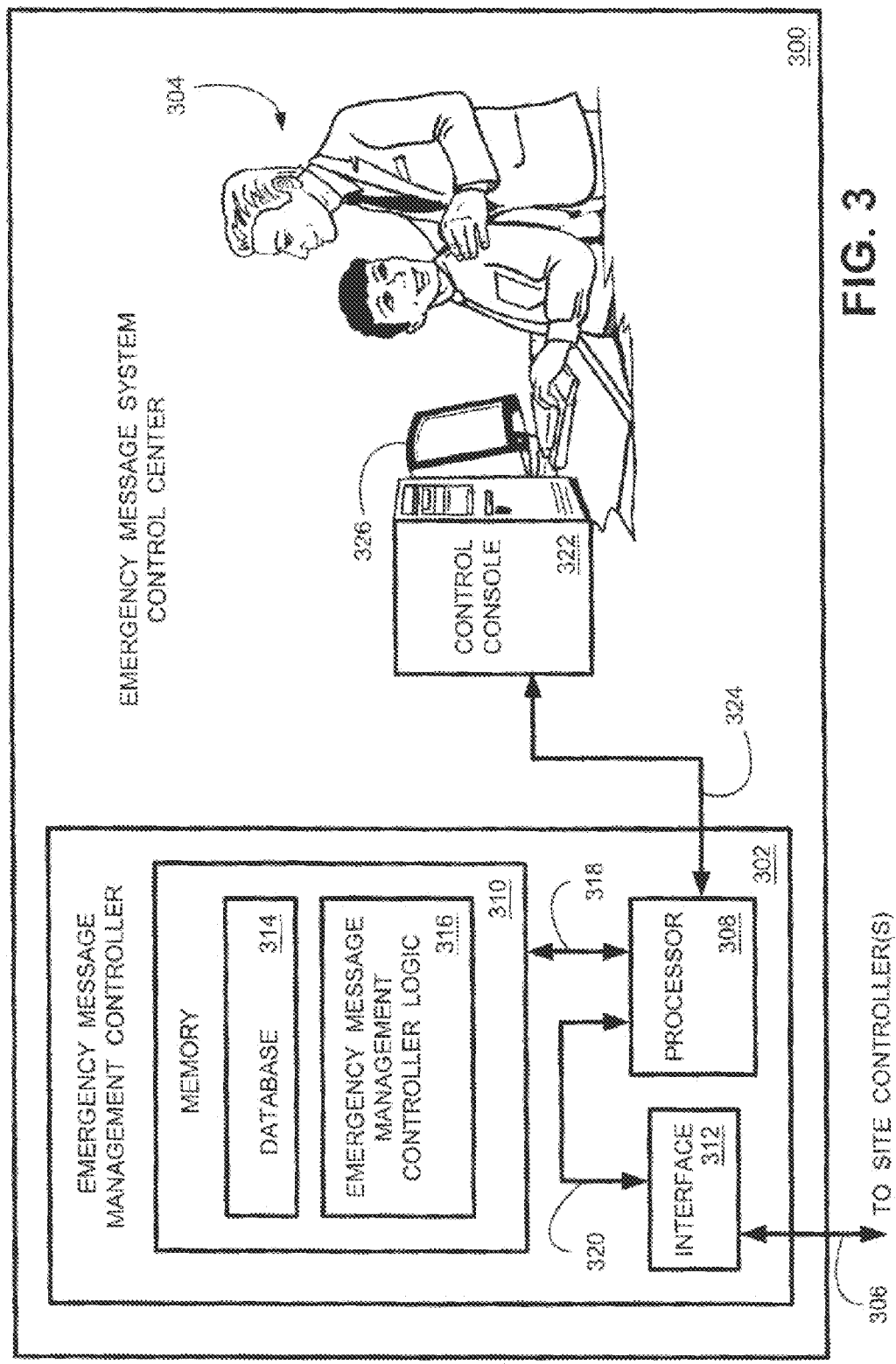
FIG. 3 is a block diagram illustrating selected components of an emergency message system control center in communication with the transceiver network of FIG. 1.

FIG. 3 is a block diagram illustrating selected components of an emergency message system control center 300 in communication with the transceiver network 100 (FIG. 1). The received emergency messages are received by an emergency message management controller 302, described in greater detail below. The emergency message control room operators 304 receive a processed emergency message from the emergency message management controller 302 and initiate appropriate actions in response to the received emergency message. For example, an emergency message received from the customer premises may indicate the presence of a fire. The emergency message control room operators 304 would then place a request to the local fire department to render assistance at the customer premises 200.

b. Emergency Message Transceiver System Environment

FIG. 1 is a block diagram illustrating a portion of a transceiver network 100 in communication with a plurality of transceivers 102a-102f (emergency message transceivers) residing at a plurality of customer premises 103a-103f, respectively. For convenience of illustration, and for convenience of explaining the operation and functionality of the emergency message system, only a few customer premises are illustrated on FIG. 1. A customer premise may be a home, a business or other location. Furthermore, for convenience of illustration, only one transceiver is illustrated at a customer premises 103a-103f. Typically, a plurality of transceivers would be coupled to a corresponding number of devices at the customer premises, one transceiver per device, as will be described in greater detail below.

An emergency message system is configured to receive emergency messages, in a manner described below, from many hundreds of transceivers, even many thousands of transceivers, depending upon the particular architecture that the emergency message system is implemented in. Therefore, the explanation of the operation and functionality of the emergency message system described below is limited to a small segment of the transceiver network 100 for convenience.

A first group of customer premises 103a-103f, each have at least one transceiver 102a-102f, respectively. Each transceiver 102a-102f has a unique, predefined identification code that resides in a memory in the transceiver.

An emergency message transmitted from any one of the transceivers 102a-102f is relayed to the emergency message management controller 302 (FIG. 3) via one or more of the transceiver stations 112a-112c. Preferably, the transceivers broadcast the emergency message using a suitable radio frequency (RF) signal. The emergency message includes at least the identification code of the transceiver generating the emergency message.

For example, transceivers 102a, 102b and 102c are illustrated as transmitting emergency messages via RF signals 114a, 114b and 114c, respectively. Similarly, transceivers 102d, 102e and 102f broadcast emergency messages to transceiver station 112b via RF signals 114d, 114e and 114f, respectively. A transceiver (not shown) in transceiver station 112a is illustrated as communicating a pollution information message to transceiver station 112b via signal 118a. The transceivers 102a-102f, and/or transceivers residing in the transceiver stations 112a-112c, may be identical to each other or be configured to have different characteristics, such as different bandwidths, frequencies and/or signal broadcast strengths.

Each of the transceiver stations 112a-112c detects a broadcasted emergency message from a broadcasting transceiver 102a-102f, depending upon the strength of the broadcasted emergency message and the distance of the transceiver station 112a-112c from the broadcasting transceiver. That is, a transceiver station 112a-112c detects broadcasted emergency messages from any transceivers and/or any transceiver stations in its reception range. Preferably, transceiver stations 112a-112c reside at a suitably elevated location, such as on a tower 116, high building, mountain top or the like to facilitate reception and transmission of emergency messages. Emergency messages from the transceivers 102a-102f are relayed by the transceiver stations 112a-112c to the transceiver unit 106 via RF signals 118a-118c. Each transceiver station has a transceiver (network transceiver) configured to communicate emergency messages with the transceivers 102a-102f, transceiver stations, and/or at least one transceiver unit 106. The transceivers residing in the transceiver station may be the same as one of the transceivers 102a-102f, or be configured to have different characteristics such as different bandwidths, frequencies and/or signal broadcast strengths. In some applications, a unique identification code associated with the broadcasting transceiver station is added to the emergency message.

For example, an emergency message detected by the transceiver station 112a is relayed to the transceiver station 112c via RF signal 118a. The emergency message is then relayed by the transceiver station 112c to the transceiver unit 106 via RF signal 115c. Similarly, an emergency message detected by the transceiver station 112b is relayed to the transceiver station 112c via RF signal 118b. Then, the emergency signal is relayed by the transceiver station 112c to the transceiver unit 106 via RF signal 118c.

One embodiment of the emergency message control system employs transceivers that use standardized digital communication formats such that the information is communicated as packetized units of digital data. Other embodiments employ other suitable communication formats. Other suitable communication formats may be either digital or analog signals.

The transceiver unit 106 converts received emergency messages into a suitable communication signal formatted for communication over a hardwire connection 108. In one embodiment, the transceiver unit 106 formats the received broadcasted RF emergency messages into a standardized RF 232 signal. Another embodiment converts the received emergency messages into a standardized RS 485 signal. A transceiver unit 106 may be configured to convert the received emergency messages from the transceivers 102a-102f and/or transceiver stations 112a-112c of the transceiver network 100 into any suitable signal for transmission over a hardwire interconnection, such as, but not limited to, a metallic conductor, a coaxial cable, an optical fiber cable or the like. In some applications, a unique identification code associated with the transceiver unit 106 is added to the emergency message.

When transceivers (not shown) at many additional customer premises (not shown) are integrated into the transceiver network 100, one skilled in the art will appreciate that a large network of transceivers will be able to communicate emergency messages to the emergency message management controller 302. For convenience of illustration, only a limited number of customer premises 103a-103f are illustrated in FIG. 1. Many other customer premises may be incorporated into the transceiver network 100 such that all of the transceivers of the customer premises are communicating to the emergency message management controller 302 via the transceiver network 100.

A portion of the transceiver network 100 illustrated in FIG. 1 is configured according to the strength of the broadcasted RF signals 114a-114f from the plurality of transceivers 102a-102f, and the strength of the broadcasted signals 118a-118c from the plurality of transceiver stations 112a-112c. Thus, many more customer premises can be configured to communicate with any number of a plurality of transceiver units located out in a serviced area. For example, a transceiver unit 120 is illustrated coupled to the site controller 104 via connection 122. Transceiver unit 120 is configured to communicate with another transceiver network (not shown). Thus, transceiver unit 120 may serve one geographic region and transceiver unit 106 may service a different geographic region. Cut-away line 124 indicates separation of the geographic regions. However, the geographic regions are, in reality, artificial in that any transceiver may communicate with any other transceiver unit so long as its broadcast signal strength is sufficient to be detected by the transceiver unit. Thus, any boundary associated with a geographic reign is easily redefined or changed by simply reconfiguring the defined communication path for a transceiver, as described in greater detail below.

Site controller 104 is configured to communicate with any desired number of transceiver units. Furthermore, a plurality of site controllers can be deployed within a service area, thereby increasing the area of coverage of the transceiver network 100. There are no known limitations that would limit the number of transceivers in communication with the emergency message system control center 300 (FIG. 3) when a suitable number of transceiver units and site controllers are implemented with a plurality of transceivers to form a transceiver network 100.

Site controller 104, in another embodiment, is configured to include other functionalities. Such functionalities may be implemented in a site controller without departing substantially from the operation and functionality of the invention. For example, a site controller 104 may be configured to transmit acknowledgement signals back to the transceiver initiating the emergency message or another designated transceiver. Such an embodiment is particularly advantageous in indicating to a person that emergency assistance is on the way or that an emergency message has been received from a location of interest, such as the person's home or business. In some applications, a unique identification code associated with the site controller 104 is added to the emergency message.

Furthermore, for convenience of illustration, the site controller 104 and the transceiver unit 106 are illustrated as separate components coupled together via connection 108. In another embodiment, the transceiver unit 106 and the site controller 104 are incorporated into a single unit that performs substantially the same functionality of the transceiver unit 106 and the site controller 104. Alternatively, the transceiver unit 106 and site controller 104 may be conveniently included in the same housing. Such an alternative embodiment is particularly advantageous when it is desirable to centrally locate components to provide easy access and/or when it is desirable to enclose the devices in a single environmentally protective enclosure.

Each one of the transceivers, transceiver stations and transceiver units, have a unique identification code, such as a unique alpha-numeric identification code, a hexa-decimal code, or a like identification code. For example, transceiver 102b may have the unique identification code "102b". When an emergency message is relayed by the transceiver 102b to the emergency message management controller 302 (FIG. 3), the emergency message is tagged or otherwise identified with the unique identity code "102b". Thus, the emergency message management controller 302 knows where the transceiver 102b is located since location information for the transceiver 102b is retained in a database 314 (FIG. 3), described in greater detail below. To determine the location of the transceiver generating an emergency message, the emergency message management controller 302 need only associate the location information in the database 314 with the unique identification code of the transceiver since the emergency message contains the identification code of the transceiver. Also, in one embodiment, the nature of the emergency can be determined if the type of detection device coupled to the transceiver 102b is described in the database 314.

Furthermore, the emergency message management controller 302 may specifically poll the transceiver 102b to provide information by broadcasting a signal, using the unique identification code "102b", such that the transceiver 102b recognizes that it is instructed to broadcast the status information back to the emergency message management controller 302. The emergency message management controller 302, via site controller 104, instructs transceiver 106 to broadcast an information request signal to the transceiver 102b. Thus, transceiver unit 106 broadcasts an information request signal to transceiver station 112c. Transceiver station 112c broadcasts the information request signal to transceiver station 112a, which then broadcasts the information request signal to the transceiver 102b.

Similarly, the emergency message management controller 302 is in >communication with all of the individual transceivers of FIG. 1 such that an emergency message is associated with specific transceivers. Furthermore, the emergency message management controller 302 may request information from any desired transceiver integrated into the transceiver network 100.

c. Integrating the Emergency Message Transceiver System into an Emergency Message System Control Center FIG. 3 is a block diagram illustrating selected components of one embodiment of an emergency message system control center 300 in communication with the transceiver network 100. Included as an integral component of the emergency message communication system is the emergency message management controller 302. The emergency message management controller 302 is coupled to at least one of the previously described site controllers 104 via connection 306. Connection 306 is coupled to connection 110 (FIGS. 1 and 2) through an intermediary communication system, described in greater detail below.

The emergency message management controller 302 includes at least a processor 308, a memory 310 and an interface 312. Memory 310 includes at least a database 314 and the emergency message management controller logic 316. Processor 308 is coupled to the memory 310 via connection 318 and is coupled to the interface 312 via connection 320.

When one the plurality of transceivers residing in the transceiver network 100 transmits an emergency message, the emergency message management controller 302 receives the emergency message and stores the received emergency message into database 314 or in another suitable location in a memory. Processor 308 executes the emergency message management controller logic 316 to appropriately store the received emergency message into the database 314 or in another suitable location in a memory. In one embodiment, database 314 employs a look-up table.

The database 314 includes information of interest such as, but not limited to, the identification code of each the transceivers, the location of the transceiver, and the nature of the emergency situation. The nature of the emergency situation in some applications is determined by the type of device to which the transceiver is coupled to. For example, if the transceiver is coupled to a smoke detector, the database 314 includes information indicating that a smoke detector is coupled to the transceiver such that an emergency message received from that transceiver indicates the possible presence of a fire based upon smoke detected by the smoke detector.

Other information of interest may also be included in the database 314. For example, but not limited to, information identifying the specific customer, customers address and/or attributes of the customer's security system may be included within database 314. Also, individuals that should be contacted when an emergency message is received may also be included in the database 314. The nature of the monitoring device that is monitored by the transceiver may also be included within the database 314. Such information pertaining to the nature of the monitoring device includes, but is not limited to, make, model, manufacturer, manufacture date and/or components Accordingly, any type of information of interest may be included within the database 314. Furthermore, information regarding attributes of the transceivers, the transceiver stations, the transceiver units and the site controllers, such as, but not limited to, make, model, manufacturer, manufacture date, components, identification codes and/or locations, may be included in database 314.

Figure 4:
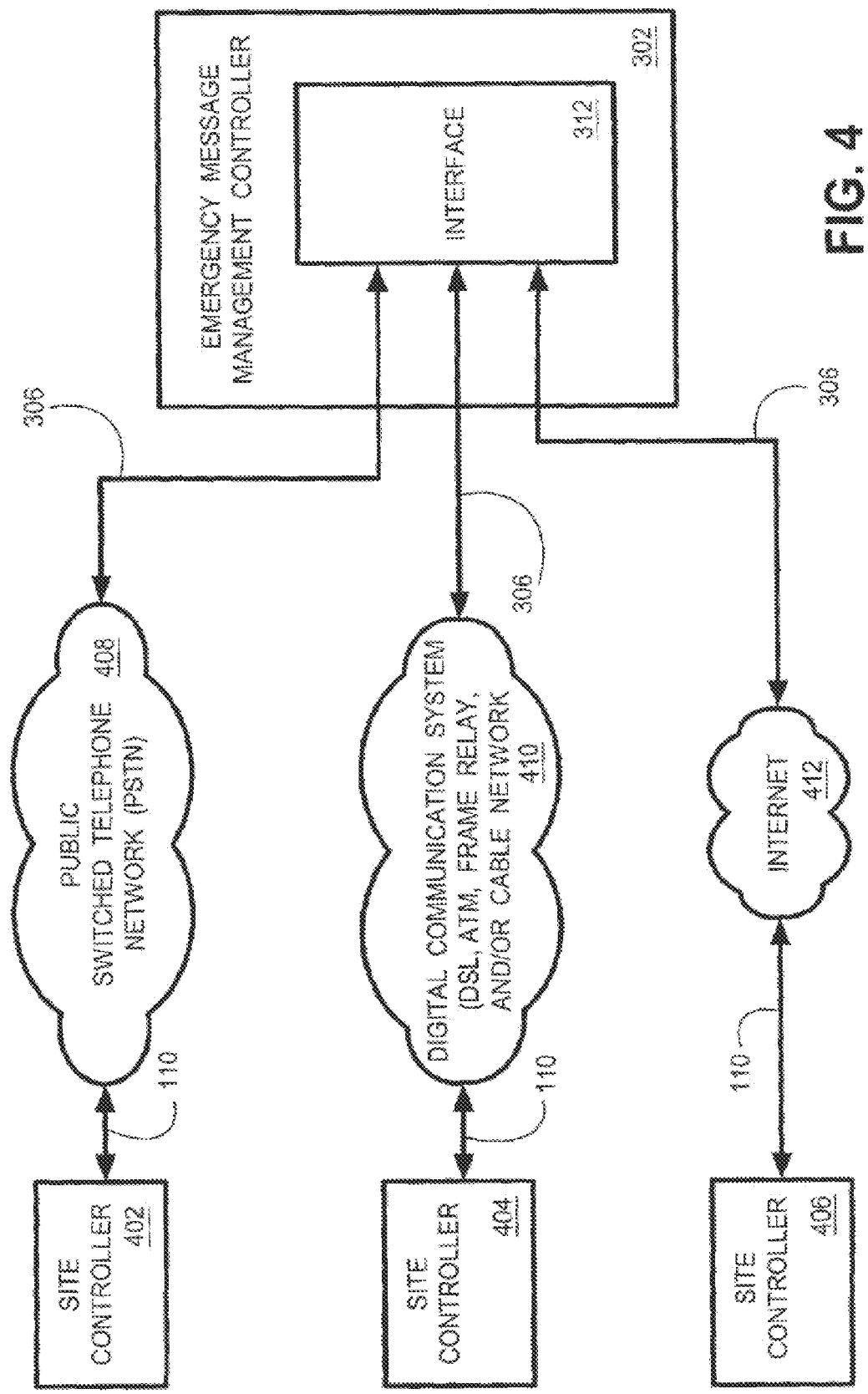
FIG. 4 is a block diagram illustrating alternative intermediate communication systems employed by the emergency message system of FIGS. 1-3.

The emergency message management controller 302 is illustrated as being coupled to the control console 322, via connection 324. Typically, the control room operators 304 interface with the various components residing in the emergency message system control center 300 via one or more control consoles 322. Information is displayed on a suitable interface device, such as a display screen 326. Thus, a control room operator 304, after determining a valid emergency message is received, requests appropriate emergency assistance from the appropriate emergency provider.

d. Communication Between Site Controllers and the Emergency Message Management Controller As described above with reference to FIGS. 1-3, a site controller 104 (FIGS. 1 and 2) is in communication with the interface 312 residing in the emergency message management controller 302 (FIGS. 3 and 4). FIG. 4 is a block diagram illustrating alternative intermediate communication systems employed by the emergency message communication system. Three exemplary site controllers 402, 404 and 406 are illustrated as being coupled to the interface 312 residing the emergency message management controller 302 via three communication systems. These exemplary intermediate communication systems are intended to illustrate some possible communication systems through which the connections 110 (FIGS. 1-2) and 306 (FIG. 3) may coupled to such that the emergency message communication system enables communication between the site controllers and the emergency message management controller 302.

Site controller 402 is communicating to interface 312 via a public switched telephone network (PSTN) 408, via connections 110 and 306. Thus, site controller 402 is configured to provide a suitable signal having an emergency message that is provided to the PSTN 408. PSTN 408 receives the suitably configured emergency message from the site controller 402 and relays the emergency message to the interface 312. Interface 312 converts the received emergency message from the PSTN 408 and reformats the emergency message into a suitable communication signal that is provided to processor 308 (FIG. 3) such that the emergency message is stored in the database 314 (FIG. 3) in a manner described above.

In one embodiment, when the emergency message management controller 302 issues an acknowledgement signal, the interface 312 converts the acknowledgement signal into a suitable signal formatted for communication over the PSTN 408. The suitably formatted acknowledgement signal is then communicated through the PSTN 408 and is transmitted to the site controller 402 via connections 306 and 110. The site controller 402 then converts the received acknowledgement signal from the PSTN 408 into a suitably formatted signal for transmission out to the selected transceiver(s) as described above.

The components (not shown) residing in the interface 312 and the site controller 402 that are configured to transmit, receive and convert signals from the PSTN 408 are known in the art and, therefore, are not described in detail herein other than to the extent necessary to understand the operation and functioning of these components when employed as part of the interface 312 and the site controller 402. Such known components are too numerous to describe in detail herein, and that any configuration of such known components having the above-described functionality may be implemented in the interface 312 and the site controller 402 without departing substantially from the emergency message control system. Any such implementation of components configured to receive and convert communication signals from PSTN 408 are intended to be within the scope of this disclosure and to be protected by the accompanying claims.

Site controller 404 is communicating to interface 312 via a digital communication system 410, via connections 110 and 306. Thus, site controller 404 is configured to provide a suitable signal having an emergency message that is provided to the digital communication system 410. The digital communication system 410 is a based communication system configured to communication information in a digital format. Non-limiting examples of such digitally based communications systems include digital subscriber loops (DSL), X.25, Internet protocol, (IP), Ethernet, Integrated services digital network (ISDN) and asynchronous transfer mode (ATM). Such digital communication systems may employ a PSTN, a frame relay based network and/or cable network. Furthermore, such digital communication systems may employ combinations of the above-described systems having a plurality of segments employing different technologies on each segment.

The digital communication system 410 receives the suitably configured emergency message from the site controller 404 and relays the information to the interface 312. Interface 312 converts the received emergency message from the digital communication system 410 and reformats the emergency message into a suitable communication signal that is provided to processor 308 (FIG. 3) such that the emergency message is stored in the database 314 (FIG. 3) in a manner described above.

In one embodiment, when the emergency message management controller 302 issues an acknowledgement signal, the interface 312 converts the acknowledgment signal into a suitable signal formatted for communication over the digital communication system 410. The suitably formatted acknowledgement signal is then communicated to the digital communication system 410 and is transmitted to site controller 404, via connections 306 and 110. The site controller 404 then converts the received acknowledgement signal from the digital communication system 410 into a suitably formatted signal for transmission out to the selected transceiver(s) as described above.

The components (not shown) residing in the interface 312 and site controller 404 that are configured to received and convert signals from the digital communication system 410 are known in the art and, therefore, are not described in detail herein other than to the extent necessary to understand the operation and functioning of these components when employed as part of the interface 312 and the site controller 404. Such known components are too numerous to describe in detail herein, and that any configuration of such known components having the above-described functionality may be implemented in the interface 312 and the site controller 404 without departing substantially from the emergency message communication system. Any such implementation of the components configured to receive and convert communication signals from the digital communication system are intended to be within the scope of this disclosure and to be protected by the accompanying claims.

Site controller 406 is communicating to interface 312 via a Internet system 412, via connections 110 and 306. Thus, site controller 406 is configured to provide a suitable emergency message to the Internet system 412. Internet system 412 receives the suitably configured emergency message from the site controller 406 and relays the information to the interface 312. Interface 312 converts the received emergency message from the Internet system 412 and reformats the emergency message into a suitable communication signal that is provided to processor 308 (FIG. 3) such that the emergency message is stored in the database 314 (FIG. 3) in a manner described above.

When the emergency message management controller 302 issues an acknowledgement signal, the interface 312 converts the acknowledgement signal into a suitable signal formatted for communication over the Internet system 412. The suitably formatted acknowledgement signal is then communicated through the Internet system 412 and is transmitted to the site controller 406, via connections 306 and 110. The site controller 406 then converts the received acknowledgement signal from the Internet system 412 into a suitably formatted signal for transmission out to the selected transceiver(s) as described above.

The components (not shown) residing in the interface 312 and the site controller 406 that are configured to transmit, receive and convert signals from the Internet system 412 are known in the art and, therefore, are not described in detail herein other than to the extent necessary to understand the operation and functioning of those components when employed as part of the interface 312 and the site controller 406. Such known components are too numerous to describe in detail herein, and that any configuration of such known components having the above-described functionality may be implemented in the interface 312 and the site controller 406 without departing substantially from the emergency message communication system. Any such implementation of components configured to receive and convert communication signals from the Internet system 412 are intended to be within the scope of this disclosure and to be protected by the accompanying claims.

Other embodiments of the site controllers and the interface 312 are configured to communicate with other communication networks or combination networks having a plurality of segments employing different communication technologies on each segment. For example, a site controller and a interface could be configured to communicate over satellite based communication systems. Another example includes a combination system that employs the PSTN 408 and the Internet system 412. Such a combination system includes an interface device to interface the PSTN 408 with the Internet system 412. There are no intended limitations with respect to the interfacing communication technology through which a site controller and an interface 312 (FIG. 3) communicate. Any such implementation of a site controller and an interface 312 configured to communicate through a communication technology in accordance with the operation and functionality of the emergency message system described herein is intended to be within the scope of this disclosure and to be protected by the accompanying claims.

One embodiment of the site controller and/or interface 312 employs a plurality of standardized components, and is configured to receive an interface card. The interface card is configured to provide connectivity to the communication system that is used by the emergency message communication system to communicate over. Such an embodiment is particularly suited to implementing a mass produced emergency message system.

One embodiment of the site controller includes additional components (not shown) that apply an encryption to emergency messages transmitted to the emergency message management controller 302 (FIG. 3). Similarly, the interface 312 (FIG. 3) may be configured to transmit encrypted emergency messages. The received emergency messages are decrypted by the receiving device. Such an embodiment is desirable when security of the emergency message is important, such as, but not limited to, emergency messages generated by transceiver employed in an integrated security system 208 (FIG. 2).

e. Embodiment of an Emergency Message Transceiver in an Integrated Security System FIG. 2 is a block diagram illustrating one embodiment of an emergency message transceiver system with transceivers 202a-202f. Each one of the transceivers 202a-202f are coupled to an exemplary detection device 204a-204f residing in one of the exemplary customer premises of FIG. 1. In one embodiment, the customer premises 200 includes a wall-mounted base station 206 to form an integrated security system 208, as described below. Such an integrated security system is suitable for installation in a residence, business or other type of customer premises.

The exemplary detectors 204a-204f illustrate selected types of a variety of detection devices that may be employed as part of an integrated security system 208. For example, detector 204a is configured to detect the presence of smoke. Thus, smoke detector 204a indicates a possible fire at the customer premises 200 when smoke is detected.

Detector 204b is configured to sense movement of intruders within the customer premises 200. Detector 204c is configured to detect the opening of window 210. Similarly, detector 204d is configured to detect the opening of door 212. Detector 204e is a pressure sensitive detecting device that detects the pressure of an intruder walking over the carpet 214. Detector 204f is configured to detect sound waves 216, such as sound associated with glass breakage or forced entry through the door 212. Thus, detectors 204b-202f are configured to detect an intrusion into the customer premises 200 so that an emergency message may be generated.

In one embodiment, each of the detectors 204a-204f are coupled to a transceiver 202a-202f, respectively, such that the emergency message is broadcasted out to the transceiver station 212 via signal 210. Since each transceiver has a predefined unique identification code, the identification code is used by the energy message management controller 302 to identify the detectors 204a-204f.

For convenience of illustration, the transceivers 202a-204f are illustrated as residing outside each of its respective detectors and coupled to its respective detector by a connection. Such an embodiment is particularly advantageous for retrofitting detectors of an existing home security systems into the integrated security system 208.

Alternatively, the transceivers 202a-202f are fabricated into each one of its respective detectors during the manufacturing process as an internal integrated component. Such an embodiment is particularly advantageous in providing for an integrated security system 208 that is easily installed with a minimum of labor and expense. That is, since each detection device includes an internal transceiver configured to transmit emergency messages, the installation of the detectors in the customer premises 200 may be effected without the installation of signal wires to a central control panel in a home security system.

Furthermore, the integrated security system 208 does not necessarily require a control panel in that each of the transceivers 202a-202e are configured to communicate directly with any transceiver station within its broadcast range, such as transceiver station 212. Furthermore, if the transceiver unit 106 is in a sufficiently close proximity to the transceivers 202a-202e, emergency message signals broadcasted by the transceivers 202a-202e may be directly detected by the transceiver unit 106 via signal 218.

The integrated security system 208 may include other components. Such components may be coupled to a transceiver, or may include a transceiver as an internal integrated component, as described above. In one embodiment, control panel 206 may be configured to coordinate with the other detectors 202a-202e. For example, a person authorized to enter the customer premises 200 may enter the customer premises and activate the motion detector 204b, the door opening detector 204d, the pressure detector 204e and/or the noise detector 204f. The corresponding transceivers 202b, 202d, 202e and/or 202f generate an emergency broadcast signal that is detected by the control panel transceiver 220. Since the broadcasting transceiver(s) 202b, 202d, 202e and/or 202f are uniquely identified by their predefined identification code, the emergency message management controller 302 (FIG. 3) determines which of the detectors 204b, 204d, 204e and/or 204f have detected an intruder.

The control panel 206 is then configured to allow a predefined period of time for the person entering the customer premises 200 to enter a security number or the like, via a keypad 222, such that the integrated security system 208 recognizes that the person is authorized to enter the customer premises 200. Accordingly, the control panel 206 employs the transceiver 206 to broadcast an emergency message indicating that a proper security code has been received and that the person entering the customer premises 200 is an authorized person. Thus, when the emergency signal from one or more of the transceivers 202b, 202d, 202e and/or 202f is followed by an emergency message from the transceiver 200 indicating that an appropriate security code has been timely received, the emergency message management controller 302 (FIG. 3) receiving the emergency messages understands that the person entering the customer premises 200 is an authorized person and not an intruder. However, if the control panel 206 does not generate an emergency message indicating that an appropriate security code has been received, the emergency message management controller 302 understands that an intruder in the customer premises 200 has been detected and then generates an appropriately configured emergency message that is transmitted to the control room operators 304, via the control console 322 (FIG. 3). The control room operators would then request suitable emergency assistance at the customer premises 200.

Similarly, smoke detector 204a may detect the presence of smoke such that the transceiver 202a transmits a corresponding emergency signal. If a person in the customer premises 200 is merely cooking dinner and burns some of the food, thereby generating the detected smoke, an actual fire condition may not be present. Thus, the person may enter a predefined security code through the control panel 206 such that an emergency message signal is transmitted by the transceiver 220, thereby indicating to the energy message management controller 302 that a fire is not present at the customer premises 200.

In one embodiment, the emergency message management controller 302 may indicate to the control room operators 304 that the smoke detector 204a has detected smoke, but that the received security code indicates that an actual fire is not present and that emergency service from the fire department need not be summoned. Alternatively, another embodiment may not notify the control room operators 304 that the smoke detector 204a has detected smoke if the security code is received in a timely manner. However, with either embodiment, if the security code is not received by the control panel 206, an emergency message is transmitted to the control room operators 304 indicating the detection of smoke by the smoke detector 204a.

Because each transceiver 202a-202f is identified by a unique identification code, location information for each transceiver residing in the database 314 (FIG. 3) is used to precisely identify the location of the broadcasting transceiver, and therefore precisely identify the location of the emergency. Since the received emergency message includes the unique identification code of the transceiver generating the emergency message, the location is determined by associating the identification code of the transceiver with information residing in database 314 (FIG. 3). Furthermore, additional information residing in the database 314 may indicate the nature of the emergency and/or provide other relevant information. For example, a message received from transceiver 202a, coupled to the smoke detector 204a (FIG. 2), may indicate that the smoke detector 204a has detected smoke. Accordingly, the control room operators 304 can summon emergency assistance from the fire department and direct the fire department personnel to the address of the customer premises 200 when an emergency message is received from the transceiver 202a.

Similarly, if an intruder opens the window 210 such that the detector 204c detects the window opening, the transceiver 202c transmits an emergency message to the energy message management controller 302. Because the transceiver 202c is uniquely identified and the location of the transceiver 202c is specified in the database 314, the control room operators 304 upon receiving the emergency message and the address location of the customer premises 200 could summon the police to investigate the presence of the opened window 210.

As described above, emergency messages generated by any one of the detectors 204a-204f causes the emergency signal to be relayed through the transceiver network 100 (FIG. 1) such that the emergency message is received and processed by the emergency message management controller 302. In an alternative embodiment, the control panel 206, or other suitable coordination device, is configured to detect and recognize emergency messages broadcasted by the transceivers 202a-202f. Other transceivers within the broadcasting range of the transceivers 202a-202f are configured to ignore emergency messages broadcasted by the transceivers 202a-202f. Since the broadcasting transceiver(s) 202b, 202d, 202e and/or 202f are uniquely identified by their predefined identification code, the control panel 206 determines which of the detectors 204b, 204d, 204e and/or 204f have detected an intruder.

Accordingly, if the appropriate security code is not received in a timely manner by the control panel 206, a single emergency message is broadcasted by the transceiver 220 to the emergency message management controller 302 (FIG. 3) in the manner described above. If a security code is received in a timely manner, no emergency message is broadcasted by the transceiver 220. That is, the control panel 206, or other suitable coordinating device, coordinates emergency messages of the integrated security system. Such an embodiment is particularly desirable when it is desirable to reduce the number of emergency messages transmitted to the emergency message management controller 302.

For example, in the above-described embodiment employing the control panel 206 as a coordinator of emergency messages for the integrated security system 208, the presence of an intruder may be detected by the motion detector 204b.

An emergency message broadcasted by the transceiver 202b is detected by the transceiver 220 and relayed to the control panel 206. Should the transceiver station 212 be within the broadcast range of the transceiver 202b, a transceiver (not shown) residing in the transceiver station 212 is configured to ignore any emergency messages from the transceiver 202b. Accordingly, if the authorized security code is not received in a timely manner by the control panel 206, a single emergency message is broadcasted by the transceiver 220. The transceiver residing in the transceiver station 212 is configured to detect the emergency message from the transceiver 220, thereby relaying the emergency message to the emergency message management controller 302, as described above.

The integrated security system 208 may further include a personal security device 214. The personal security device 200 is coupled to or included as an internal component a transceiver 216. The transceiver 216, in one embodiment, is configured to communicate with the control panel 206. Thus, if an authorized person desires to enter the customer premises 200, the person enters the appropriate security code through a keypad 218 on the personal device 214. The transceiver 216 relays the security code signal to the transceiver 206 such that the control panel 200 recognizes that a valid security code has been received. Accordingly, the control panel 206 generates an emergency signal, broadcasted by the transceiver 220, indicating that the security code has been received in a timely manner. Alternatively, in an embodiment employing a control panel 206 is a coordinator of emergency messages, the transceiver 220 does not broadcast an emergency message upon receiving the security code in a timely manner.

In another embodiment, the personal device 214 generates an emergency signal having the security code such that the transceiver 216 directly transmits the security code to the energy message management controller 302. Thus, the personal device 214 is forming the same functionality as the control panel 206. Here, the integrated security system 208 would not necessarily employ the control panel 206, but employs one or more of the personal devices 214 to broadcast an emergency message indicating that the security code has been received in a timely manner.

Furthermore, the personal device 214 provides a convenient way for a person to remotely arm the integrated security system 208. That is, a person arms the integrated security system 208 from outside of the house. Such a feature is convenient if the person desires to arm the integrated security system 208 when leaving the customer premises 200. Similarly, the person may arm the integrated security system 208 when inside the customer premises 200. For example, if the integrated security system 208 is installed in a residence, the person may arm the integrated security system 208 from the bedside or other convenient location.

The exemplary detectors 204a-204f described above are intended to merely illustrate a few of the wide variety of detectors and other devices that are integrated into the integrated security system 208. Other types of suitable detectors include, but are not limited to, detectors for water, moisture, temperature or humidity. Such detectors are configured to generate an emergency message that is broadcasted by a transceiver coupled to or residing in the detector.

Furthermore, a variety of appliances, such as but not limited to, a TV or a toaster, are easily be integrated into the integrated security system 208. For example, it may be desirable to monitor the operating status of a toaster for safety reasons. Thus, if a toaster is left on after use, the transceiver generates an emergency message indicating that the toaster has inadvertently been left on such that a potential fire hazard is created. Accordingly, the control room operators could initiate an appropriate response to ensure that the toaster is turned off before a fire occurs. For example, the control room operators 304 could summon the fire department or contact the owner of the customer premises 200.

As described above, the exemplary detector 204a-204f are described as detector devices installed in a fixed location within the customer premises. Such devices may be installed in other convenient locations, such as, but not limited to, outside the customer premises.

Furthermore, the detectors may be portable or moveable. For example, but not limited to, the motion detector 204b (and its associated transceiver 202b) may be relocated to another location within the customer premises 200 to change the are of coverage provided by the motion detector 204b.

Also, the detectors may be installed on moveable property, such as an automobile, truck, boat, airplane, art object or the like. In another embodiment, a transceiver is coupled to or integrated within a monitor that is attached to a person. Such an embodiment may be particularly advantageous when the detector is monitoring a health condition, such as a person's heartbeat rate or the like, or when the detector is determining location, such as the location of a child, pet, art object or the like.

In yet another embodiment, emergency messages are relayed directly to the personal security device 214 such that the person possessing the personal security device 214 is made aware of the emergency messages from the integrated security system 208. The emergency management controller 302 (FIG. 3) communicates the emergency message out into the network 100 (FIG. 1). Since the personal security device is identified by a unique identification code, the message is directed to the personal security device 214 by including the identification code of the personal security device 214 in the emergency message. One embodiment employs a beeper or other noise generator, a light indicator, a vibrator or the like to get the attention of the person.

For example, if the person is at work, and an intruder enters the customer premises 200 such that the motion detector 204b causes the transceiver 202b to broadcast an emergency message, the person is directly notified of the emergency message. The emergency message broadcasted by the transceiver 202b (assuming the failure to receive an appropriate security code entry) is broadcasted out to the transceiver station 212. The transceiver station 212 relays the emergency message, via transceiver unit 106 and the site controller 104, to the emergency message management controller 302 (FIG. 3). The emergency message management controller 302 then causes an emergency message to be transmitted to the personal security device 214 so that the owner of the customer premises 200, or another appropriate individual, is aware that the motion detector 204b has detected the presence of an intruder.

f. Embodiment of an Always-On Appliance Transceiver

Figure 5:
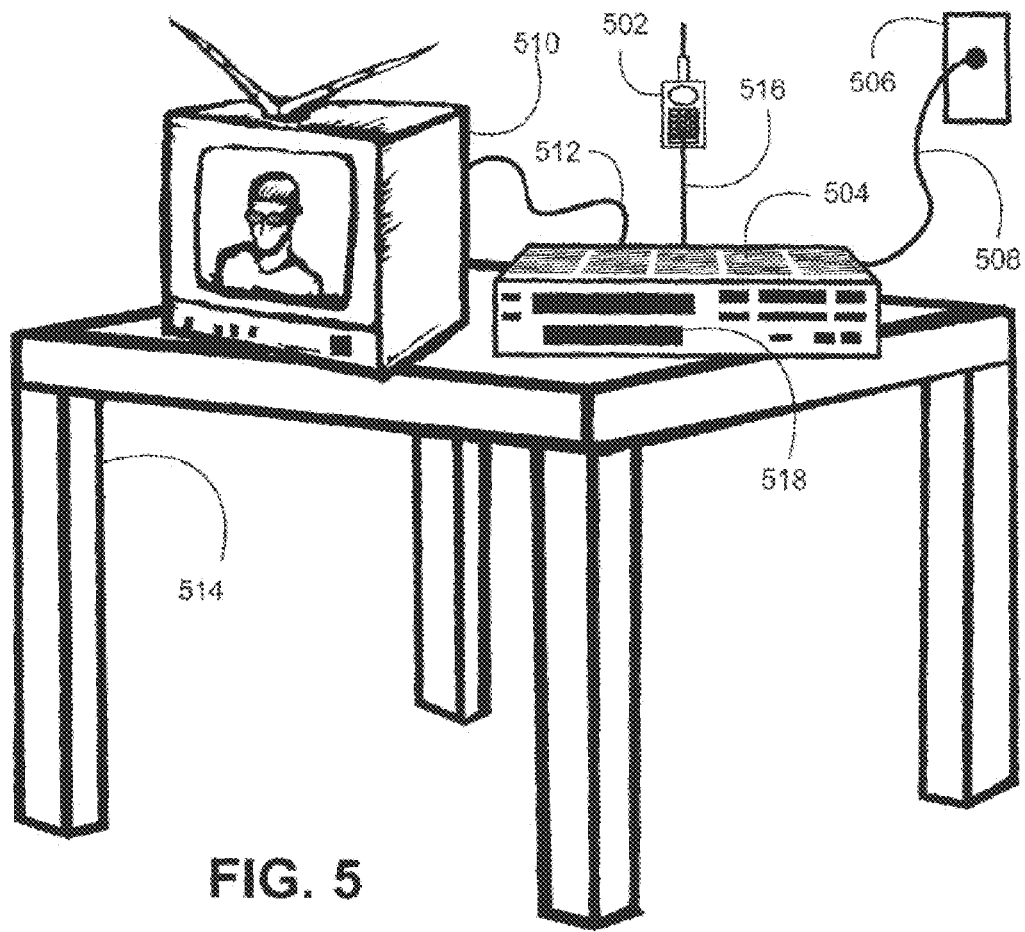
FIG. 5 is a block diagram illustrating an embodiment of an emergency message transceiver coupled to an always-on appliance unit residing in the customer premises.

FIG. 5 is a block diagram illustrating an embodiment of an emergency message transceiver 502 coupled to an always-on appliance unit 504 residing in the customer premises. The exemplary always-on appliance unit 504 is illustrated as a cable television (TV) set box. Other suitable always-on appliances may be configured to communicate with an emergency message transceiver 502. For example, a home personal computer (PC), a security alarm system control panel, a digital telephone/message system, or a fax machine are other examples of suitable always-on appliances configured to operate with a transceiver of the present invention. Such always-on appliances typically include a display device such that an emergency message could be indicated to a person viewing the display device. Furthermore, the always-on appliance may be a mobile appliance such as a pager, cell phone or the like.

The phrase "always-on appliance" as used herein designates an appliance that is probably on for periods of time such that a person viewing the appliance for its normal intended use is likely to be notified of a received emergency message. For example, a TV may not always be on, but rather on for periods of time. Similarly, a pager may be occasionally turned off, such as when the user is in a theater or sleeping at night. Such devices are considered as always-on appliances herein.

According to the exemplary system illustrated in FIG. 5, the cable TV set box 508 is coupled to an external TV cable system (not shown) via a cable 506 that is coupled to a cable TV wall outlet 508. TV signals from the cable TV network are provided to the TV 510 via cable 512. For convenience, the cable TV set box 504 and the TV 510 are illustrated as sitting on the table 514. The emergency message transceiver 502 is coupled to the cable TV set box 504 via connection 516. Alternatively, the emergency message transceiver 502 is incorporated internally within the cable TV set box 504 as an integral integrated component.

When an emergency message is received by the emergency message management controller 302 (FIG. 3), it may be desirable to communicate the emergency message to an individual in close proximity to the always-on appliance.

For example, a tornado detector may detect the possible presence of a tornado. An emergency message transceiver (not shown) coupled to the tornado detector (not shown) generates an emergency message to the emergency message management controller 302. The transceiver coupled to the tornado detector has a predefined unique identification code. Because the location of the transceiver coupled to the tornado detector is precisely known, since the identification code of the transceiver is associated with data in the database 314 (FIG. 3), the emergency message management controller 302 generates an emergency message that is broadcasted out to the emergency message transceiver 502. The emergency message is directed to the emergency message transceiver 502 by specifying the unique identification code of the emergency transceiver 502 in the broadcasted emergency message. Furthermore, the emergency message may be directed to many different locations by specifying identification codes in the emergency message.

Similarly, the transceiver 502 can be configured to receive an emergency message generated by one of the above-described transceivers 202a-202f employed in an integrated security system 208 (FIG. 2). Also, the transceiver 502 can be configured to receive an emergency message generated by one of the above-described transceivers 216, or a personal emergency message transceiver 602 described below, or a transceiver configured to detect emergency 911 calls as described below. Accordingly, a person viewing the always-on device is made aware that one of the transceivers 202a-202f coupled to detection devices 204a-204f, or the wall-mounted base station 206, have generated an emergency message. As described above, the emergency message communicated to the always-on appliance includes other information of interest, such as, but not limited to, the nature of the emergency situation.

In one embodiment, the emergency message transceiver 502 is configured to generate an emergency message signal that is configured to be displayed on the always-on appliance. Such an embodiment includes a signal generator (not shown) that process the received emergency message into a signal suitably formatted for the always-on appliance. In the exemplary system illustrated in FIG. 5, an emergency message is displayed on a display 518 residing on the cable TV set box 504. Furthermore, another embodiment is configured to generate an appropriate emergency message on the TV 510 such that a person viewing the TV 510 would understand that a tornado, and its corresponding location, has been detected.

Some embodiments of the always-on appliance are configured to receive communications from a person that has received the emergency message. For example, the always-on appliance may be a PC. Accordingly, when the user of the PC receives the emergency message, the user may respond with a request for additional information and/or may request emergency assistance. For example, if the received emergency message indicates that a tornado has been detected in close proximity to the emergency message transceiver 502, the user of the PC may request emergency help to effect an evacuation of the premises. Such an embodiment may be particularly useful if physically impaired people and/or small children requiring assistance in evacuations are nearby the always-on appliance.

In yet another embodiment, the request for additional information or for emergency assistance is made using the control panel 206 and/or the personal security device 214 (FIG. 2). Here, the person receiving the emergency message from the always-on appliance uses the keyboards coupled to the control panel 206 and/or the personal security device 214 to generate an emergency message requesting additional information and/or emergency assistance to the transceiver 502. The transceiver 502 then relays the request for additional information or emergency assistance back to the energy message management controller 302 (FIG. 3). Accordingly, the control room operators 304 provides the additional information and/or request emergency assistance from the appropriate public emergency service agencies.

g. Embodiment of a Personal Emergency Transceiver

Figure 6:
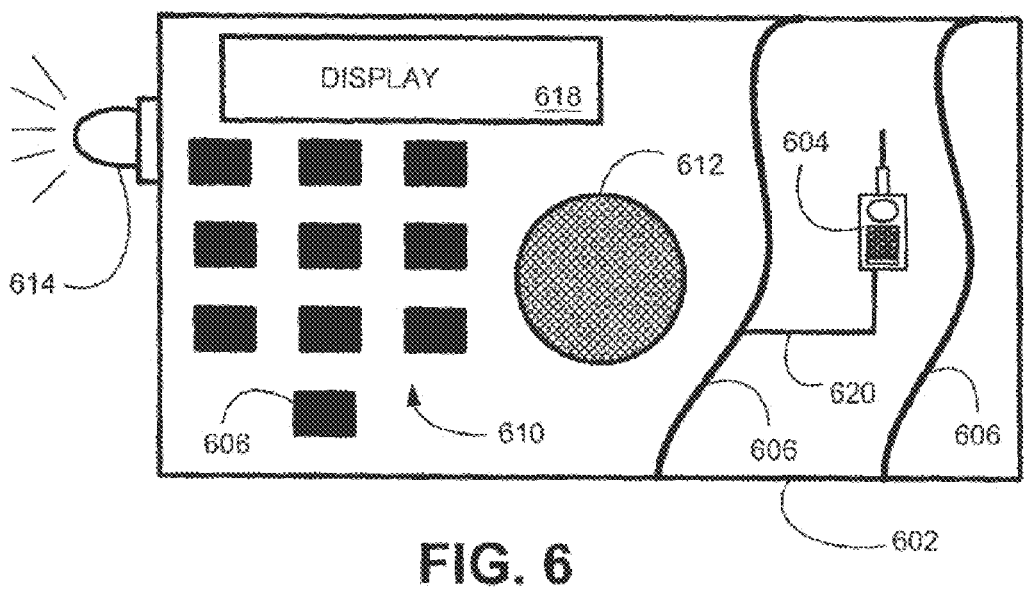
FIG. 6 is a block diagram illustrating an embodiment of a personal emergency message transceiver.

FIG. 6 is a block diagram illustrating an embodiment of a personal emergency message transceiver 602. The personal emergency transceiver 602 includes a transceiver 604 in accordance with the present invention. The transceiver 604 includes or is coupled to a memory (not shown) having a predefined unique identification code.

For convenience of illustration, the transceiver 604 is illustrated as an internal component of the personal emergency message transceiver 602, as indicated by the two cut-away lines 606. One embodiment of the personal emergency message transceiver 602 includes at least one button 608. Button 608 may be any suitable pressure sensitive device or switch device that is manually actuated by a person. Another embodiment includes a keypad 610 having a plurality of push buttons or the like. Another embodiment includes a speaker 612, a light 614, a display 618, and/or a microphone (not shown). Other embodiments may employ various combinations of the button 608, the keypad 610 and the speaker 612.

The personal emergency message transceiver 602 is preferably a very small, easy to carry device. The personal emergency message transceiver 602 is sufficiently small to conveniently carry in a person's pocket, clip onto the person's belt or the like, fit into a purse and/or attach to a key chain or other convenient apparatus.

Each of the above-described embodiments of the personal emergency message transceiver 602 are configured to generate and/or receive signals to and/or from the transceiver 604, via connection 620. For example, the button 608 is configured to generate a signal such that when the person using the personal emergency message transceiver 602 actuates button 608, an emergency message (which includes the unique identification code of the emergency message transceiver 602) is broadcasted by the transceiver 604. The emergency message broadcasted by the transceiver 604 is detected by any other transceiver of the transceiver network 100 (FIG. 1) such that the detected emergency message is relayed to the emergency message management controller 302 (FIG. 3) by the network transceivers in the manner described above. As the first network transceiver relays the emergency message, the network transceiver adds its unique identification code to the emergency message. When the emergency message reaches the emergency management controller 302, the emergency message includes the unique identification code of the broadcasting personal emergency message transceiver 602 and the first network transceiver. (Other embodiments may include the identification code of all network transceivers relaying the emergency message to the emergency message management controller 302.)

Although the exact location of the personal emergency message transceiver 602 is not precisely known because the emergency message transceiver 602 itself is portable, the precise location of the first network transceiver relaying the broadcasted emergency message is precisely known [since location information for the first relaying network transceiver resides in the database 314 (FIG. 3)]. Accordingly, the emergency message management controller 302, based upon the known location of the receiving transceivers, may closely approximate the location of the personal emergency message transceiver 602. Furthermore, if multiple transceivers in the transceiver network 100 detect the broadcasted emergency message from the transceiver 604, the emergency message management controller logic 316 executes a position determination algorithm to triangulate more precisely the location of the personal emergency message transceiver 602.

In the embodiment of the personal emergency message transceiver 602 employing a keypad 610, the person using the personal emergency message transceiver 602 uses the keypad 610 to generate alpha-numeric messages. For example, an alpha-numeric message may indicate a need for a particular type of emergency assistance, such as an ambulance, the police, the fire department or a tow truck. One embodiment of the personal emergency message transceiver 602 employs a number of push buttons or the like, each configured for a particular type of emergency situation. For example, one button may selectively indicate a need for an ambulance, and another button may indicate the need for a tow truck. Another embodiment of the personal emergency message transceiver 602 is configured with a plurality of buttons, or the like, each button being associated with one or more alphanumeric characters. Accordingly, the user of such an embodiment having a keypad with a plurality of buttons associated with alpha-numeric characters may generate a customized emergency message that is broadcasted by the transceiver 604. For example, the person using the personal emergency message transceiver 602 could generate a message such as "call wife, working late at home" or another suitable message.

An embodiment of the personal emergency message transceiver 602 employing a speaker 612 provides for audible communications with the person using the personal emergency message transceiver 602. For example, the personal emergency message transceiver 602 generates a sound to indicate to the user that an emergency message of interest has been received. Accordingly, the audible sound may prompt the user to call into the emergency message management controller 302 if an intruder has been detected, in a manner described above, at the customer premises 200 by the integrated security system 208 (FIG. 2). Another embodiment provides an audible signal indicating more precisely the nature of the emergency message of interest. For example, the speaker 612 audibly broadcasts out a message such as "intruder detected at residence" or another suitable audible message. Furthermore, another embodiment is configured to include a microphone (not shown) that is configured to receive audible messages from the user and to broadcast the audible message by the transceiver 604.

Another embodiment employs a light source 614 to notify the user of the personal emergency message transceiver 602 that an emergency message of interest has been received by the emergency message management controller 302 (FIG. 3). For example, the light source 614 could be a light emitting diode (LED), an incandescent light or other light generating device. Other embodiments of the personal emergency message transceiver 602 employ other devices to notify the user that an emergency message of interest has been received. For example, one embodiment employs a vibratory device (not shown) that provides an indication to the user through a vibratory movement of the personal emergency message transceiver 602.

Another embodiment of the personal emergency transceiver 602 employs a display 618. Display 618 is configured to receive emergency messages from the emergency message management controller 302 (FIG. 3) and indicate information associated with the received emergency message. For example, display 618 may use alpha-numeric symbols to indicate the nature and the location of the emergency message. Accordingly, the display 618 may show an emergency message such as "intruder at home" or another suitable message. Furthermore, another embodiment of the personal emergency message transceiver 602 employs the display 618 for indicating general events of interest, such as stock market activity, national emergencies, holidays or the like. The display 618 may be any suitable device for displaying an emergency message. For example, but not limited to, the display 618 may be a flat panel screen, a LED screen, a liquid crystal display (LCD) or any other known screen device.

Another embodiment of the personal emergency message transceiver 602 employing a keypad 610 may be further configured to perform the same functionality of the personal device 214 (FIG. 2) having the keypad 218. Such an embodiment is particularly advantageous when integrating the personal emergency message transceiver 602 into a transceiver network 100 (FIG. 1) that is configured for a multiplicity of purposes.

h. Embodiment of an Emergency Transceiver Detecting 911 Calls

FIG. 1 illustrates an embodiment of another personal emergency message transceiver 124. The personal emergency message transceiver 124 is configured to have similar functionality as a mobile communication device, such as a mobile telephone, radio, pager, cell phone or the like. Thus, the personal emergency message transceiver 124 is capable of providing voice communication services and is configured to generate emergency messages broadcasted by a transceiver (not shown). Another embodiment is configures to employ a separate transceiver for voice communications and a separate transceiver for communication of emergency messages. In yet another embodiment, a mobile communication device may be retrofitted with a transceiver, thereby creating a personal emergency message transceiver 124. Illustrative examples of mobile communication devices include mobile telephones, cellular devices, radios, pagers or the like.

Special purpose keys residing on the personal emergency message transceiver 124 are configured to have similar functionality as the button 608 and/or the keypad 610 of the personal emergency message transceiver 602 (FIG. 6) described above.

When a transceiver (not shown) residing in the personal emergency message transceiver 124 broadcasts an emergency message signal 126, the emergency message signal 126 is received by any of the transceivers of the transceiver network 100, such as transceiver 102f. Accordingly, the emergency message signal 126 is broadcasted by the transceiver 102f (via signal 114f) to the transceiver station 112b, and then to the transceiver station 112c (via signal 118b), and then to the transceiver unit 106 (via signal 118c), and then to the emergency message management controller 302 (FIG. 3). Alternatively, when the personal emergency message transceiver 124 is sufficiently close to the transceiver unit 106 such that the transceiver unit 106 is able to detect the emergency message broadcasted by the personal emergency message transceiver 124, then the transceiver unit 106 directly relays the emergency message to the emergency message management controller 302 (FIG. 3).

In an exemplary embodiment the personal emergency message transceiver 124 can receive emergency messages from the emergency message system control center 300. The emergency messages received at the personal emergency message transceiver 124 can relate to a variety of events, warnings, notifications, security alerts, stimulus, weather, natural disasters, or other information. For example, and not limitation, as discussed above, the emergency message system control center 300 can generate an emergency message regarding a tornado. Additionally, in an exemplary embodiment the emergency message system control center 300 can direct emergency messages to the personal emergency message transceiver 124 based on the location of the personal emergency message transceiver 124. As described above with the respect to an emergency message regarding a tornado, the emergency message system control center 300 can send a message to all devices known to be in the vicinity of the tornado alert region.

As shown in FIG. 1, the personal emergency message transceiver 124 can be a mobile communication device, such as a mobile telephone or cellular device. In an exemplary embodiment, the mobile telephone includes a transceiver, and hardware and software configured to communicate with the emergency message system control center 300. In an exemplary embodiment the personal emergency message transceiver 124 can communicate directly with the emergency message system control center 300 via the cellular network to which the personal emergency message transceiver 124 subscribes. In an alternative embodiment the personal emergency message transceiver 124 can be configured to communicate with a secondary communication device in order to ultimately reach the emergency message system control center 300. For example, and not limitation, as shown in FIG. 1, the personal emergency message transceiver 124 can communicate with a transceiver 102f of the transceiver network 100. Additionally, the personal emergency message transceiver 124 can communicate with a transceiver unit 120 in further communication with a site controller 104. The ability of the personal emergency message transceiver 124 to communicate with the transceivers in the transceiver network 100 extends the coverage area for the personal emergency message transceiver 124 by enabling it rely upon existing transceiver networks 100 to communicate with the emergency message system control center 300. Furthermore, the site controller 104 in an exemplary embodiment can serve as a gateway device to connect the personal emergency message transceiver 124 with the Internet, a Wide Area Network, and/or a Local Area Network. For example, a transceiver unit 120 is illustrated in FIG. 1 coupled to the site controller 104 via connection 122. Transceiver unit 120 is configured to communicate with another transceiver network. Thus, transceiver unit 120 may serve one geographic region and transceiver unit 106 may service a different geographic region. The geographic regions are, in reality, artificial in that any transceiver may communicate with any other transceiver unit so long as its broadcast signal strength is sufficient to be detected by the transceiver unit. Thus, any boundary associated with a geographic reign is easily redefined or changed by simply reconfiguring the defined communication path for a transceiver, as described in greater detail below. Site controller 104 is configured in an exemplary embodiment to communicate with any desired number of transceiver units. Furthermore, a plurality of site controllers can be deployed within a service area, thereby increasing the area of coverage of the transceiver network 100. There are no known limitations that would limit the number of transceivers in communication with the emergency message system control center 300 when a suitable number of transceiver units and site controllers are implemented with a plurality of transceivers to form a transceiver network 100.

Those of skill in the art will appreciate that in addition to the mobile telephone device depicted in FIG. 1, the personal emergency message transceiver 124 can be a variety of different types of communication devices, including a smartphone, such as a Blackberry®, iPhone®, and Android® device, a tablet computer, such as an iPad®, PlayBook™, and a Android® tablet, or a portable computer, such as a laptop, netbook, or other portable electronic device capable of communicating with the personal emergency message transceiver 124. In an exemplary embodiment, the personal emergency message transceiver 124 is implemented in a smartphone, and the transceiver for the personal emergency message transceiver 124 is the transceiver included in the smartphone for voice and data communication with the networks to which the smartphone can communicate, including both cellular networks via cellular base stations and the internet via LAN or WAN data connections.

In the exemplary embodiment of a smartphone based personal emergency message transceiver 124, the smartphone is enabled to download or be configured with an emergency message application, to enable communication with the emergency message system control center 300. The user of the personal emergency message transceiver 124 can configure the emergency message application to send and receive a variety of emergency messages based on the preferences of the user. For example, and not limitation, in an exemplary embodiment the emergency message application can be configured to receive messages regarding potentially hazardous weather or natural disaster related emergencies.

In an exemplary embodiment, the smartphone based personal emergency message transceiver 124 includes a Global Positioning System ("GPS") device enabled to provide information regarding the current location of the smartphone. In this exemplary embodiment, the location information provided by the GPS device can be used by the emergency message application and the emergency message system control center 300 to identify and track the location of the personal emergency message transceiver 124. Those of skill in the art will appreciate that the smartphone based personal emergency message transceiver 124 can alternatively provide other devices and processes for location tracking, including relying upon coupon redemptions by the smartphone based personal emergency message transceiver 124, purchases with the smartphone based personal emergency message transceiver 124, or use of location based social media applications. For example, and not limitation, a user of smartphone based personal emergency message transceiver 124 could use the smartphone to redeem a coupon at a particular coffee shop or use a location based social media application, such as Foursquare™, to identify the current location of the user at the coffee shop and that location could be communicated in real time to the emergency message system control center 300. Subsequently, in an exemplary embodiment, the emergency message system control center 300 can direct emergency messages to be provided to the smartphone based personal emergency message transceiver 124 in accordance with the current location of the user. For example, and not limitation, the coffee shop that the user posted on Foursquare™ could be in an area with a tornado alert and the emergency message system control center 300 could send an emergency message regarding the tornado alert to the smartphone based personal emergency message transceiver 124. Additionally, in an exemplary embodiment the emergency message system control center 300 and/or the emergency message application can be configured to provide certain promotion messages along with or in relation to an emergency message. For example, and not limitation, the emergency message system control center 300 in an exemplary embodiment can provide an emergency message to an emergency message application on a smartphone based personal emergency message transceiver 124 regarding a winter weather advisory in the vicinity of the transceiver 124. Subsequently, in conjunction with that winter weather advisory emergency message, the emergency message system control center 300 could transmit a coupon message to the emergency message application regarding a coupon for firewood at a local hardware store in view of the impeding snow storm. In an other embodiment, a emergency message could be received by the emergency message application of a smartphone based personal emergency message transceiver 124 that indicates a flash food warning has been issued and also providing a coupon for the purchase of materials for sand bags at a local store.

In an exemplary embodiment, the user can configure the emergency message application on the smartphone based personal emergency message transceiver 124 to receive emergency messages regarding hazardous weather and natural disasters in the vicinity of the user. For example, and not limitation, the emergency message system control center 300 obtains information a possible tsunami offshore from the island of Japan. In this non-limiting example, the emergency message system control center 300 maintains a list of all smartphone based personal emergency message transceivers 124 with an active emergency message application that have provided location information from the GPS device on the smartphone that the smartphone is located in Japan. Furthermore, the emergency message system control center 300 is enabled to send an emergency message to all smartphone based personal emergency message transceivers 124 that have configured their emergency message application to receive emergency messages for this geographic region. In this non-limiting example, the user would receive an emergency message via the emergency message application on the smartphone based personal emergency message transceiver 124 indicating that a tsunami had been detected in Japan near the vicinity of the user. As can be readily understood, the ability of a user to receive accurate real time emergency messages based on their current location is extremely beneficial. In the example of a tsunami warning, the user could receive rapid and real time information regarding the tsunami, giving the user the ability to seek refuge in a place or location outside of the danger zone of the tsunami. For many hazardous weather events and natural disasters, immediate and prompt notification to those in danger is absolutely critical in preventing harm and even loss of life. The emergency message system control center 300 can enable emergency messages to be instantly distributed to a large number of personal emergency message transceiver 124. In an exemplary embodiment, the emergency message system control center 300 is enabled to communicated or receive information from a separate weather or information network. For example, and not limitation, the emergency message system control center 300 can receive information from the National Oceanic and Atmospheric Administration network and database, such as readings from an NOAA ocean based buoys or other remote pressure recorder that a tsunami has been detected.

The ability of the emergency message application to provide notifications of emergencies based on the location of the user provides a number of important advantages to the user. Significantly, the user can receive emergency messages from the emergency message system control center 300 based on the location of the user. For example, and not limitation, a user traveling to Japan may not be familiar with tsunamis or even the ability for Japan to experience tsunamis. Regardless, in this non-limiting example, the user could fly to Tokyo, and the personal emergency message transceiver 124 can send an update to the emergency message system control center 300 that the transceiver 124 is currently located in Tokyo, Japan. Subsequently, the smartphone based personal emergency message transceivers 124 could receive an emergency message from the emergency message system control center 300 alerting the user to a tsunami in the vicinity of the user. Therefore, the user can be made aware by the emergency message application of hazardous weather or natural disasters when traveling from city to city.

The location based feature of the emergency message application provided in accordance with an exemplary embodiment of the present invention can provide another significant advantage in that it can limit the amount of emergency messages received by the user. Those of skill in the art will appreciate that the greater the quantity of the emergency messages delivered to the user via an emergency message application, the less attention that will be paid by a user to any particular emergency message. Therefore, in certain implementations, it is important to notify the user only of those emergencies that warrant the user's attention. In an exemplary embodiment, the emergency message application residing on a smartphone based personal emergency message transceiver 124 can be configured to only alert the user to hazardous weather or natural disasters within a certain radius of the current location of the user. For example, and not limitation, the user can configure the emergency message application to provide notifications regarding tornado warnings within 20 miles of the user. In this example, the user might be traveling in a car and receive an emergency message via the emergency message application that a tornado warning had been issued for the county through which the user is currently traveling through. Once the user has traveled beyond that county, the user would no longer receive an emergency message regarding a tornado warning in that county. Therefore, the location based feature of the emergency message application can significantly limit the number of emergency messages delivered to the user by updating in real time the location of the smartphone based personal emergency message transceiver 124 and only providing emergency messages relevant to the current position of the personal emergency message transceiver 124.

Those of skill in the art will appreciate that the emergency message application of the emergency message system control center 300 can be configured to provide emergency messages according to the preferences and parameters of the user. For example, and not limitation, the emergency message application could be configured to only provide emergency messages regarding earthquakes. In this example, a particular user living in a earthquake prone area may place a high importance on receiving immediate emergency messages from the emergency message system control center 300 regarding the occurrence of an earthquake, but the user may be uninterested in any other types of emergency messages generated by the emergency message system control center 300. In an alternative example, a user may configure the emergency message application to only receive emergency messages regarding traffic issues in a particular region. In this example, the user may have a delivery route in a particular geographic region and only be concerned with receiving emergency messages from the emergency message system control center 300 regarding significant traffic emergencies in the geographic region of interest. In an exemplary embodiment, the emergency message application receives all of the emergency messages broadcast by the emergency message system control center 300, and the emergency message application filters the messages that are to be provided to the user of the personal emergency message transceiver 124. In an alternative embodiment, the emergency message system control center 300 is responsible for filtering the messages and only distributes those emergency messages to a particular personal emergency message transceiver 124 that the emergency message application for that transceiver 124 has been configured to receive.

Not only can the emergency message application be configured to provide the user with control over the types of emergency messages received, the emergency message application can provide the user with control over time parameters for when messages are received. In an exemplary embodiment, the user can configure the emergency message application to provide certain types of emergency messages at certain times of the day. For example, and not limitation, the user can configure the emergency message application to provide emergency messages regarding traffic only during the morning rush hour and afternoon rush hour, emergency messages regarding thunderstorms and tornadoes only in the evening, and all other types of emergency messages at any time during the day. Additionally, the emergency message application can be configured to receive certain types of emergency messages based upon the location of the user. For example, and not limitation, the emergency message application can be configured to provide emergency messages regarding earthquakes when the smartphone based personal emergency message transceiver 124 is in California, and emergency messages regarding tornadoes when the smartphone based personal emergency message transceiver 124 is in Kansas. Additionally the emergency message application can be configured to provide emergency messages based on seasonal changes, such as providing hurricane alerts during hurricane season.

In an alternative embodiment, the emergency message application can be configured to provide emergency messages without regard to the location of the smartphone based personal emergency message transceiver 124. In accordance with an exemplary embodiment of the present invention, the emergency message system control center 300 can be configured to provide emergency messages and information to the emergency message application on smartphone based personal emergency message transceiver 124 regardless of whether the smartphone has a GPS device capable of providing location based information. More specifically, the emergency message application can be configured to receive emergency messages from the emergency message system control center 300 without providing any information regarding the current location of the user. In this example, the user can configure the emergency message application to provide emergency messages based upon a selected city, state, zip code, or other geographic parameter. Furthermore, the user can select more than one city or geographic area from which to receive emergency messages. For example, and not limitation, a user residing in Washington D.C. with family in San Francisco can select to receive emergency message information from the emergency message system control center 300 related to both Washington, D.C. and San Francisco. Therefore, a user of the emergency message application can stay informed about emergencies in both their home city and also the city where family members reside.

In addition to setting parameters in the emergency message application regarding location and time of day, an exemplary embodiment of the emergency message application can be configured to provide certain types or levels of emergencies. In an exemplary embodiment, the emergency message system control center 300 assigns a level of priority to each emergency message. Therefore, in this exemplary embodiment, the user can configure the emergency message application to provide notification of only the highest level emergencies or perhaps both the moderate and high level emergencies.

Another embodiment of the transceivers residing in the transceiver network 100 are configured to detect emergency 911 calls from mobile communication devices, such as a mobile telephone, radio, pager, cell phone or the like. Such mobile communication devices include with the voice communications other information that identifies the mobile communication device. For example, some mobile communication devices employ an upper channel of the RF signal for communication of the other information. Another embodiment employs header information or the like in a digital communication signal. Such information is typically used for the determination of telephone related services, such as long distance telephone charges. When a person has subscribed to a service that employs the transceiver network 100 for the detection of emergency messages, the transceivers within the transceiver network are configured to recognize that the emergency 911 call is generated by a subscribing customer. Accordingly, the emergency 911 call is recognized as an emergency message and is subsequently relayed onto the energy message management controller 302 (FIG. 3) as described above. This embodiment is particularly advantageous in that the emergency message management controller 302 may provide additional services and/or provide additional information to interested parties.

The above-described embodiments of the transceivers configured to detect emergency 911 calls are particularly advantageous in determining the location of the device generating the emergency 911 call. For example, a person or small child making a 911 call may not be able to indicate location for any number of reasons. Accordingly, transceivers detecting the emergency 911 call generate an emergency message that includes the identification code of the detecting transceiver. When the emergency message is relayed to the emergency message management controller 302 (FIG. 3), the location of the transmitting transceiver is precisely known since location information of the transceiver, included in database 314 (FIG. 3), is associated with the identification code contained in the received emergency message. Accordingly, the emergency message management controller 302, based upon the known location of the transceiver detecting the emergency 911 call, may closely approximate the location of the device generating the emergency 911 calls. Furthermore, if multiple transceivers in the transceiver network 100 detect the broadcasted emergency 911 call, the emergency message management controller logic 316 executes a position determination algorithm to triangulate more precisely the location of the device generating the emergency 911 call.

Furthermore, the emergency message management controller 302 may be configured to notify other interested parties that an emergency 911 phone call has been detected. Accordingly, the emergency message management controller 302 is configured to provide a message to the control room operators 304 with instructions to manually call another interested party. For example, the control room operators 304 may be directed to call the mother when the husband or a child using a mobile communication device makes an emergency 911 call. As another example, the control room operators 304 may be directed to call a family physician, attorney, employer or the like when an emergency 911 call is detected. Another embodiment of the transceivers residing in the transceiver network 100 are configured to detect the actual voice message associated with the 911 emergency call and relay the voice communications from the mobile communication device to the control room operators 304, via the emergency message management controller 302, as described above. Accordingly, the control room operators provide additional information to the called third party such as the approximate location of the mobile communication device and the nature of the emergency.

Additionally, the energy message management controller 302, upon receiving an emergency message associated with a detected emergency 911 call, is configured to look up in the database 314 (FIG. 3) personal information associated with a person who may have made the emergency 911 call. Accordingly, the emergency message management controller 302 provides instructions to the control room operators to call the summoned emergency service providers so that additional information may be provided. For example, database 314 may have information indicating that the person(s) may be subject to an allergic reaction to particular substances. The emergency message management controller 302 instructs the control room operators 304 to call the person receiving the actual emergency 911 call, or other interested emergency service providers such as the ambulance technicians or a doctor, to provide information regarding the possible allergic reactions of the customer.

i. Operation of the Emergency Message Management Controller

Figure 7:
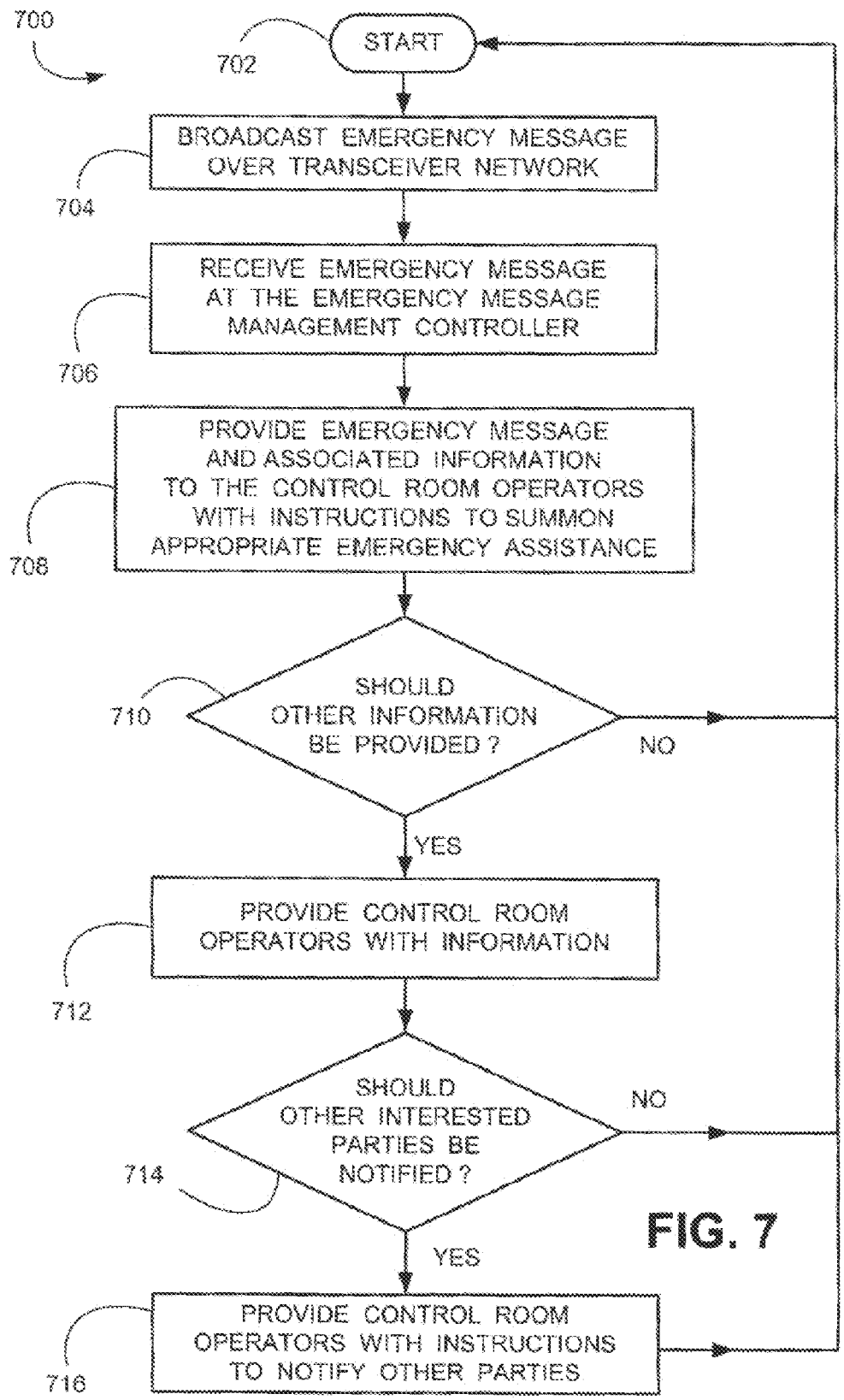
FIG. 7 is a flow chart 700 illustrating a process for communicating an emergency message generated by one of the transceivers of FIGS. 1-2 and 4-6.

FIG. 7 is a flow chart 700 illustrating a process for communicating an emergency message generated by one of the transceivers of FIGS. 1-2 and 4-6. The flow chart 700 shows the architecture, functionality, and operation of a possible implementation of the software associated with the emergency message management controller logic 316 (FIG. 3). In this regard, each block may represent a module, segment, or portion of code, which comprises one or more executable instructions for implementing the specified logical function(s). It should also be noted that in some alternative implementations, the functions noted in the blocks may occur out of the order noted in FIG. 7, or may include additional functions, without departing significantly from the functionality of the process of the emergency message management controller 702. For example, two blocks shown in succession in FIG. 7 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure and to be protected by the accompanying claims.

When the emergency message management controller logic 316 is implemented as software and stored in memory 310 (FIG. 3), the emergency message management controller logic 316 can be stored on any computer readable medium for use by or in connection with any computer and/or processor related system or method. In the context of this document, a memory 310 is a computer readable medium that is an electronic, magnetic, optical, or other another physical device or means that contains or stores a computer and/or processor program. The emergency message management controller logic 316 can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with the emergency message management controller logic 316. In the context of this specification, a "computer readable medium" can be any means that can store, communicate, propagate, or transport the program associated with the emergency message management controller logic 316 for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with the emergency message management controller logic 316 is printed, as the program can be electronically captured, via for instance optical scanning of the paper or other medium, then compiled, interpreted or otherwise processed in a suitable manner if necessary, and then stored in memory 310 or in another suitable memory.

The process starts at block 702 when an emergency situation arises. At block 704, a transceiver is actuated in response to the emergency such that an emergency message is broadcasted over the transceiver network 100 (FIG. 1). At block 706, the emergency message is received at the emergency message management controller 302 (FIG. 3) in a manner described above. At block 708, the emergency message management controller 302 executes the emergency message management controller logic 316. Accordingly, a suitably formatted emergency message is provided to the control room operators 304 (FIG. 3) that includes information of interest such that the control room operators summon the appropriate emergency assistance.

At block 710, a determination is made whether or not other information should be provided. If no other information is provided at block 710 (the NO condition), the process returns to block 702. If other information should be provided to the control room operators 304 (the YES condition), the other information is provided to the control room operators 304 at block 712. As described above, such information may include, but is not limited to, the identification code of each the transceivers, the location of the transceiver, and the nature of the emergency situation.

At block 714, a determination is made whether or not other interested parties should be notified. If no other interested parties are to be notified at block 710 (the NO condition), the process returns to block 702. If other information should be provided to the control room operators 304 (the YES condition), the other information is provided to the control room operators 304 at block 716. For example, the emergency message management controller logic 316 may determine that a spouse, other relative, employer or other individual(s) identified in the database 314 should be notified of the received emergency message. The process then returns to block 702 to await the next emergency situation.

j. Transceiver Maintenance Feature

One embodiment described above employs transceivers configured to transmit emergency messages back to the emergency message management controller 302 (FIG. 3). Each transceiver includes its unique identification code as part of the broadcasted emergency message. Location information for each transceiver, identified in database 314 (FIG. 3), is determined by associating the identification code in the received emergency message with the corresponding location information (identified by the corresponding identification code). Transceivers transmitting information back to the emergency message management controller 302, in one embodiment, are configured to include logic that indicates the operational status of the monitoring device and/or its associated components back to the emergency message management controller 302. The emergency message management controller logic 316 (FIG. 3) includes a transceiver maintenance function that evaluates received status and information from the signals transmitted by the transceivers such that the operational integrity of the monitoring device is accessed. That is, if a component in the monitoring device fails, the status information indicates failure of that component. The emergency message management controller logic 316 provides the appropriate indication to the control room operators 304 such that maintenance personnel are dispatched out to the monitoring device to effect a repair of the non-functioning or improperly functioning component.

One embodiment employing the above-described maintenance feature employs transceivers configured to periodically transmit status information to the emergency message management controller 302 at predefined time intervals. Another embodiment employs transceivers configured to respond to a status information request generated by the emergency message management controller 302. Here, logic residing in the emergency message management controller logic 316 performs a maintenance function wherein pre-selected transceivers are requested to provide status information. Another embodiment employs transceivers configured to generate periodic status reports to the emergency message management controller 302 and are configured to respond to requests for status information from the Emergency message management controller 302. In yet another embodiment, all three types of the above-described transceivers are employed to communicate status information to the emergency message management controller 302.

When the transceiver components that broadcast the status information fails, such as, but not limited to, the transceiver itself, the failure is detected by a loss of signal. Thus, in an embodiment employing a transceiver that is to provide an acknowledgement signal, or provide a status signal in response to a status information request, or is to provide periodic status information reports, the failure of the transceiver to respond or provide information at scheduled times and/or is response to a status inquiry indicates a component failure.

Summarizing, the above-described embodiment includes a maintenance functionality such that the operational status of the transceivers residing in the transceiver network 100 (FIG. 1) and/or monitoring devices are monitored to ensure continuous operational functionality. Other components of the above-described communication network, such as the detectors and/or their components, may be also monitored. Thus, a detected failure in a transceiver, transceiver component, detector and/or a detector component may be quickly detected such that maintenance personnel are dispatched to repair the failed transceiver, detector or components. This embodiment is particularly advantageous in providing an emergency message system having a high degree of operational reliability and integrity.

k. Defining Transceiver Communication Paths

For convenience describing the operation and functionality of the transceiver network 100 (FIG. 1), a simplified description of the communication paths employed by the plurality of transceivers is described above. In one embodiment, all transceivers employed in the transceiver network have both capability to receive broadcasted signals and to broadcast signals. However, many of the transceivers have a limited transmit signal range as the strength of the broadcasted signal is relatively low. This embodiment is particularly suited in transceiver network 100 configurations employing a large number of transceivers located in close proximity to other transceivers.

In one embodiment, the communication path that a transceiver employs for broadcasting signals is predefined. For example, transceiver 102a in FIG. 1 was described above as transmitting emergency messages to transceiver unit 106 over the path defined by signals 114a, 118a and 118c. That is, when the transceiver unit 106 receives an emergency message from transceiver 102a, transceiver stations 112a and 112c are configured to relay the signal to the transceiver unit 106. Here, if the transceiver station 112c detects the emergency message from transceiver 102a, transceiver station 112c simply ignores the detected emergency message and does not relay the emergency message.

In one embodiment, transmission paths for all transceivers are predetermined by the emergency message management controller 302 (FIG. 3). Path information is broadcasted out to all components of the transceiver network 100, transceiver stations, transceiver units and site controllers. This information is stored in a memory residing in or coupled to each of the components of the transceiver network 100, transceiver stations, transceiver units and site controllers. Each component then configures itself to react only to those signals for which it is part of the predefined path. Thus, when the transceiver unit 102b detects an emergency message from transceiver 102a, transceiver units 102b recognizes that it is not part of the path to transceiver 102a, and simply takes no action.

In one embodiment, the communication paths are defined by using the identification codes associated with each transceiver, and identification codes assigned to the transceiver stations, transceiver units and site controllers. For example, if site controller 104 is defined by the identification code "104", transceiver unit 106 is defined by the identification code "106", transceiver station 112c is defined by the identification code "112c", transceiver station 112a is defined by the identification code "112a", and transceiver 102a is defined by the identification code "102a", the path between the site controller 104 and transceiver 102a is simply defined by a code such as 104.106.112c.112a.102a (where each number corresponds to the component identification code). Other suitable codes are easily defined.

Such a system is described in detail in the commonly assigned patent entitled "MULTI-FUNCTION GENERAL PURPOSE TRANSCEIVER," filed Mar. 18, 1999, and accorded U.S. Pat. No. 6,233,327B1, issued on May 15, 2001 and incorporated herein by reference in its entirety.

In one embodiment of the emergency message system, failure of a transceiver or a transceiver component is detected in a manner described above. When such a failure is detected, communications with other transceivers may be disrupted if the failed transceiver or transceiver component is in the communication path of other transceivers. In such a situation, upon the detection of the failed transceiver or transceiver component, the emergency message management controller 302 (FIG. 3) redefines communication paths for affected transceivers, and transmits the redefined paths out to the transceivers, transceiver stations, transceiver units and site controllers such that the paths are redefined. For example, transceiver station 112a (FIG. 1) may fail. Thus, transceivers 102a, 102b and 102c (FIG. 1) will not be in communication with the emergency message management controller 302 (FIG. 3). The communication path for transceiver 102c would then be redefined such that transceiver 102c is communicating with transceiver 102d (assuming that transceiver 102d is sufficiently close to transceiver 102c to detect signals broadcasted from transceiver 102c). Thus, transceiver 102c is in communication with the transceiver unit 106 (FIG. 1) through a newly defined path indicated by the signals 128a, 114d, 118b and 118c (FIG. 1). Here, transceiver 102d is operating as both an emergency message transceiver (when communicating emergency messages from the customer premises 103d) and a network transceiver (when communicating emergency messages from other transceivers).

Similarly, the communication path for transceiver 102b is then redefined such that transceiver 102b is communicating with transceiver 102c (assuming that transceiver 102c is sufficiently close to transceiver 102b to detect signals broadcasted from transceiver 102b). Thus, transceiver 102b would be in communication with the transceiver unit 106 through a newly defined path indicated by the signals 128b, 128a, 114d, 118b and 118c (FIG. 1). Here, transceivers 102c and 102d are operating as both an emergency message transceiver (when communicating emergency messages from the customer premises 103c and 103d, respectively) and a network transceiver (when communicating emergency messages from other transceivers).

Similarly, the communication path for transceiver 102a is then redefined such that transceiver 102a is communicating with transceiver 102b (assuming that transceiver 102b is sufficiently close to transceiver 102a to detect signals broadcasted from transceiver 102a). Thus, transceiver 102a would be in communication with the transceiver unit 106 through a newly defined path indicated by the signals 128c, 128b, 128a, 114d, 118b and 118c (FIG. 1). Here, transceivers 102b, 102c and 102d are operating as both an emergency message transceiver (when communicating emergency messages from the customer premises 103b, 103c and 103d, respectively) and a network transceiver (when communicating emergency messages from other transceivers).

One skilled in the art will appreciate that the possible communication paths in a transceiver network 100 are nearly limitless, and that such communication paths are easily redefined by the emergency message management controller 302. The above described examples are intended to illustrate some of the alternative redefined communication paths to explain the operation and functionality of the maintenance feature of one embodiment of the emergency message communication system.

1. Alternative Embodiments of the Emergency Message Communication System

For convenience of describing the operation and functionality of the emergency message management controller 302 (FIG. 3), the emergency message management controller 302 was illustrated as a stand-alone unit. The emergency message management controller 302, in an alternative embodiment, is implemented as an integral component of another system, such as, but not limited to, a security monitoring system, without departing substantially from the operation and functionality of the emergency message system.

Furthermore, the components illustrated as residing in the emergency message management controller 302 may reside in alternative convenient locations outside of the emergency message management controller 302 without adversely affecting the operation and functionality of the emergency message system. Such components may even be integrated with other existing components residing in the emergency message system control center, thereby minimizing the cost of implementing an emergency message system.

For example, the database 314 residing in the memory 310 (FIG. 3) may be implemented in a memory unit residing in an alternative location, such as the control console 322. Thus, information provided used the emergency message system could simply be transferred to a database residing in the alternative location.

Similarly, the emergency message management controller logic 316 (FIG. 3) could reside in a convenient alternative location and be executed by a different processor that resides in a convenient alternative location. Also, the interface 312 may be implemented as a stand-alone interface unit residing in a convenient location. For example, interface 312 may be implemented as a stand-alone PC, a network PC, a dedicated intra-network interface or the like that performs the functionality of receiving information through a communication network from the site controller 104 (FIGS. 1 and 2).

For convenience of describing the operation and functionality of the emergency message management controller 302 (FIG. 3), the emergency message management controller 302 was illustrated as a stand-alone unit residing within the emergency message system control center 300. Another embodiment of the emergency message management controller resides in an alternative convenient location outside of the emergency message system control center 300. In such an embodiment, connection 324 may be a connection of suitable length to provide connectivity between processor 308 and the control console 322. In other embodiments, connection 324 may include a plurality of components that provides connectivity over a special purpose network or an existing, general purpose network. For example the emergency message management controller 302 could be in communication with the emergency message system over any one of the communication systems described above and illustrated in FIG. 4. Such a configuration is easily implemented using appropriate interface components. Such interface components residing in an emergency message management controller that are configured to transmit, receive and convert signals are known in the art and, therefore, are not described in detail herein other than to the extent necessary to understand the operation and functioning of these components when employed as part of the emergency message system that is remote from the emergency message system control center 300. One skilled in the art will realize that such known components are too numerous to describe in detail herein, and that any configuration of such known components having the above-described functionality may be implemented without departing substantially from the emergency message system.

The embodiment of the emergency message system was described herein to include a plurality of transceiver units configured to communicate based upon a predefined communication path specified by the emergency message management controller 302. An alternative embodiment is configured to communicate with other special purpose systems that employ compatible transceivers. For example, a system for monitoring emergency, alarm, climate, or other conditions in a defined territory is disclosed in the co-pending commonly assigned non-provisional application entitled "SYSTEM FOR MONITORING CONDITIONS IN A RESIDENTIAL LIVING COMMUNITY," filed Mar. 18, 1999, and accorded Ser. No. 09/271,517, incorporated herein by reference in its entirety. Another system for controlling electricity demand in a defined territory is disclosed in the co-pending commonly assigned non-provisional application entitled "SYSTEM AND METHOD FOR CONTROLLING POWER DEMAND OVER AN INTEGRATED WIRELESS NETWORK," filed Aug. 15, 2001, and accorded Ser. No. 09/929,926, incorporated herein by reference in its entirety. The above applications describe a computerized system for monitoring power and/or other conditions in a defined territory using a network of transceivers communicating back to a remote facility via a plurality of repeaters and a central system (such as a site controller). The plurality of transceivers configured for monitoring power and/or other conditions in a defined territory are integrated with a plurality of transceivers for controlling customer premises appliances, thereby reducing overall facility, maintenance and installation costs by employing common units. For example, a transceiver controlling an air conditioning unit or a transceiver monitoring metered demand (in accordance with the Ser. No. 09/929,926 application) may be integrated to communicate through same transceiver stations, transceiver units and/or site controllers communication emergency messages. The integrated system would simply recognize the transceiver communicating an emergency message and appropriately route communications to and/or from that transceiver to the appropriate remote facility. One skilled in the art will appreciate that an emergency message communication system described herein is interpretable into any other special purpose system or a multipurpose system based upon a network of similarly configured transceivers that communicate through common components.

Another embodiment of the emergency message system is configured to give communicated emergency messages the highest priority with respect to other communications. For example, but not limited to, an emergency message system may be integrated with another system employing a transceiver network, as described above. The transceiver network would then have a multiplicity of functions, one of which is the communication of emergency messages. If other communications are being communicated across the network, such communications will utilize available bandwidth of the network. When the bandwidth of the network is substantially utilized, such as when large amounts of data are being communicated, an emergency message can be designated, tagged, or otherwise identified as having a high priority. Network transceivers, upon receiving an emergency message identified with a high priority would stop, halt, delay the communication of other messages and/or otherwise make available bandwidth such that emergency message is communicated on a priority basis. Such an embodiment is advantageous when a transceiver network is utilized for a plurality of functions and in ensuring that emergency messages are communicated as quickly as possible.

Another embodiment employs a power line carrier (PLC) signal to communicate signals from detectors such that a receiving transceiver generates emergency messages into an emergency message system. For example, but not limited to, smoke detector 204*a* (FIG. 1), in one embodiment, is supplied power via wire 224 which is coupled to the electric distribution network (not shown) within the customer premises 200. Rather than being coupled to the transceiver 202*a*, the smoke detector communicates signals to the transceiver 226 using PLC signals.

Transceiver 226 is coupled to the electric distribution network at a suitable location. For convenience of illustration, transceiver 226 is illustrated as being coupled to the electrical outlet 228. One embodiment employs a standard outlet spade-type connector (not shown) to couple the transceiver 226 to the electric distribution network. Another embodiment of the transceiver 226 is coupled to the outlet 228 with wire connections coupled at suitable connection points. Other embodiments of the transceiver 226 is coupled to another suitable location on the electric distribution network such that the transceiver 226 is able to reliably receive signals from the smoke detector 204*a*.

Thus, when the smoke detector 204*a* detects smoke, a PLC signal is communicated form the smoke detector 204*a* to the transceiver 226 over the electric distribution network. Upon receiving a PLC signal form the smoke detector 204*a*, the transceiver 226 generates and communicates an emergency signal in any one of the previously described manners. The communication of PLC signals, and the equipment that generates PLC signals, is known in the art, and is therefore not described in further detail other than to the extent necessary to understand the communication of PLC signals to a transceiver employed as part of an emergency signal system.

Other detectors coupled to the electric distribution network may also be configured to generate PLC signals that are communicated to transceiver 226. Such an embodiment of an integrated security system employing detectors communicating to transceiver 226 with PLC signals is particularly advantageous when it is desirable to limit the number of transceivers employed in the emergency message system.

Another embodiment of the always-on appliance is configured to communicate with at least one transceiver using PLC signals. For example, but not limited to, the cable TV set box 504 (FIG. 5) is coupled to the electric distribution network (not shown). Rather than coupling the cable TV set box 504 to the transceiver 502, as illustrated in FIG. 5, the cable TV set box 504 is configured to communicate emergency messages using a PLC signal to a transceiver (not shown) coupled to the electric distribution network. Furthermore, any of the above describe always-on appliances can be configured to communicate emergence messages with transceivers using PLC signals.

Figure 8:
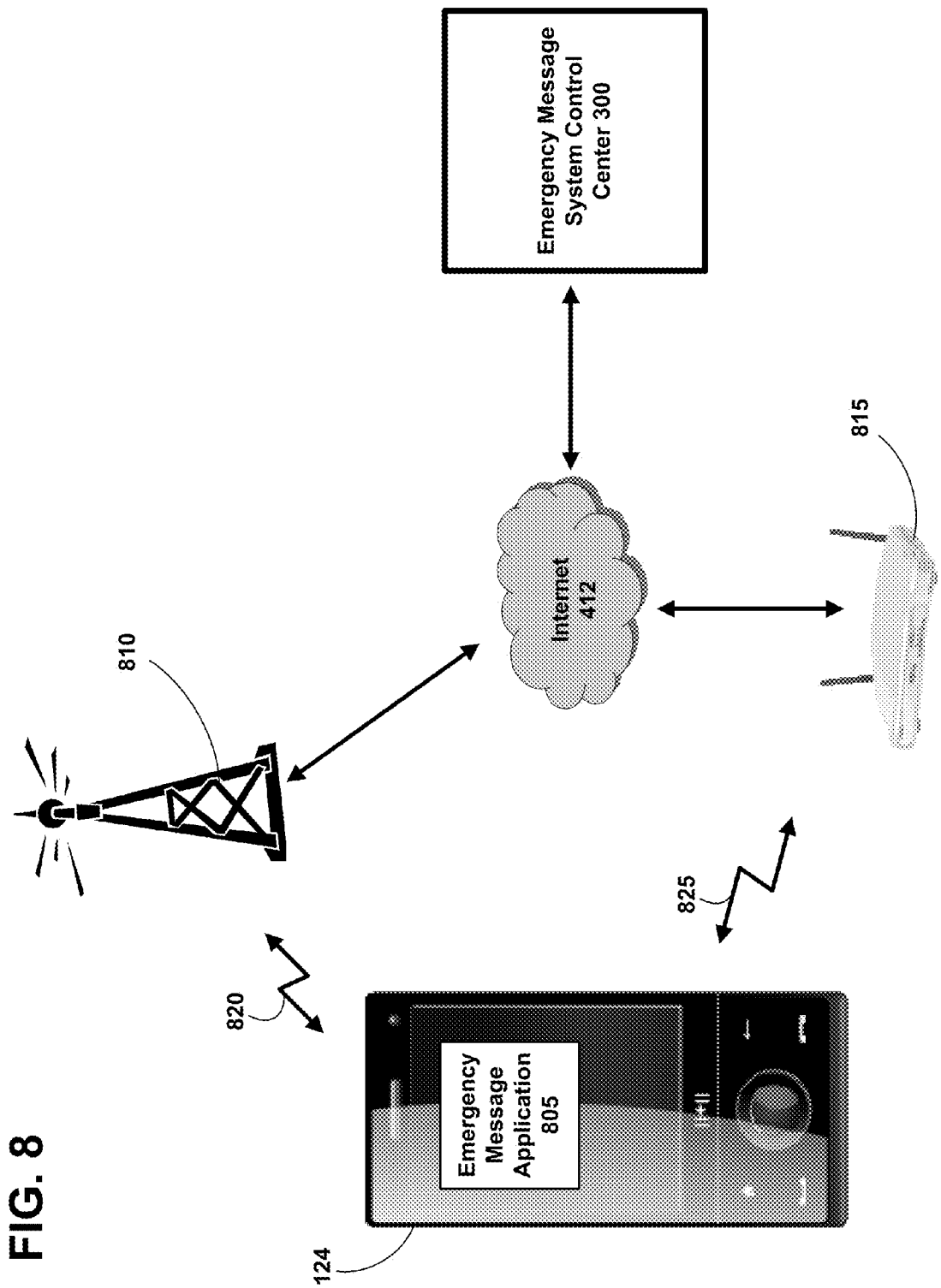
FIG. 8 is a diagram of an exemplary embodiment of a smartphone based personal emergency message transceiver 124 in communication with the emergency message system control center 300 in accordance with an exemplary embodiment of the present invention.

FIG. 8 is a diagram of an exemplary embodiment of a smartphone based personal emergency message transceiver 124 in communication with the emergency message system control center 300 in accordance with an exemplary embodiment of the present invention. As shown in FIG. 8, the personal emergency message transceiver 124 is a smartphone and can be configured with an emergency message application 805. In an exemplary embodiment, the emergency message application 805 is software application that runs on the smartphone. The network architecture shown in the exemplary embodiment in FIG. 10 enables the smartphone based personal emergency message transceiver 124 to communicate with the emergency message system control center 300. In the exemplary embodiment shown in FIG. 8, the smartphone based personal emergency message transceiver 124 can utilize two primary communication links to the emergency message system control center 300.

First, the smartphone based personal emergency message transceiver 124 can utilize the cellular link 820 to connect to a cellular base station 810, as shown in FIG. 8. Those of skill in the art will appreciate that the cellular base station 810 can enable connection to a variety of different networks connected to the cellular communication network, including the Internet 412. Once connected to the Internet 412, data traffic from the smartphone based personal emergency message transceiver 124 can be transmitted to the emergency message system control center 300. Therefore, in this exemplary embodiment the smartphone based personal emergency message transceiver 124 is enabled to exchange data related to the emergency message application 805 via the standard cellular communication path of the smartphone.

Second, as shown in FIG. 8, the smartphone based personal emergency message transceiver 124 can also utilize the data link 825 to connect to a wireless router 815. Those of skill in the art will appreciate that the wireless router 815 can enable connection to the Internet 412. The wireless router 815 can be any type of router with Internet connectivity, such as a wireless router operating on one of the IEEE 802 family of standards, including 802.11 wireless LAN, 802.14 cable modems, 802.15 wireless PAN, 802.15.1 bluetooth, 802.15.4 ZigBee, and 802.16 Broadband Wireless Access WiMAX. Once connected to the Internet 412, data traffic from the smartphone based personal emergency message transceiver 124 can be transmitted and received with the emergency message system control center 300. In accordance with an exemplary embodiment of the present invention, the user of the smartphone based personal emergency message transceiver 124 can be enabled to communicate with the emergency message system control center 300 via either the cellular link 820 or the data link 825 in accordance with the preference of the user.

In an exemplary embodiment, the smartphone based personal emergency message transceiver 124 can be in active communication with the emergency message system control center 300 via the cellular link 820. Accordingly, the emergency message system control center 300 can broadcast emergency messages to the emergency message application 805 on the smartphone based personal emergency message transceiver 124 via the cellular link 820. In an exemplary embodiment, the emergency message application 805 performs the function of determining whether a particular emergency message matches the parameters configured by the user for desired emergency messages. Thus, in this implementation, the emergency message system control center 300 transmits all emergency messages to the smartphone based personal emergency message transceiver 124 and the emergency message application 805 filters those messages. In an alternative embodiment, the emergency message application 805 is configured to transmit the user's preferences to the emergency message system control center 300 and the emergency message system control center 300 only transmits those emergency messages to the smartphone based personal emergency message transceiver 124 that match the user's configuration parameters for emergency messages.

Figure 9:
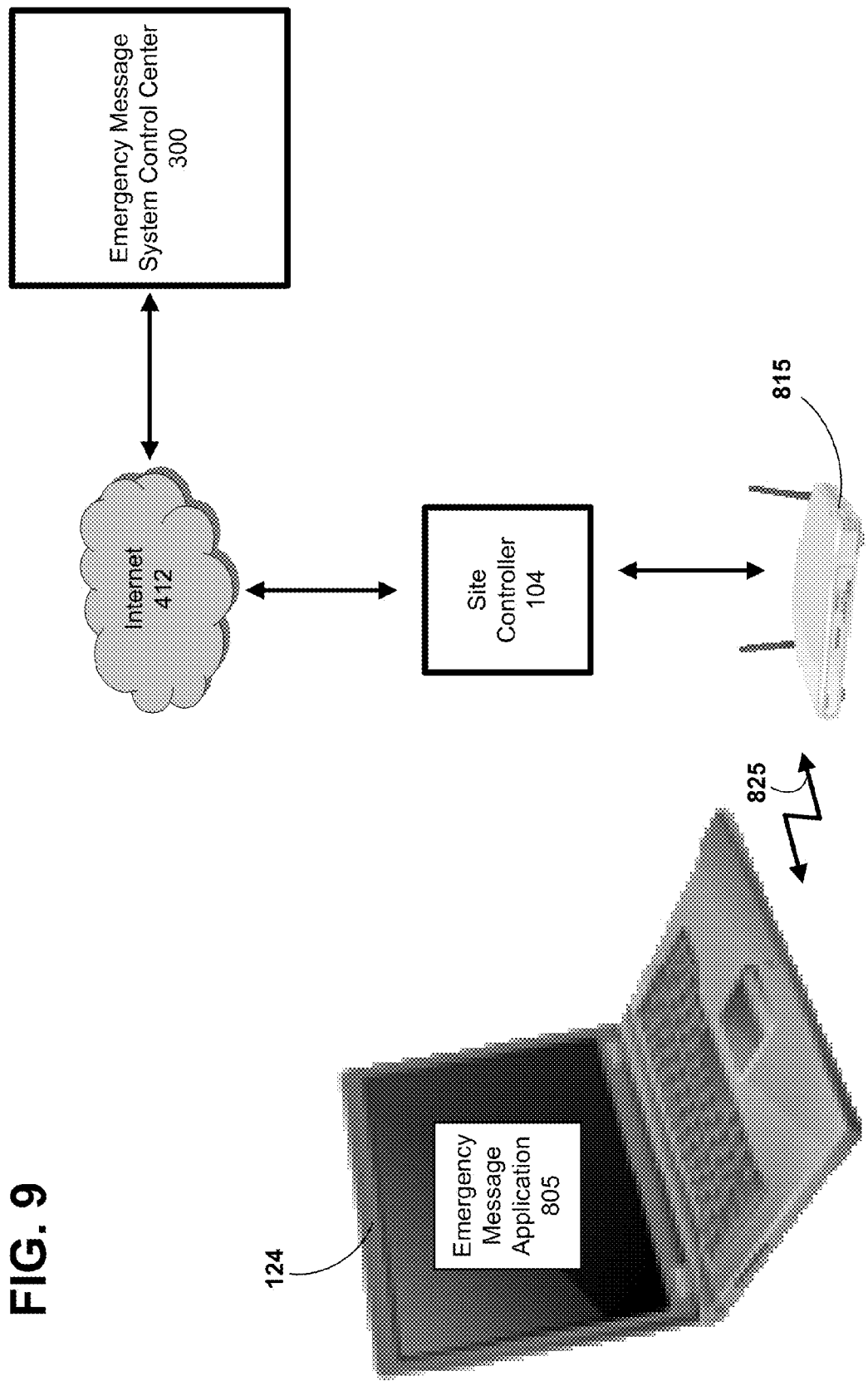
FIG. 9 is a diagram of an exemplary embodiment of a laptop based personal emergency message transceiver 124 in communication with the emergency message system control center 300 in accordance with an exemplary embodiment of the present invention.

FIG. 9 is a diagram of an exemplary embodiment of a laptop based personal emergency message transceiver 124 in communication with the emergency message system control center 300 in accordance with an exemplary embodiment of the present invention. As shown in FIG. 9, the personal emergency message transceiver 124 is a laptop including a wireless communication device and an emergency message application 805. In an exemplary embodiment, the emergency message application 805 is a software application that runs on the laptop. The network architecture shown in the exemplary embodiment in FIG. 1 enables the laptop based personal emergency message transceiver 124 to communicate with the emergency message system control center 300.

As described above, various embodiments of the personal emergency message transceiver 124 can communicate directly with the emergency message system control center 300 or through an intermediate communication unit. The laptop based personal emergency message transceiver 124 is enabled to communicate with site controller 104 through the data link 825 to connect to a wireless router 815. In an exemplary embodiment, the site controller 104 can aggregate, control, and maintain emergency message communication from a variety of personal emergency message transceivers 124. Once connected to the site controller 104, data traffic from the laptop based personal emergency message transceiver 124 can be transmitted to the emergency message system control center 300 via the Internet 412. In accordance with an exemplary embodiment of the present invention, the user of the smartphone based personal emergency message transceiver 124 can be enabled to communicate with the emergency message system control center 300 via either the cellular link 820 or the data link 825 in accordance with the preference of the user.

Figure 10:
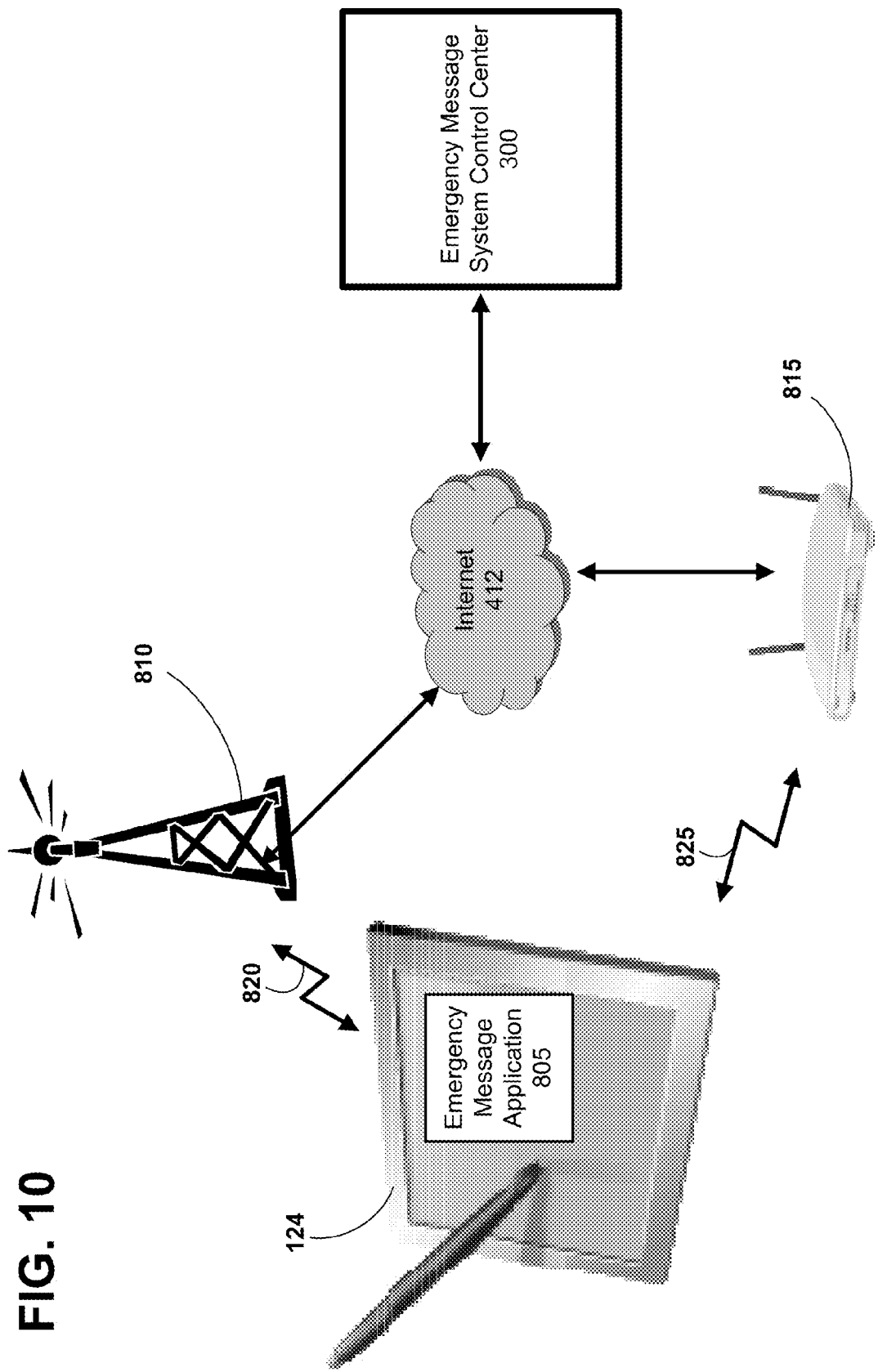
FIG. 10 is a diagram of an exemplary embodiment of a tablet based personal emergency message transceiver 124 in communication with the emergency message system control center 300 in accordance with an exemplary embodiment of the present invention.

FIG. 10 is a diagram of an exemplary embodiment of a tablet based personal emergency message transceiver 124 in communication with the emergency message system control center 300 in accordance with an exemplary embodiment of the present invention. As shown in FIG. 10, the personal emergency message transceiver 124 is a tablet and can be configured with an emergency message application 805. In an exemplary embodiment, the emergency message application 805 is a software application that runs on the tablet. The network architecture shown in the exemplary embodiment in FIG. 10 enables the tablet based personal emergency message transceiver 124 to communicate with the emergency message system control center 300. In the exemplary embodiment shown in FIG. 10, the tablet based personal emergency message transceiver 124 can utilize two primary communication links to the emergency message system control center 300.

First, the tablet based personal emergency message transceiver 124 can utilize the cellular link 820 to connect to a cellular base station 810, as shown in FIG. 10. Those of skill in the art will appreciate that the cellular base station 810 can enable connection to a variety of different networks, including the Internet 412. Once connected to the Internet 412, data traffic from the tablet based personal emergency message transceiver 124 can be transmitted and received with the emergency message system control center 300.

Second, as shown in FIG. 10, the tablet based personal emergency message transceiver 124 can also utilize the data link 825 to connect to a wireless router 815. Those of skill in the art will appreciate that the wireless router 815 can enable connection to the Internet 412. Once connected to the Internet 412, data traffic from the tablet based personal emergency message transceiver 124 can be transmitted to the emergency message system control center 300. In accordance with an exemplary embodiment of the present invention, the user of the tablet based personal emergency message transceiver 124 can be enabled to communicate with the emergency message system control center 300 via either the cellular link 820 or the data link 825 in accordance with the preference of the user.

Figure 11:
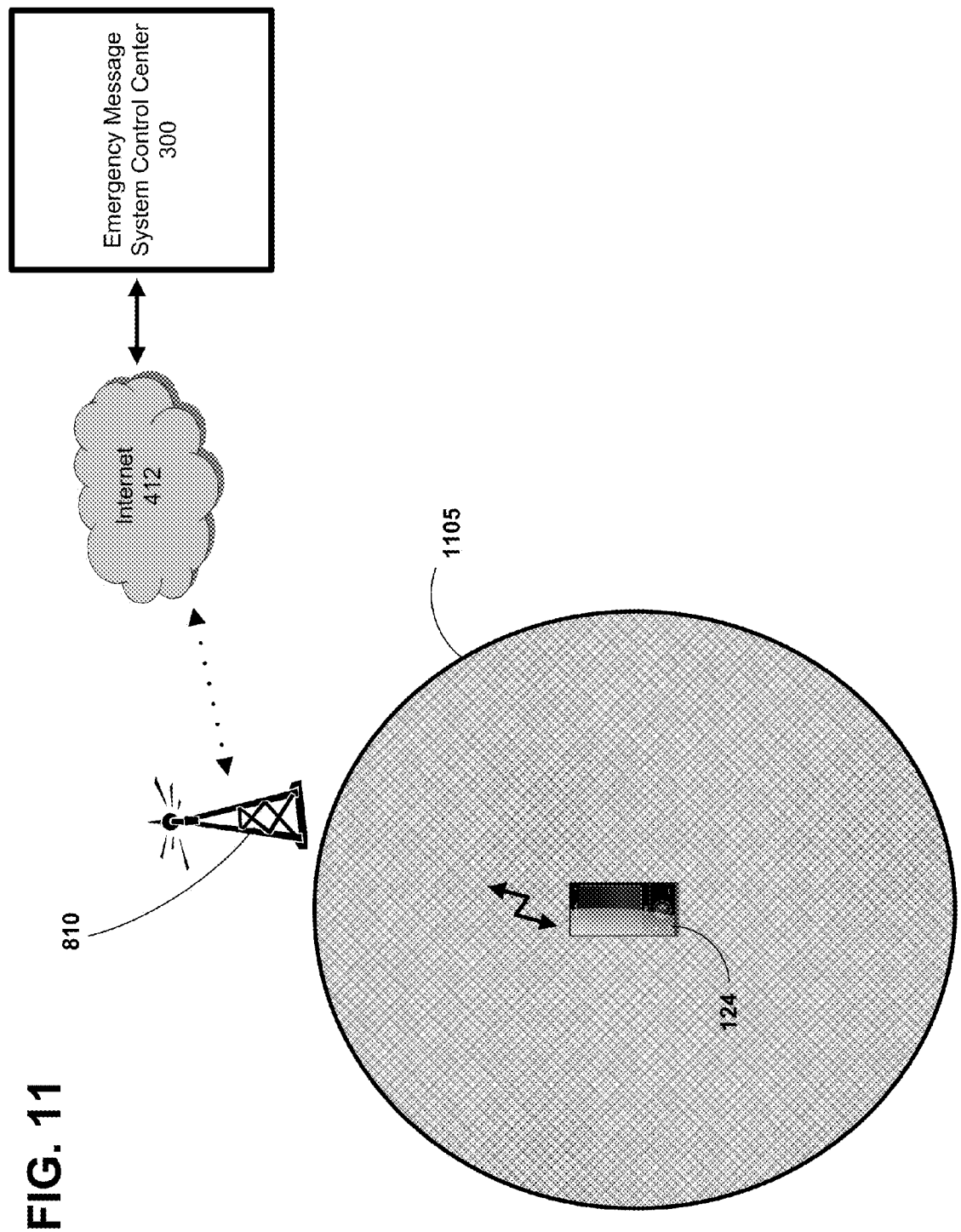
FIG. 11 is a diagram of an exemplary embodiment of a smartphone based personal emergency message transceiver 124 in communication with the emergency message system control center 300 in accordance with an exemplary embodiment of the present invention.

FIG. 11 is a diagram of an exemplary embodiment of a smartphone based personal emergency message transceiver 124 in communication with the emergency message system control center 300 in accordance with an exemplary embodiment of the present invention. In an exemplary embodiment, the emergency message application residing on a smartphone based personal emergency message transceiver 124 can be configured to only alert the user to hazardous weather or natural disasters within a certain radius of the current location of the user. In an exemplary embodiment, the emergency message application 805 can be configured to designate a emergency notification radius 1105, shown in FIG. 11, within a predetermined area around the user's smartphone based personal emergency message transceiver 124 for which to receive emergency messages. In an exemplary embodiment, the emergency message system control center 300 will provide emergency messages to the smartphone based personal emergency message transceiver 124 that are relevant to the emergency notification radius 1105. In this example, the user might be traveling in a car and receive an emergency message via the emergency message application of a tornado warning inside the emergency notification radius 1105. The emergency message application is enabled to send GPS location information to the emergency message system control center 300 to provide a real time update as to the current location of the smartphone based personal emergency message transceiver 124. Therefore, the emergency message system control center 300 can provide accurate and real time emergency messages relevant to only the emergency notification radius 1105 of the user.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for communicating emergency messages, the system comprising:
    a mobile device comprising an emergency message application and a personal emergency message transceiver,
    an emergency message control center;
    wherein the emergency message application is enabled to receive a plurality of emergency messages generated by the emergency message control center, the emergency application configured to receive only certain types of emergency messages based on a predetermined preference of a user;
    wherein the mobile device is enabled to communicate with a cellular base station; and
    wherein the wireless communication device is configured to communicate with the emergency message control center via an Internet connection linked to a cellular-communication network of the cellular base station.

2. The system of claim 1, wherein the emergency message application can provide a plurality of location data regarding a current location of the mobile device to the emergency message system control center.

3. The system of claim 1, wherein the emergency message system control center can track the location of the mobile device.

4. The system of claim 1, wherein the emergency message control center provides only the plurality of emergency messages relevant to a current location of the mobile device.

5. The system of claim 1, wherein the personal emergency message transceiver is enabled to communicate with a wireless router.

6. The system of claim 5, wherein the mobile device communicates with the emergency message system control center via an Internet connection provided by the wireless router.

7. The system of claim 1, wherein the personal emergency message transceiver is enabled to communicate with a cellular base station.

8. The system of claim 5, wherein the mobile device communicates with the emergency message system control center via an Internet connection linked to a cellular communication network of the cellular base station.

9. A wireless communication device comprising:
    a transceiver configured communicate with a cellular base station to send and receive one or more emergency messages via one or more devices in a cellular communication network;
    an emergency message application operatively connected to a memory;
    wherein the transceiver is configured to receive a plurality of emergency messages generated by an emergency message system control center via an Internet connection linked to the cellular communication network of the cellular base station; and
    wherein the emergency message application is configured to provide certain types of the plurality of emergency messages to a user of the wireless communication device based on a predetermined preference of the user.

10. The wireless communication device of claim 9, wherein the transceiver of the wireless communication device is enabled to communicate with a wireless router.

11. The wireless communication device of claim 10, wherein the wireless communication device communicates with the emergency message system control center via an Internet connection provided by the wireless router.

* * * * *